United States Patent
Funatsuki et al.

(10) Patent No.: US 12,518,832 B2
(45) Date of Patent: Jan. 6, 2026

(54) SEMICONDUCTOR MEMORY DEVICE

(71) Applicant: Kioxia Corporation, Tokyo (JP)

(72) Inventors: Rieko Funatsuki, Yokohama (JP); Takashi Maeda, Kamakura (JP)

(73) Assignee: Kioxia Corporation, Tokyo (JP)

( * ) Notice: Subject to any disclaimer, the term of this patent is extended or adjusted under 35 U.S.C. 154(b) by 207 days.

(21) Appl. No.: 18/500,520

(22) Filed: Nov. 2, 2023

(65) Prior Publication Data
US 2024/0062822 A1 Feb. 22, 2024

Related U.S. Application Data

(63) Continuation of application No. PCT/JP2022/002679, filed on Jan. 25, 2022.

(30) Foreign Application Priority Data

Jun. 16, 2021 (JP) .................................. 2021-100534

(51) Int. Cl.
*G11C 16/10* (2006.01)
*G11C 16/04* (2006.01)
(Continued)

(52) U.S. Cl.
CPC .......... *G11C 16/10* (2013.01); *G11C 16/0483* (2013.01); *G11C 16/08* (2013.01);
(Continued)

(58) Field of Classification Search
CPC ..... G11C 16/10; G11C 16/0483; G11C 16/08; G11C 16/24; G11C 16/26; G11C 16/3459;
(Continued)

(56) References Cited

U.S. PATENT DOCUMENTS

2003/0147278 A1 8/2003 Tanaka et al.
2016/0254059 A1* 9/2016 Ochi ...................... G11C 16/26
365/185.22
(Continued)

FOREIGN PATENT DOCUMENTS

JP 2003-196988 A 7/2003
JP 2017-168163 A 9/2017
(Continued)

OTHER PUBLICATIONS

International Search Report issued Mar. 15, 2022 in PCT/JP2022/002679 filed on Jan. 25, 2022, 2 pages.

*Primary Examiner* — Huan Hoang
*Assistant Examiner* — Bradley S Coon
(74) *Attorney, Agent, or Firm* — Oblon, McClelland, Maier & Neustadt, L.L.P.

(57) ABSTRACT

A semiconductor memory device includes a first to eighth memory cell groups arranged along a first direction, a first word line extending in the first direction and a first to an eighth sense amplifier groups configured to be capable of supplying voltages to the first to the eighth memory cell groups, respectively. Each of the first to the eighth memory cell groups includes a plurality of memory cells and a plurality of bit lines each connected to the plurality of memory cells. In a write operation of supplying a program voltage to the first word line, the first sense amplifier group supplies a first voltage to the bit line connected to a write target memory cell of the first memory cell group, and the second sense amplifier group supplies a second voltage to the bit line connected to a write target memory cell of the second memory cell group.

14 Claims, 36 Drawing Sheets

(51) Int. Cl.
*G11C 16/08* (2006.01)
*G11C 16/24* (2006.01)
*G11C 16/26* (2006.01)
*H10B 41/10* (2023.01)
*H10B 41/27* (2023.01)
*H10B 41/35* (2023.01)

(52) U.S. Cl.
CPC .............. *G11C 16/24* (2013.01); *G11C 16/26* (2013.01); *H10B 41/10* (2023.02); *H10B 41/27* (2023.02); *H10B 41/35* (2023.02)

(58) Field of Classification Search
CPC ........ H10B 41/10; H10B 41/27; H10B 41/35; H10B 43/10; H10B 43/27; H10D 30/021; H10D 64/035; H10D 64/037
See application file for complete search history.

(56) References Cited

U.S. PATENT DOCUMENTS

| 2017/0271021 A1 | 9/2017 | Futatsuyama et al. |
| 2018/0277565 A1 | 9/2018 | Futatsuyama et al. |
| 2019/0080772 A1 | 3/2019 | Yanagidaira |
| 2020/0098434 A1* | 3/2020 | Lang ..................... G11C 16/26 |

FOREIGN PATENT DOCUMENTS

| JP | 2018-164070 A | 10/2018 |
| JP | 2019-53797 A | 4/2019 |

* cited by examiner

SEMICONDUCTOR MEMORY DEVICE

CROSS-REFERENCE TO RELATED APPLICATION(S)

This application is a Continuation of International Patent Application No. PCT/JP2022/002679, filed on Jan. 25, 2022, which claims the benefit of priority to Japanese Patent Application No. 2021-100534, filed on Jun. 16, 2021, the entire contents of which are incorporated herein by reference.

FIELD

Embodiments described herein relate generally to a semiconductor memory device.

BACKGROUND

A NAND flash memory is known as a nonvolatile semiconductor memory device.

DESCRIPTION OF EMBODIMENTS

Figure 1:
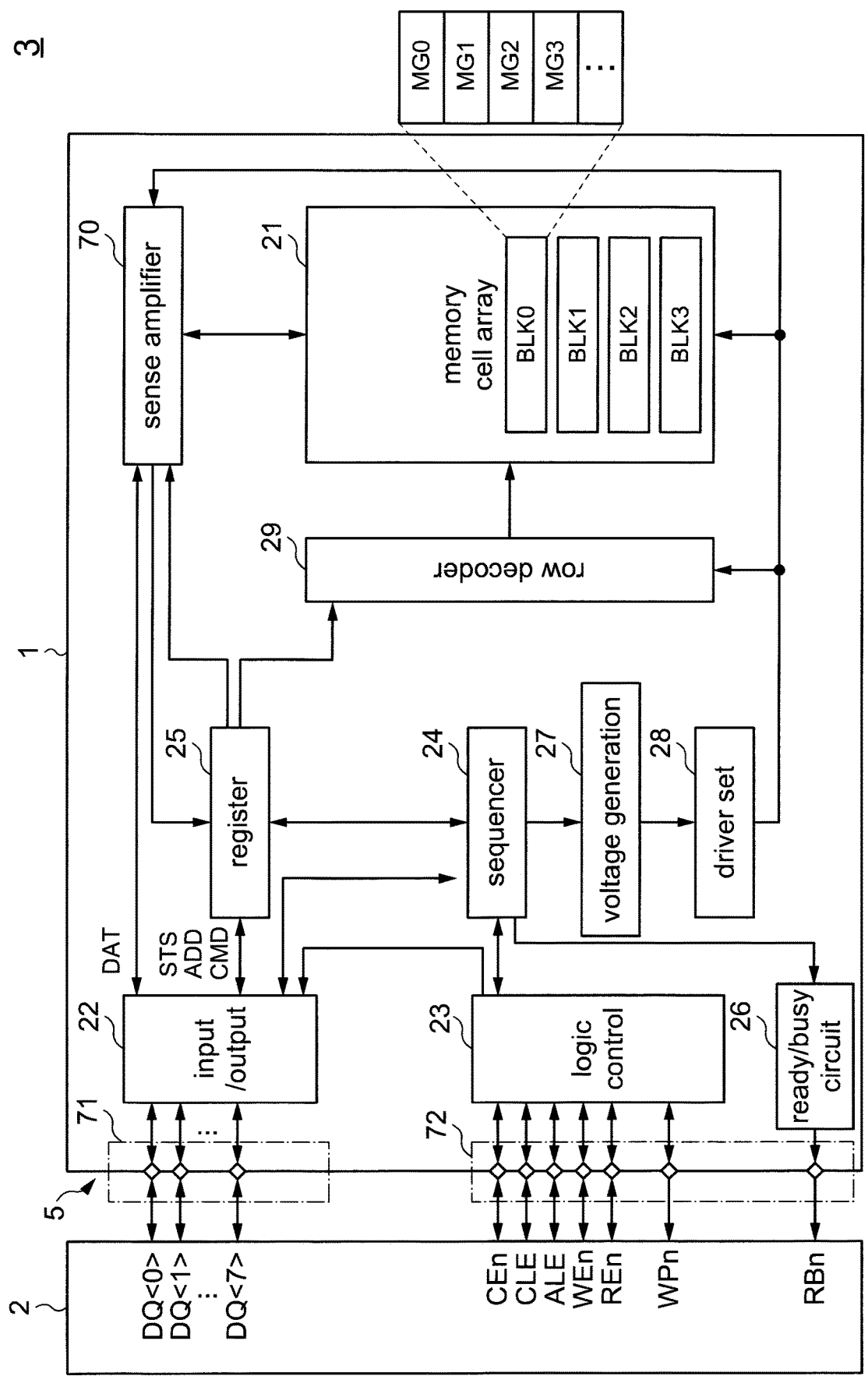
FIG. 1 is a block diagram showing a configuration of a memory system including a semiconductor memory device according to a first embodiment.

A semiconductor memory device capable of suppressing program variation in a memory cell is provided.

A semiconductor memory device includes a first memory cell group to an eighth memory cell group arranged along a first direction, a first word line arranged in common to the first memory cell group to the eighth memory cell group and extending in the first direction, and a first sense amplifier group to an eighth sense amplifier group configured to be capable of supplying voltages to the first memory cell group to the eighth memory cell group, respectively. Each of the first memory cell group to the eighth memory cell group includes a plurality of memory cells and a plurality of bit lines each connected to the plurality of memory cells. In a write operation of supplying a program voltage to the first word line, the first sense amplifier group supplies a first voltage to the bit line connected to a write target memory cell among the plurality of memory cells of the first memory cell group, the second sense amplifier group supplies a second voltage different from the first voltage to the bit line connected to a write target memory cell among the plurality of memory cells of the second memory cell group, the third sense amplifier group supplies the second voltage to the bit line connected to a write target memory cell among the plurality of memory cells of the third memory cell group, the fourth sense amplifier group supplies the first voltage to the bit line connected to a write target memory cell among the plurality of memory cells of the fourth memory cell group, the fifth sense amplifier group supplies the first voltage to the bit line connected to a write target memory cell among the plurality of memory cells of the fifth memory cell group, the sixth sense amplifier group supplies the second voltage to the bit line connected to a write target memory cell among the plurality of memory cells of the sixth memory cell group, the seventh sense amplifier group supplies the second voltage to the bit line connected to a write target memory cell among the plurality of memory cells of the seventh memory cell group, and the eighth sense amplifier group supplies the first voltage to the bit line connected to a write target memory cell among the plurality of memory cells of the eighth memory cell group.

Hereinafter, a semiconductor memory device according to each embodiment will be described with reference to the drawings. Components having the same or similar functions and configurations in the following description are denoted by common reference signs. When distinguishing a plurality of components having common reference signs, the common reference signs are distinguished by subscripts (for example, uppercase and lowercase letters of the alphabet, numbers or a hyphen followed by uppercase letters and a number).

In the following description, a signal $X<n:0>$ (n is a natural number) means a set of signals $X<0>$, $X<1>$, ..., and $X<n>$ each of which is a 1-bit signal. Component $Y<n:0>$ means a set of components $Y<0>$, $Y<1>$, ..., and $Y<n>$ corresponding one-to-one to an input or output of the signal $X<n:0>$.

First Embodiment

Hereinafter, a semiconductor memory device 1 according to the first embodiment will be described.

1. Configuration Example

1-1. Memory System

FIG. 1 is a block diagram showing an example of a configuration of a memory system 3 including the semiconductor memory device 1 according to a first embodiment. The configuration of the memory system 3 including the semiconductor memory device 1 according to the first embodiment is not limited to the configuration shown in FIG. 1.

As shown in FIG. 1, the memory system 3 includes the semiconductor memory device 1 and a memory controller 2. For example, the memory system 3 is a memory card such as an SSD (solid state drive), an SDTM card, or the like. The memory system 3 may include a host device (not shown).

For example, the semiconductor memory device 1 is connected to the memory controller 2 and is controlled by using the memory controller 2. For example, the memory controller 2 receives an instruction necessary for an operation of the semiconductor memory device 1 from the host device, and transmits the instruction to the semiconductor memory device 1. The memory controller 2 transmits the instruction to the semiconductor memory device 1, and controls reading of data from the semiconductor memory device 1, writing of data to the semiconductor memory device 1, or erasing of data in the semiconductor memory device 1. In the first embodiment, for example, the semiconductor memory device 1 is a NAND flash memory.

1-2. Configuration of Semiconductor Memory Device

As shown in FIG. 1, the semiconductor memory device 1 includes a memory cell array 21, an input/output circuit 22, a logic control circuit 23, a sequencer 24, a register 25, a ready/busy control circuit 26, a voltage generation circuit 27, a driver set 28, a row decoder 29, a sense amplifier module 70, an input/output pad group 71, and a logic control pad group 72. In the semiconductor memory device 1, various operations such as a write operation for storing write data DAT in the memory cell array 21 and a read operation for reading read data DAT from the memory cell array 21 are executed. A configuration of the semiconductor memory device 1 according to a first embodiment is not limited to the configuration shown in FIG. 1.

For example, the memory cell array 21 is connected to the sense amplifier module 70, the row decoder 29, and the driver set 28. The memory cell array 21 includes blocks BLK0, BLK1, ..., BLKn (n is an integer of 1 or more). Although details will be described later, each of the blocks BLK includes a plurality of memory groups MG (MG0, MG1, MG2, ...). Each of the memory groups MG includes a plurality of nonvolatile memory cells associated with a bit line and a word line. The block BLK is a data-erasing unit. Data held by memory cell transistors MT (see FIG. 2) included in the same blocks BLK is erased collectively.

For example, a TLC (Triple-Level Cell) method or a QLC (Quadruple Level Cell) method can be applied to the semiconductor memory device 1. In the TLC method, 3-bit data is held in each memory cell, and in the QLC method, 4-bit data is held in each memory cell. In addition, data of 2-bits or less may be held in each memory cell, and data of 5-bits or more may be held.

For example, the input/output circuit 22 is connected to the register 25, the logic control circuit 23, and the sense amplifier module 70. The input/output circuit 22 controls transmission and reception of a data signal DQ<7:0> between the memory controller 2 and the semiconductor memory device 1.

The data signal DQ<7:0> is an 8-bit signal. The data signal DQ<7:0> is an entity of data transmitted and received between the semiconductor memory device 1 and the memory controller 2, and includes a command CMD, the data DAT, address information ADD, status information STS, and the like. For example, the command CMD includes an instruction for executing the instruction transmitted from the host device (the memory controller 2) to the semiconductor memory device 1. The data DAT includes the write data DAT to the semiconductor memory device 1 or the read data DAT from the semiconductor memory device 1. For example, the address information ADD includes a column address and a row address for selecting a plurality of nonvolatile memory cells associated with the bit line and word line. For example, the status information STS includes information related to a status of the memory device 1 related to the write operation and the read operation.

More specifically, the input/output circuit 22 includes an input circuit and an output circuit, and the input circuit and the output circuit perform the following processing. The input circuit receives the write data DAT, the address information ADD, and the command CMD from the memory controller 2. The input circuit transmits the received write data DAT to the sense amplifier module 70, and transmits the received address information ADD and the received command CMD to the register 25. On the other hand, the output circuit receives the status information STS from the register 25 and receives the read data DAT from the sense amplifier module 70. The output circuit transmits the received status information STS and read data DAT to the memory controller 2.

For example, the logic control circuit 23 is connected to the memory controller 2 and the sequencer 24. For example, the logic control circuit 23 receives a chip enable signal CEn, a command latch enable signal CLE, an address latch enable signal ALE, a write enable signal WEn, a read enable signal REn, and a write protect signal WPn from the memory controller 2. The logic control circuit 23 controls the input/output circuit 22 and the sequencer 24 based on the received signals.

The chip enable signal CEn is a signal for enabling the semiconductor memory device 1. The command latch enable signal CLE is a signal for notifying the input/output circuit 22 that the signal DQ input to the semiconductor memory device 1 is the command CMD. The address latch enable signal ALE is a signal for notifying the input/output circuit 22 that the signal DQ input to the semiconductor memory device 1 is the address information ADD. For example, the write enable signal WEn and the read enable signal REn are signals for instructing the input/output circuit 22 to input and output the data signal DQ, respectively. The write protect signal WPn is a signal for instructing the semiconductor memory device 1 to prohibit writing and erasing data.

For example, the sequencer 24 is connected to the ready/busy control circuit 26, the sense amplifier module 70, and the driver set 28. The sequencer 24 controls operations of the entire semiconductor memory device 1 based on the command CMD held in a command register. For example, the sequencer 24 controls the sense amplifier module 70, the row decoder 29, the voltage generation circuit 27, the driver set 28, and the like, and executes various operations such as the write operation and the read operation.

For example, the register 25 includes a status register (not shown), an address register (not shown), the command register (not shown), and the like. The status register receives and holds the status information STS from the sequencer 24, and transmits the status information STS to the input/output circuit 22 based on an instruction from the sequencer 24. The address register receives and holds the address information ADD from the input/output circuit 22. The address register transmits the column address in the address information ADD to the sense amplifier module 70, and transmits the row address in the address information ADD to the row decoder 29. The command register receives and holds the command CMD from the input/output circuit 22, and transmits the command CMD to the sequencer 24.

The ready/busy control circuit 26 generates a ready/busy signal R/Bn under the control of the sequencer 24, and transmits the generated ready/busy signal R/Bn to the memory controller 2. The ready/busy signal R/Bn is a signal for notifying whether the semiconductor memory device 1 is in a ready state for receiving the instruction from the memory controller 2 or in a busy state for not receiving the instruction.

For example, the voltage generation circuit 27 is connected to the driver set 28. The voltage generation circuit 27 generates a voltage used for the write operation, the read operation, and the like under the control of the sequencer 24, and supplies the generated voltage to the driver set 28.

Figure 29:
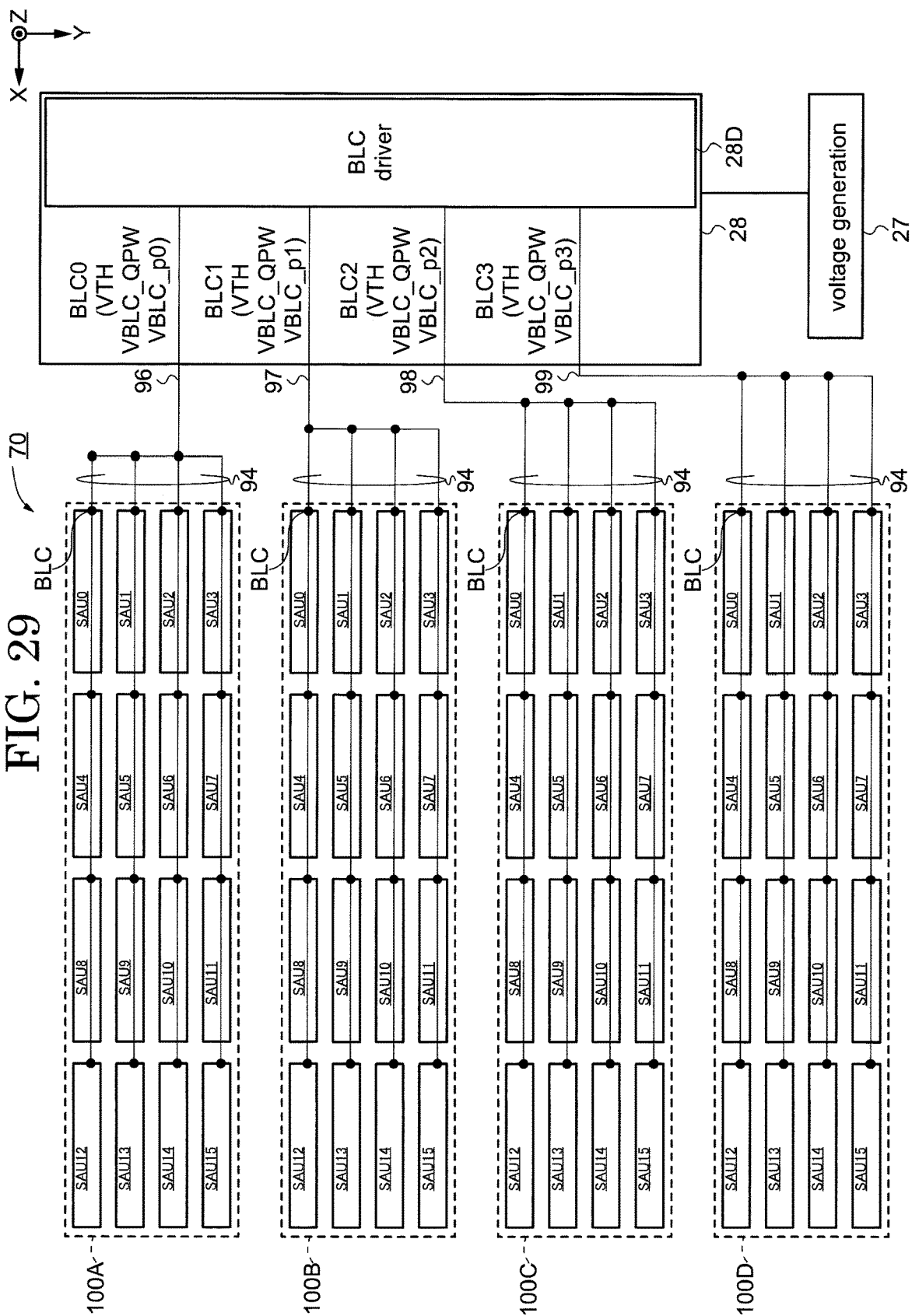
FIG. 29 is a block diagram showing an example of a configuration of a driver set according to a second embodiment.

For example, the driver set 28 includes an even word line driver 28A (see FIG. 7), an odd word line driver 28B (see FIG. 7), a source ground voltage control driver (SRCGND driver) 28C (see FIG. 18), and a bit line control driver (BLC driver) 28D (see FIG. 29). The driver set 28 is connected to the memory cell array 21, the sense amplifier module 70, and the row decoder 29. For example, the driver set 28 generates various voltages or various control signals to be supplied to a select gate line SGD (see FIG. 2), a word line WL (see FIG. 2), a source line SL (see FIG. 2), and a bit line BL (see FIG. 2) in various operations such as the read operation and the write operation, based on the voltage supplied from the voltage generation circuit 27 or the control signal supplied from the sequencer 24. The driver set 28 supplies the generated voltage or control signal to the sense amplifier module 70, the row decoder 29, the source line SL, and the like.

The row decoder 29 receives the row address from the address register and decodes the received row address. The row decoder 29 selects a target BLK to be subjected to various operations, such as the read operation and the write operation, based on the decoding results. The row decoder 29 is capable of supplying the voltage supplied from the driver set 28 to the selected block BLK.

For example, the sense amplifier module 70 receives the column address from the address register and decodes the received column address. In addition, the sense amplifier module 70 performs a data DAT transmission/reception operation between the memory controller 2 and the memory cell array 21 based on the decoding results. For example, the sense amplifier module 70 includes a sense amplifier unit SAU (see FIG. 19) arranged for each bit line BL (BL0 to BL(L−1), but (L−1) is a natural number of two or more). The sense amplifier unit SAU is electrically connected to the bit line BL and makes it possible to supply a voltage to the bit line BL. For example, the sense amplifier module 70 can supply a voltage to the bit line by using the sense amplifier unit SAU. In addition, the sense amplifier module 70 senses the data read from the memory cell array 21, generates the read data DAT, and transmits the generated read data DAT to the memory controller 2 via the input/output circuit 22. Further, the sense amplifier module 70 receives the write data DAT from the memory controller 2 via the input/output circuit 22, and transmits the received write data DAT to the memory cell array 21.

The input/output pad group 71 transmits the data signal DQ<7:0> received from the memory controller 2 to the input/output circuit 22. The input/output pad group 71 transmits the data signal DQ<7:0> received from the input/output circuit 22 to the memory controller 2.

The logic control pad group 72 transfers the chip enable signal CEn, the command latch enable signal CLE, the address latch enable signal ALE, the write enable signal WEn, and the read enable signal REn received from the memory controller 2 to the logic control circuit 23. The logic control pad group 72 transfers the ready/busy signal R/Bn received from the ready/busy control circuit 26 to the memory controller 2.

1-3. Memory Cell Array

Figure 2:
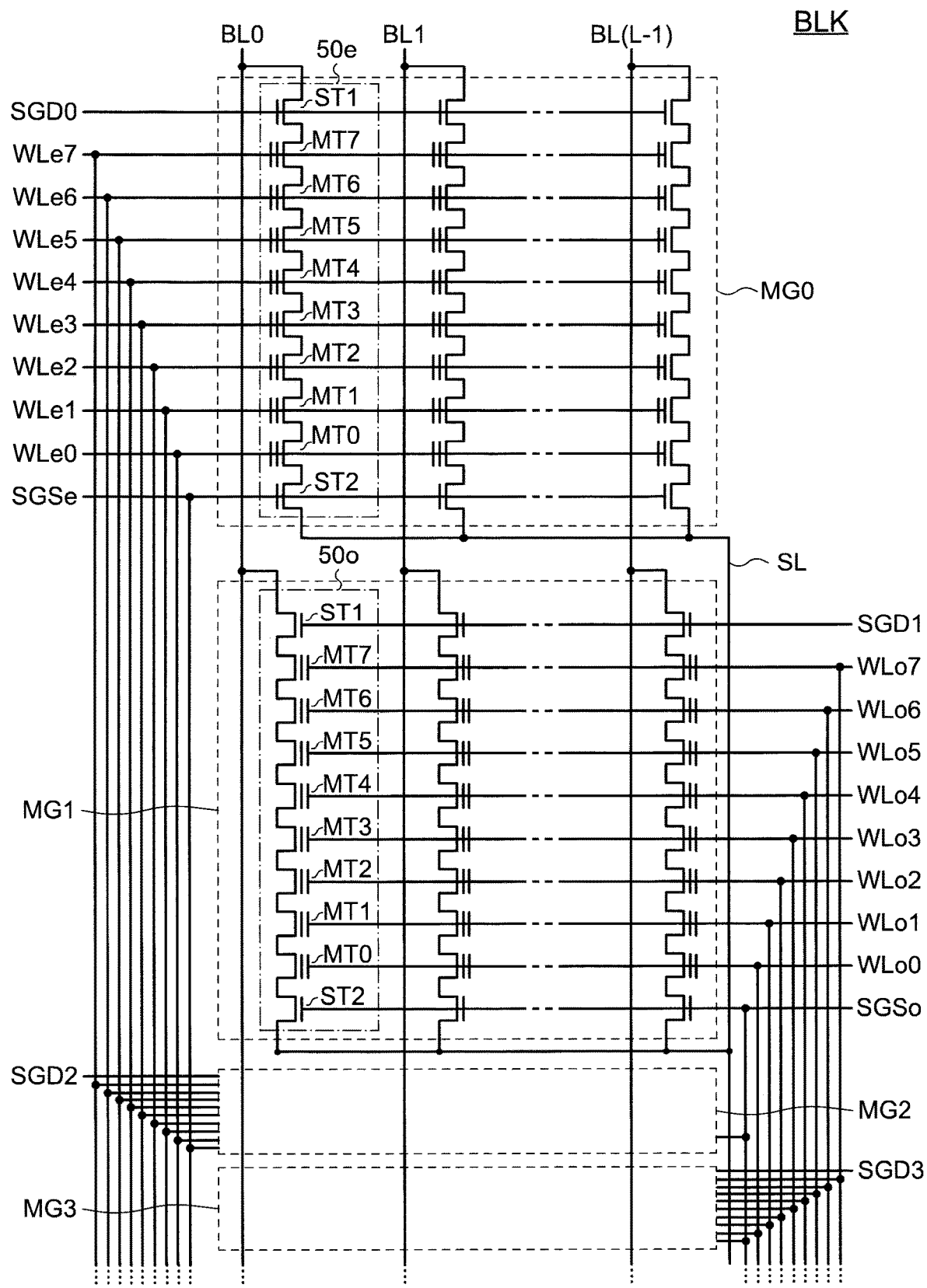
FIG. 2 is a diagram showing a circuit configuration of a memory cell array in a semiconductor memory device according to the first embodiment.

FIG. 2 is an example of a circuit configuration of the memory cell array 21 shown in FIG. 1. FIG. 2 is a diagram showing a circuit configuration of one block BLK among a plurality of blocks BLK included in the memory cell array 21. For example, each of the plurality of blocks BLK included in the memory cell array 21 has the circuit configuration shown in FIG. 2. The configuration of the memory cell array 21 according to the first embodiment is not limited to the configuration shown in FIG. 2. In the description of FIG. 2, descriptions of the same or similar configuration as in FIG. 1 may be omitted.

As shown in FIG. 2, the block BLK includes the plurality of memory groups MG (MG0, MG1, MG2, and MG3). In the present embodiment, each of the memory groups MG includes a plurality of NAND strings 50. For example, the memory groups MG0 and MG2 include a plurality of NAND strings 50e, and the memory groups MG1 and MG3 include a plurality of NAND strings 50o.

For example, each of the NAND strings 50 includes eight memory cell transistors MT (MT0 to MT7) and select transistors ST1 and ST2. The memory cell transistor MT includes a control gate and a charge storage layer, and holds data in a nonvolatile manner. The memory cell transistor MT is connected in series between a source of the select transistor ST1 and a drain of the select transistor ST2.

Gates of the select transistor ST1 in each memory group MG are connected to select gate lines SGD (SGD0, SGD1, . . . ). The select gate lines SGD are independently controlled by the row decoder 29. In addition, the gates of the select transistor ST2 in each of even-numbered memory groups MGe (MG0, MG2, . . . ) is connected to, for example, an even select gate line SGSe, and the gates of the select transistor ST2 in each of odd-numbered memory groups MGo (MG1, MG3, . . . ) is connected to, for example, an odd select gate line SGSo. For example, the even select gate line SGSe and the odd select gate line SGSo may be connected to each other, may be similarly controlled, may be independently arranged, and may be independently controllable.

The control gates of the memory cell transistors MT (MT0 to MT7) included in the memory group MGe in the same block BLK are commonly connected to word lines WLe (WLe0 to WLe7). The control gates of the memory cell transistors MT (MT0 to MT7) included in the memory group MGo in the same block BLK are commonly connected to word lines WLo (WLo0 to WLo7). The word line WLe and the word line WLo are independently controlled by the row decoder 29.

Each memory group MG includes a plurality of pages respectively corresponding to the plurality of word lines WL. For example, in the memory group MG0 or the memory group MG2, the plurality of memory cell transistors MT in which the control gates are commonly connected to any one of the word lines WLe0 to WLe7 corresponds to a page. In addition, in the memory group MG1 or the memory group MG3, the plurality of memory cell transistors MT in which the control gates are commonly connected to any one of the word lines WLo0 to WLo7 corresponds to a page. The write operation and the read operation are executed in page units.

A drain of the select transistor ST1 of the NAND string 50 in the same column in the memory cell array 21 is commonly connected to the bit lines BL (BL0 to BL(L−1)). Here, (L−1) is a natural number of 2 or more. That is, in the bit line BL, the NAND string 50 is commonly connected between the plurality of memory groups MG. Sources of the plurality of select transistors ST2 are commonly connected to the source line SL. For example, the source line SL is electrically connected to the driver set 28, and is supplied with a voltage from the voltage generation circuit 27 or the driver set 28 under the control of the voltage generation circuit 27 and the driver set 28 using the sequencer 24. In addition, the semiconductor memory device 1 according to the first embodiment may include a plurality of source lines SL. For example, each of the plurality of source lines SL may be electrically connected to the driver set 28, and each of the plurality of source lines SL may be supplied with different voltages from the voltage generation circuit 27 or the driver set 28 under the control of the voltage generation circuit 27 and the driver set 28 using the sequencer 24.

The memory group MG includes the plurality of NAND strings 50 connected to different bit lines BL and connected to the same select gate line SGD. The block BLK includes the plurality of memory groups MG that share the word line WL. The memory cell array 21 includes the plurality of blocks BLK that share the bit line BL. In the memory cell array 21, the above-described select gate lines SGS, the word line WL, and the select gate lines SGD are stacked above a source line layer, and the memory cell transistors MT are three-dimensionally stacked.

1-4. Planar Layout of Memory Cell Array

Figure 3:
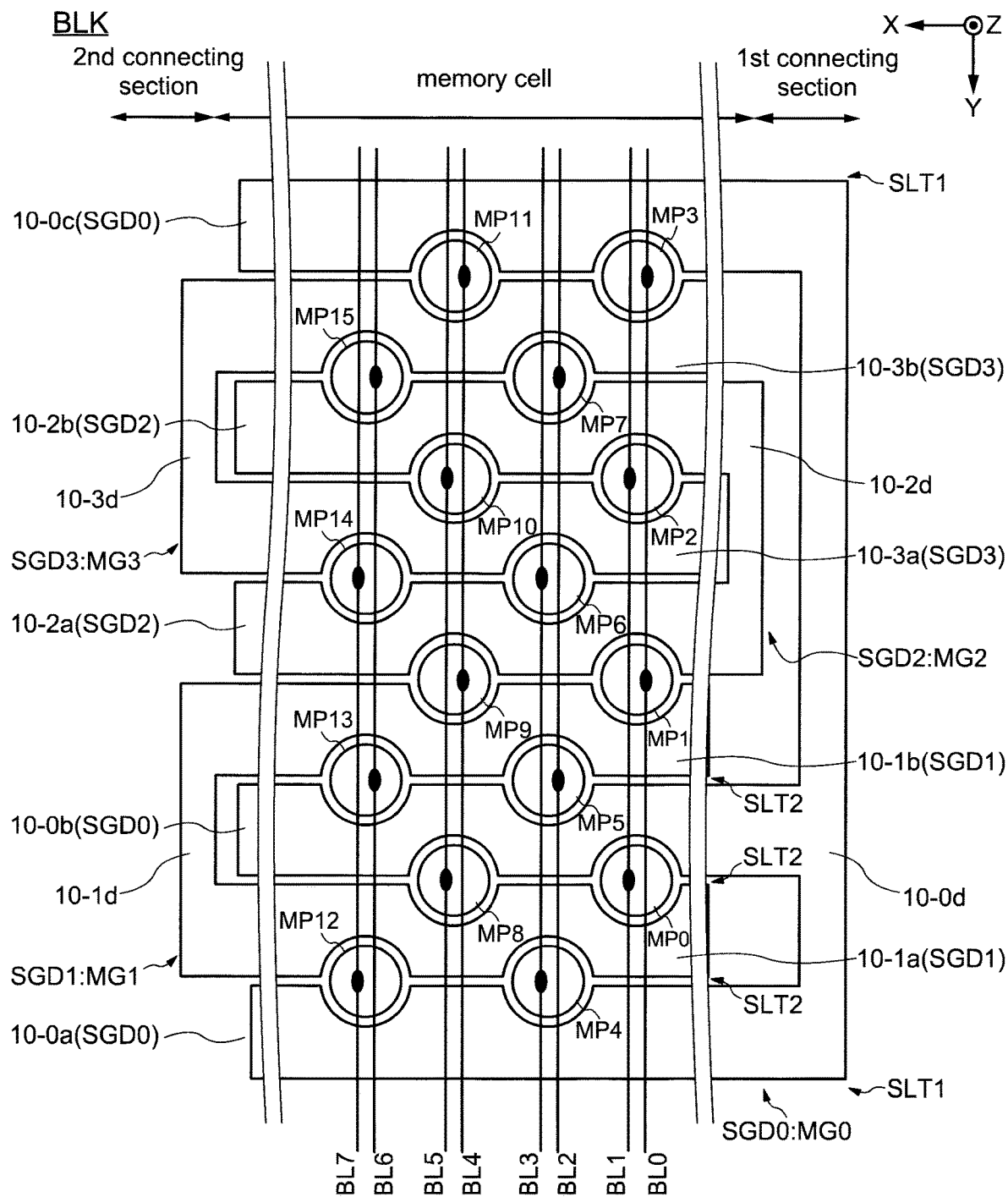
FIG. 3 is a diagram showing a planar layout of a select gate line, a bit line, and a memory pillar according to the first embodiment.

FIG. 3 is a diagram showing a planar layout of the select gate line SGD in a plane (XY plane) parallel to the source line layer of a certain block BLK. As shown in FIG. 3, in the semiconductor memory device 1 according to the first embodiment, for example, four select gate lines SGD are included in one block BLK. The planar layout of the select gate line SGD according to the first embodiment is not limited to the layout shown in FIG. 3. In the description of FIG. 3, descriptions of the same or similar configurations as those of FIG. 1 and FIG. 2 may be omitted.

As shown in FIG. 3, in the semiconductor memory device 1 according to the first embodiment, for example, three wiring layers 10-0*a*, 10-0*b*, and 10-0*c* extending in a direction X are connected by using a first connecting section 10-0*d* extending in a direction Y. The wiring layers 10-0*a* and 10-0*c* are positioned at both ends in the direction Y. The wiring layer 10-0*a* and the wiring layer 10-0*b* are adjacent to each other in the direction Y with another wiring layer (a wiring layer 10-1*a*) interposed therebetween. The first connecting section 10-0*d* is positioned at one end in the direction X. The three wiring layers 10-0*a*, 10-0*b*, and 10-0*c* function as the select gate line SGD0. In the first embodiment, for example, the direction Y is a direction perpendicular or substantially perpendicular to the direction X.

The wiring layers 10-1*a* and 10-1*b* extending in the direction X are connected by using a second connecting section 10-1*d* extending in the direction Y. The wiring layer 10-1*a* is positioned between the wiring layers 10-0*a* and 10-0*b*. The wiring layer 10-1*b* is positioned between the wiring layer 10-0*b* and another wiring layer (a wiring layer 10-2*a*). The second connecting section 10-1*d* is positioned at the other end of the first connecting section 10-0*d* in the direction X. The two wiring layers 10-1*a* and 10-1*b* function as the select gate line SGD1.

The wiring layers 10-2*a* and 10-2*b* extending in the direction X are connected by a first connecting section 10-2*d* extending in the direction Y. Similarly, wiring layers 10-3*a* and 10-3*b* extending in the direction X are connected by a second connecting section 10-3*d* extending in the direction Y. The wiring layer 10-2*a* is positioned between the wiring layer 10-1*b* and the wiring layer 10-3*a*. The wiring layer 10-3*a* is positioned between the wiring layer 10-2*a* and the wiring layer 10-2*b*. The wiring layer 10-2*b* is positioned between the wiring layer 10-3*a* and the wiring layer 10-3*b*. The wiring layer 10-3*b* is positioned between the wiring layer 10-2*b* and the wiring layer 10-0*c*. The first connecting section 10-2*d* is positioned at the same end as the first connecting section 10-0*d* in the direction X. The second connecting section 10-3*d* is positioned at the other end of the first connecting section 10-0*d* in the direction X. The two wiring layers 10-2*a* and 10-2*b* function as a select gate line SGD2. The two wiring layers 10-3*a* and 10-3*b* function as a select gate line SGD3.

In the first embodiment, although a configuration in which each of the wiring layers is connected using the first connecting sections 10-0*d* and 10-2*d* or the second connecting sections 10-1*d* and 10-3*d* is exemplified, the present invention is not limited to this configuration. For example, each wiring layer is independently controlled so that the same voltage is supplied to the wiring layers 10-0*a*, 10-0*b*, and 10-0*c*, the same voltage is supplied to the wiring layers 10-1*a* and 10-1*b*, the same voltage is supplied to the wiring layers 10-2*a* and 10-2*b*, and the same voltage is supplied to the wiring layers 10-3*a* and 10-3*b*.

The memory group MG corresponding to the wiring layers 10-0*a*, 10-0*b*, and 10-0*c* is called MG0. The memory group MG corresponding to the wiring layers 10-1*a* and 10-1*b* is called MG1. The memory group MG corresponding to the wiring layers 10-2*a* and 10-2*b* is called MG2. The memory group MG corresponding to the wiring layers 10-3*a* and 10-3*b* is called MG3.

The wiring layers 10 adjacent to each other in the direction Y in the block BLK are insulated. A region insulating the adjacent wiring layers 10 is referred to as a slit SLT2. In the slit SLT2, for example, a region from a plane parallel to the source line layer to at least a layer in which the wiring layer 10 is arranged is embedded using an insulating film (not shown). In addition, in the memory cell array 21, for example, the plurality of blocks BLK shown in FIG. 3 is arranged in the direction Y. Similar to the wiring layers 10 adjacent to each other in the direction Y in the block BLK, between the blocks BLK adjacent to each other in the direction Y is embedded using an insulating film (not shown), and the blocks BLK adjacent to each other in the direction Y are also insulated from each other. A region insulating the adjacent blocks BLK is called a slit SLT1. Similar to the slit SLT2, in the slit SLT1, the insulating film embeds a region from a plane parallel to the source line layer to at least a layer in which the wiring layer 10 is arranged.

A plurality of memory pillars MP (MP0 to MP15) is arranged between the wiring layers 10 adjacent to each other in the direction Y. The plurality of memory pillars MP is arranged in a memory cell unit. Each of the plurality of memory pillars MP is arranged along a direction Z. In the first embodiment, for example, the direction Z is a direction perpendicular or substantially perpendicular to the directions X and Y, and is a direction perpendicular or substantially perpendicular to the layer parallel to the source line layer. Further, in an embodiment, the direction X may be referred to as a "first direction," the direction Y may be referred to as a "second direction," and the direction Z may be referred to as a "third direction."

Specifically, the memory pillars MP4 and MP12 are arranged between the wiring layers 10-0*a* and 10-1*a*. The memory pillars MP0 and MP8 are arranged between the wiring layers 10-1*a* and 10-0*b*. The memory pillars MP5 and MP13 are arranged between the wiring layers 10-0*b* and 10-1*b*. The memory pillars MP1 and MP9 are arranged between the wiring layers 10-1*b* and 10-2*a*. The memory pillars MP6 and MP14 are arranged between the wiring layer layers 10-2*a* and 10-3*a*. The memory pillars MP2 and MP10 are arranged between the wiring layers 10-3*a* and 10-2*b*. The memory pillars MP7 and MP15 are arranged between the wiring layers 10-2*b* and 10-3*b*. The memory pillars MP3 and MP11 are arranged between the wiring layers 10-3*b* and 10-0*c*.

The memory pillar MP is a structure that forms the select transistors ST1 and ST2 and the memory cell transistor MT. A detailed structure of the memory pillar MP will be described later.

The memory pillars MP0 to MP3 are arranged along the direction Y. The memory pillars MP8 to MP11 are arranged along the direction Y at a position adjacent to the memory pillars MP0 to MP3 in the direction X. That is, the memory pillars MP0 to MP3 and the memory pillars MP8 to MP11 are arranged in parallel.

The memory pillars MP4 to MP7 and the memory pillars MP12 to MP15 are arranged along the direction Y, respectively. The memory pillars MP4 to MP7 are positioned between the memory pillars MP0 to MP3 and the memory pillars MP8 to MP11 in the direction X. The memory pillars MP12 to MP15 are positioned so as to sandwich the memory pillars MP8 to MP11 together with the memory pillars MP4 to MP7 in the direction X. That is, the memory pillars MP4 to MP7 and the memory pillars MP12 to MP15 are arranged in parallel.

The two bit lines BL0 and BL1 are arranged above the memory pillars MP0 to MP3. The bit line BL0 is commonly connected to the memory pillars MP1 and MP3. The bit line BL1 is commonly connected to the memory pillars MP0 and MP2. Two bit lines BL2 and BL3 are arranged above the memory pillars MP4 to MP7. The bit line BL2 is commonly connected to the memory pillars MP4 and MP5. The bit line BL3 is commonly connected to the memory pillars MP6 and MP7.

Two bit lines BL4 and BL5 are arranged above the memory pillars MP8 to MP11. The bit line BL4 is commonly connected to the memory pillars MP9 and MP11. Two bit lines BL6 and BL7 are arranged above the memory pillars MP12 to MP15. The bit line BL6 is commonly connected to the memory pillars MP13 and MP15. The bit line BL7 is commonly connected to the memory pillars MP12 and MP14.

As described above, the memory pillar MP is arranged at a position that straddles the two wiring layers 10 in the direction Y, and is arranged so as to be embedded in part of any one slit SLT2 among the plurality of slits SL2. In addition, one slit SLT2 is arranged between the memory pillars MP adjacent to each other in the direction Y.

The memory pillar MP is not arranged between the wiring layer 10-0$a$ and the wiring layer 10-0$b$ adjacent to each other with the slit SLT1 interposed therebetween.

Figure 4:
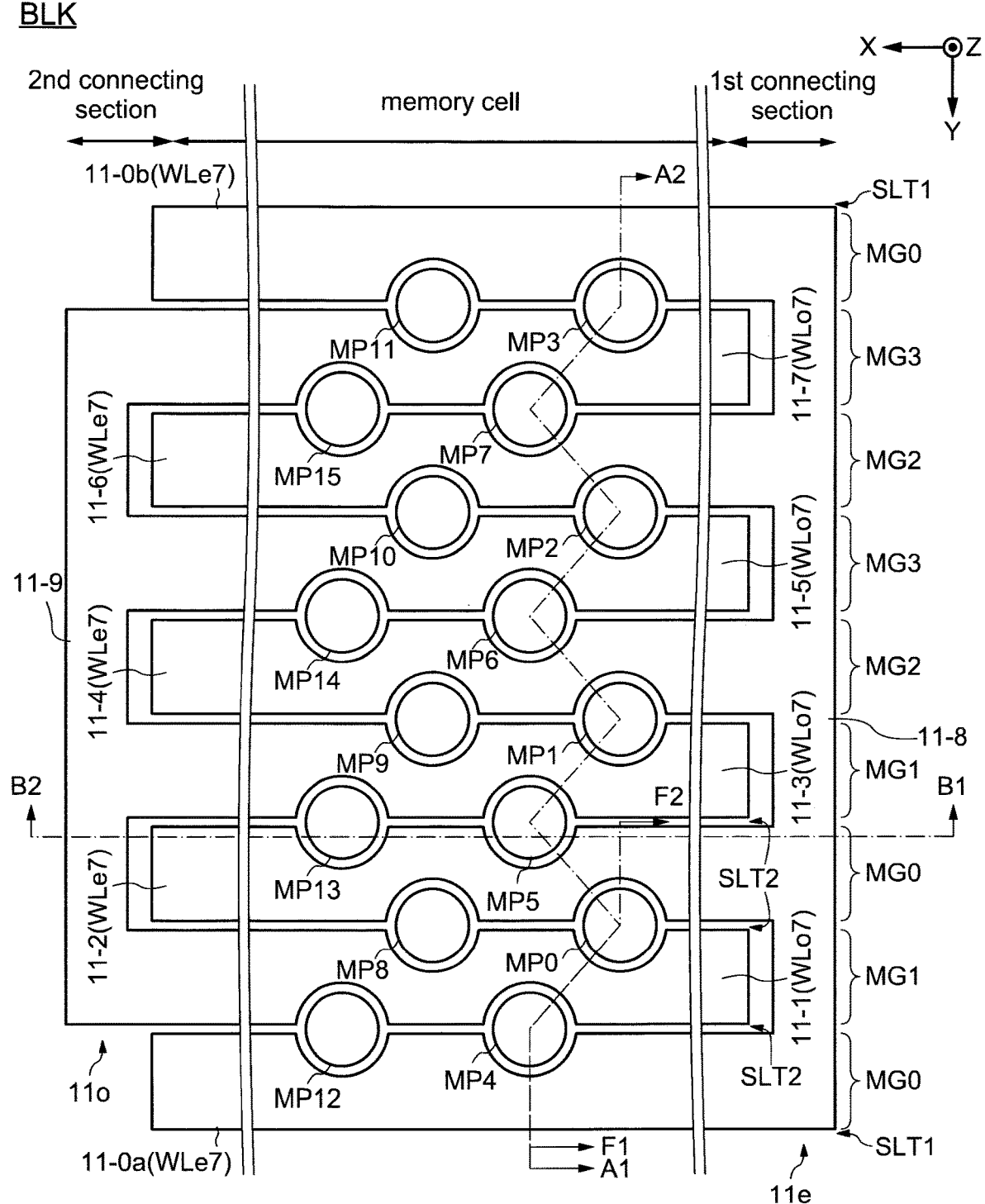
FIG. 4 is a plan view showing a planar layout of a word line and a memory pillar according to the first embodiment.

FIG. 4 is a plan view showing a planar layout of the word line WL in the XY plane. The layout shown in FIG. 4 corresponds to a layout of a region for one block in FIG. 3, and is a layout of a wiring layer 11 arranged below the wiring layer 10 shown in FIG. 3. Although only eight bit lines (bit lines BL0 to BL7) are shown in the example of the planar layout shown in FIG. 3 and FIG. 4, for example, the number of bit lines corresponding to a data length of 4 kByte, 8 kByte or 16 kByte may be arranged, and the number of bit lines is not particularly limited. In addition, the planar layout of the word line WL according to the first embodiment is not limited to the layout shown in FIG. 4. In the description of FIG. 4, descriptions of the same or similar configurations as those of FIG. 1 to FIG. 3 may be omitted.

As shown in FIG. 4, the nine wiring layers 11 (wiring layer 11-0 to 11-7, but the wiring layer 11-0 includes a wiring layer 11-0$a$ and a wiring layer 11-0$b$) extending in the direction X are arranged along the direction Y. Each of the wiring layers 11-0 to 11-7 is arranged below each of the wiring layers 10-0 to 10-7 in the direction Z. An insulating film is arranged between the wiring layers 11-0 to 11-7 and the wiring layers 10-0 to 10-7, and the wiring layers 11-0 to 11-7 and the wiring layers 10-0 to 10-7 are insulated from each other.

The wiring layer 11 functions as a word line WL7. Other word lines WL0 to WL6 have the same configuration and function as the word line WL7. In the example shown in FIG. 4, the wiring layers 11-0$a$, 11-2, 11-4, 11-6, and 11-0$b$ function as the word line WLe7. The wiring layers 11-0$a$, 11-2, 11-4, 11-6, and 11-0$b$ are connected using a first connecting section 11-8 extending in the direction Y. The first connecting section 11-8 is arranged at one end in the direction X. In the first connecting section 11-8, the wiring layers 11-0$a$, 11-2, 11-4, 11-6, and 11-0$b$ are connected to the row decoder 29. In the first embodiment, the first connecting section 11-8 and the wiring layers 11-0$a$, 11-2, 11-4, 11-6, and 11-0$b$ may be collectively referred to as a wiring layer 11$e$.

In addition, the wiring layers 11-1, 11-3, 11-5, and 11-7 function as the word line WLo7. The wiring layers 11-1, 11-3, 11-5, and the wiring layer 11-7 are connected using a second connecting section 11-9 extending in the direction Y. The second connecting section 11-9 is arranged at the other end opposite the first connecting section 11-8 in the direction X. In the second connecting section 11-9, the wiring layers 11-1, 11-3, 11-5, and 11-7 are connected to the row decoder 29. In the first embodiment, the second connecting section 11-9 and the wiring layers 11-1, 11-3, 11-5, and 11-7 may be collectively referred to as a wiring layer 11$o$.

The memory cell unit is arranged between the first connecting section 11-8 and the second connecting section 11-9. In the memory cell unit, the wiring layers 11 adjacent to each other in the direction Y are separated by the slit SLT2 shown in FIG. 3. In addition, the wiring layer 11 between the blocks BLK adjacent to each other in the direction Y is separated by the slit SLT1 in the same manner as the slit SLT2. The memory cell unit includes the memory pillars MP0 to MP15 as in FIG. 3.

The select gate lines SGS and the word lines WL0 to WL6 have the same configuration as the word line WL7 shown in FIG. 4.

1-5. Cut End Structure of Memory Cell Array

Figure 5:
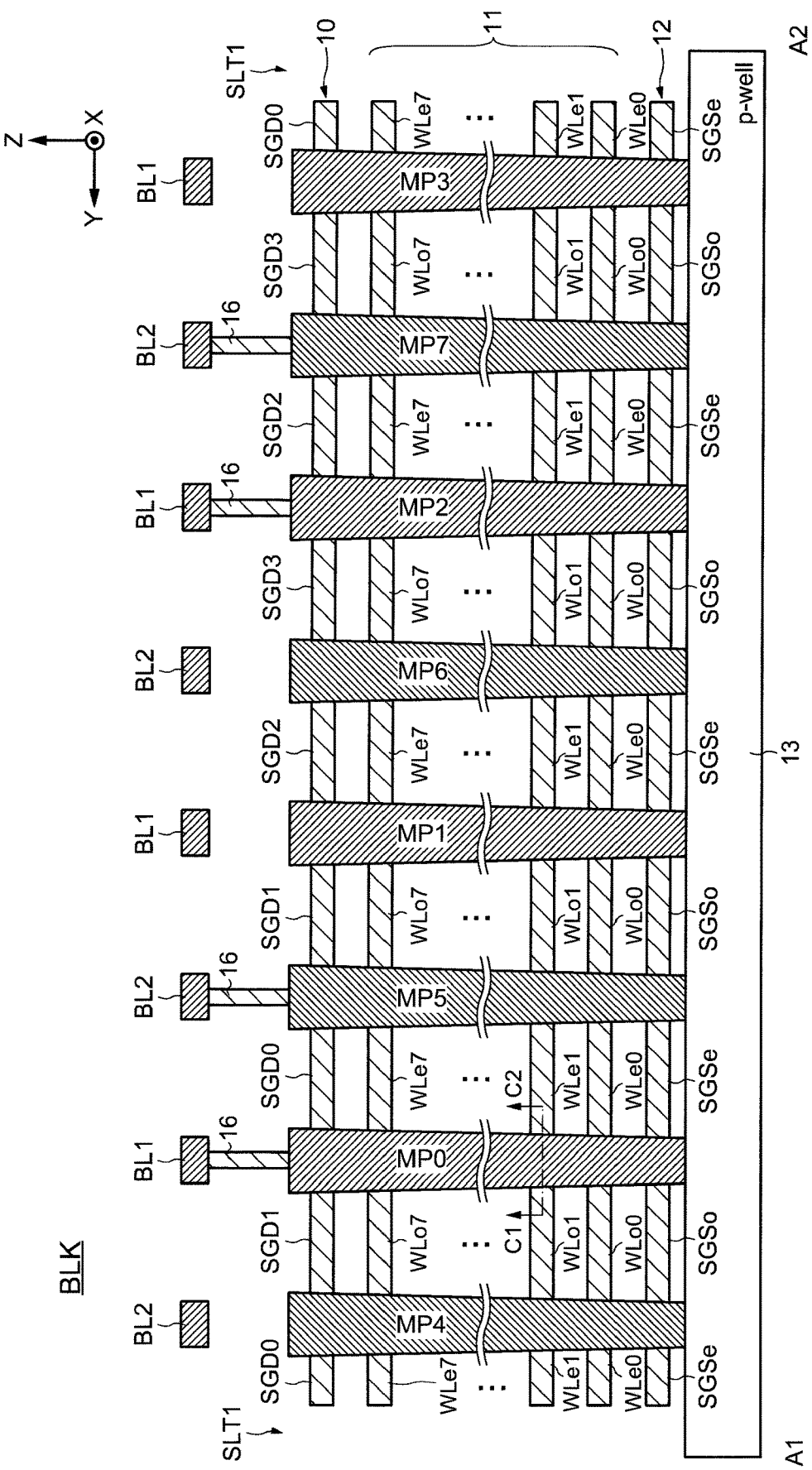
FIG. 5 is an A1-A2 cut-end view of a semiconductor memory device shown in FIG. 4.

FIG. 5 is a diagram showing an A1-A2 cut-end surface shown in FIG. 4. A cut-end surface of the block BLK according to the first embodiment is not limited to the cut-end surface shown in FIG. 5. In the description of FIG. 5, descriptions of the same or similar configurations as those of FIG. 1 to FIG. 4 may be omitted.

As shown in FIG. 5, a wiring layer 12 is arranged above a source wiring layer 13 along the direction Z. The source wiring layer 13 functions as the source line SL. The wiring layer 12 may be arranged on a p-type well (p-well) region in a semiconductor substrate instead of the source wiring layer 13 shown in FIG. 5. In this case, the source line SL is electrically connected to the p-type well region in the semiconductor substrate. The wiring layer 12 functions as the select gate line SGS. Eight layers of the wiring layer 11 are stacked above the wiring layer 12 along the direction Z. The wiring layer 11 functions as the word line WL. In addition, the eight layers of the wiring layer 11 correspond one-to-one to the word lines WL0 to WL7. FIG. 4 is a diagram showing a planar layout of the wiring layer 11 functioning as the word line WL, and FIG. 3 is a diagram showing a planar layout of the wiring layer 10 functioning as the select gate line SGD. The planar layout of the select gate line SGS functioning as the wiring layer 12 is, for example, a layout obtained by replacing the wiring layer 10 functioning as the select gate line SGD shown in FIG. 4 with the wiring layer 12 functioning as the select gate line SGS.

The wiring layer 12 functions as the even select gate line SGSe or the odd select gate line SGSo. The even select gate line SGSe and the odd select gate line SGSo are alternately arranged in the direction Y via the slit SLT2. The memory pillar MP is arranged between the even select gate line SGSe and the odd select gate line SGSo. The even select gate line SGSe and the odd select gate line SGSo do not need to be driven electrically independently. The even select gate line SGSe and the odd select gate line SGSo may be electrically connected.

The wiring layer 11 functions as the even word line WLe or the odd word line WLo. The even word line WLe and the odd WLo are alternately arranged in the direction Y via the slit SLT2. The memory pillar MP is arranged between the word lines WLe and WLo adjacent to each other in the direction Y. A memory cell to be described later is arranged between the memory pillar MP and the word line WLe and between the memory pillar MP and the word line WLo.

The slit SLT1 is arranged between the blocks BLK adjacent to each other in the direction Y. For example, an insulating layer is arranged in the slit SLT1. A width of the slit SLT1 along the direction Y is substantially the same as a width of the slit SLT2 along the direction Y.

As shown in FIG. 3 and FIG. 4, the memory pillar MP is electrically connected to the bit line BL. For example, the memory pillar MP0 and the bit line BL1 are connected via a contact plug 16. Further, the memory pillar MP1 and the bit line BL0 are connected via the contact plug 16, the memory pillar MP2 and the bit line BL1 are connected via the contact plug 16, and the memory pillar MP3 and the bit line BL0 are connected via the contact plug 16. Similarly, each of the memory pillars MP4 to MP7 is connected to the bit line BL2 or BL3, the memory pillars MP8 to MP11 are connected to the bit line BL4 or BL5, and the memory pillars MP12 to MP15 are connected to the bit line BL6 or BL7.

Figure 6:
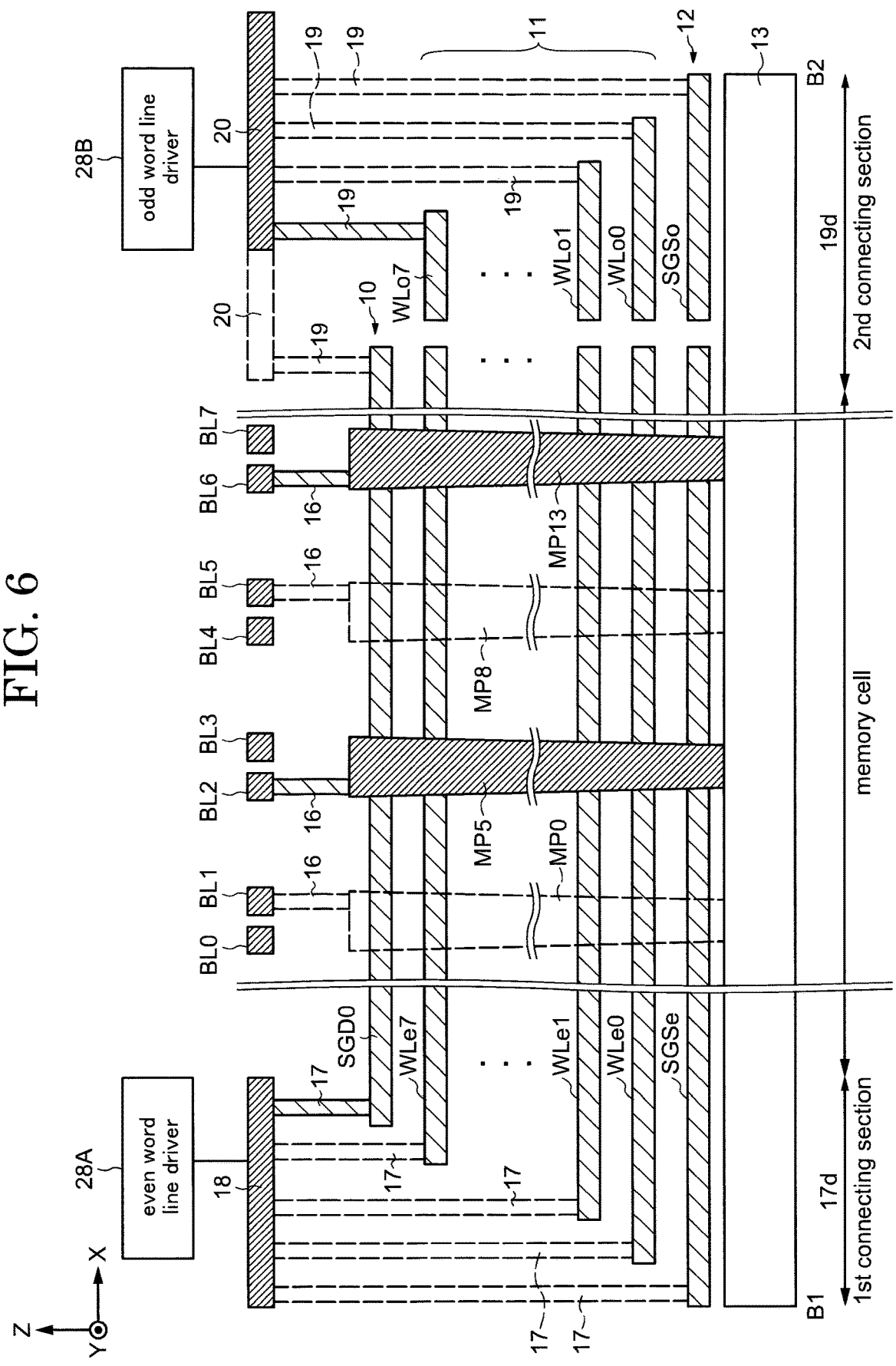
FIG. 6 is a B1-B2 cut-end view of a semiconductor memory device shown in FIG. 4.

FIG. 6 is a diagram showing a B1-B2 cut-end surface of the semiconductor memory device shown in FIG. 4. The cut-end surface of the block BLK according to the first embodiment is not limited to the cut-end surface shown in FIG. 6. In the description of FIG. 6, descriptions of the same or similar configurations as those of FIG. 1 to FIG. 5 may be omitted. Since the stacked structure of the source wiring layer 13, the wiring layer 12, the wiring layer 11, and wiring layer 10, and the configuration of the memory cell unit are as described with reference to FIG. 5, explanation thereof is omitted here. In FIG. 6, configurations present in the depth direction of the B1-B2 cut-end surface are depicted by dotted lines.

As shown in FIG. 6, in a first connecting section 17d, the wiring layer 10, the wiring layer 11, and the wiring layer 12 are arranged, for example, in a stepped manner, and are extracted from the source wiring layer 13. That is, when viewed in the XY plane, upper surfaces of each end of the wiring layer 10, the eight layers of the wiring layer 11, and the wiring layer 12 are exposed in the first connecting section 17d. A contact plug 17 is arranged on the upper surfaces of each end of the wiring layer 10, the eight layers of the wiring layer 11, and the wiring layer 12 exposed in the first connecting section 17d. The contact plug 17 is connected to a metal wiring layer 18. For example, using the metal wiring layer 18, the wiring layer 10 functioning as the even select gate lines SGD0 and SGD2, the wiring layer 11 functioning as the even word line WLe, and the wiring layer 12 functioning as the even select gate line SGSe are electrically connected to the even word line driver 28A via the row decoder 29 (see FIG. 1).

For example, similar to the first connecting section 17d, a second connecting section 19d, the wiring layer 10, the wiring layer 11, and the wiring layer 12 are arranged in a stepped manner and are extracted from the source wiring layer 13. When viewed in the XY plane, the upper surfaces of each of the wiring layer 10, the eight layers of the wiring layer 11, and the wiring layer 12 are exposed in the second connecting section 19d. A contact plug 19 is arranged on the upper surface of the wiring layer 10 exposed in the second connecting section 19d, the upper surface of each end of the eight layers of the wiring layer 11, and the wiring layer 12, and the contact plug 19 is connected to a metal wiring layer 20. For example, using the metal wiring layer 20, the wiring layer 11 functioning as the odd select gate lines SGD1 and SGD3, and the odd word line WLo, and the wiring layer 12 functioning as the odd select gate line SGSo are electrically connected to the odd word line driver 28B via the row decoder 29 (see FIG. 1).

The wiring layer 10 may be electrically connected to the row decoder 29 or the even word line driver 28A and the odd word line driver 28B via the second connecting section 19d instead of the first connecting section 17d, and may be electrically connected to the row decoder 29 or the even word line driver 28A and the odd word line driver 28B via both the first connecting section 17d and the second connecting section 19d.

Figure 7:
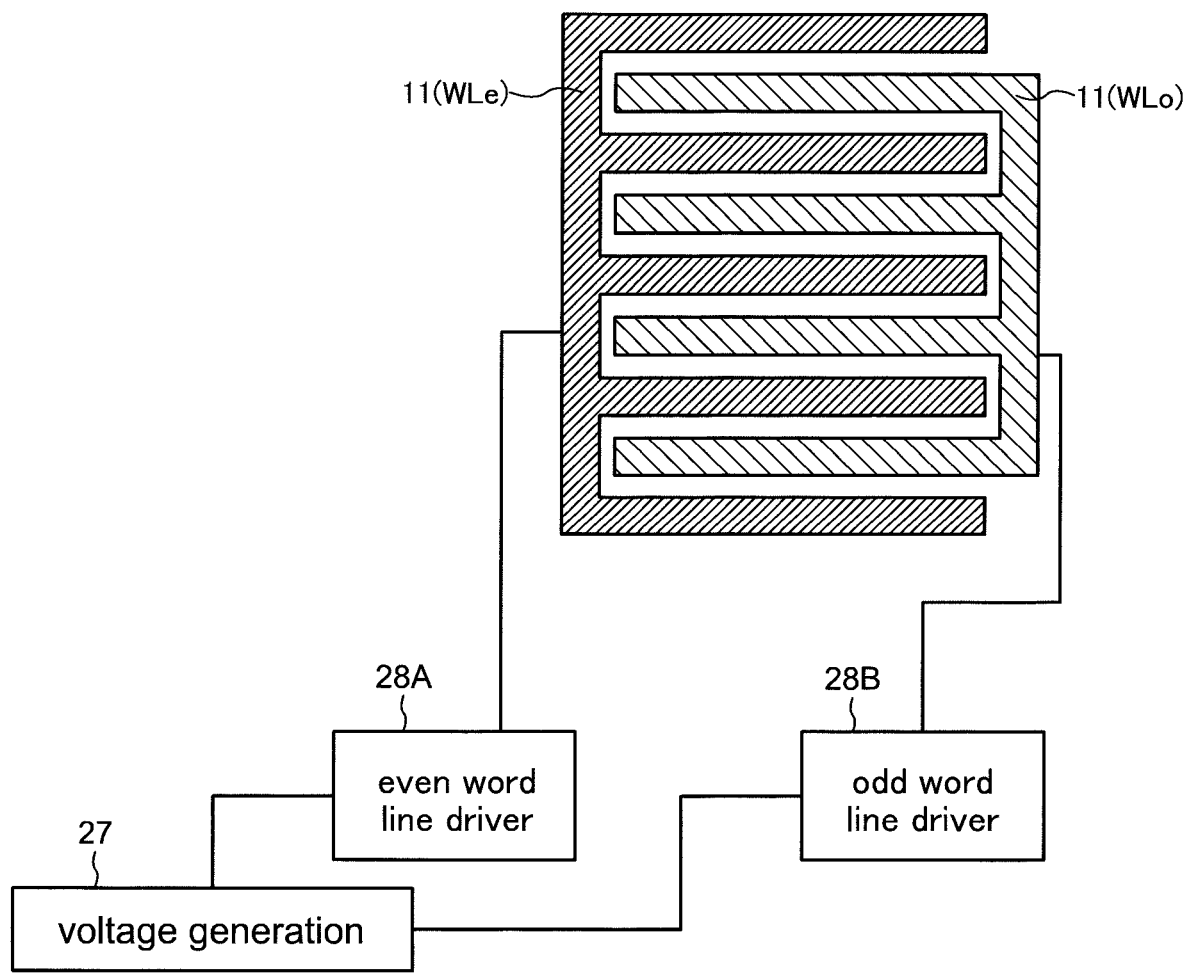
FIG. 7 is a diagram for explaining electric coupling of a voltage generation circuit, a driver set, a select gate line, or a word line according to the first embodiment.

FIG. 7 is a diagram for explaining electric coupling of the voltage generation circuit 27, the driver set 28, the select gate line SGD, or the word line WL according to the first embodiment. The electric coupling of the voltage generation circuit 27, the driver set 28, the select gate line SGD, or the word line WL according to the first embodiment is not limited to the surfaces shown in FIG. 7. In the description of FIG. 7, descriptions of the same or similar configurations as those of FIG. 1 to FIG. 6 may be omitted.

As shown in FIG. 7, the wiring layer 11 functioning as the even word line WLe may be connected to the even word line driver 28A, and the wiring layer 11 functioning as the odd word line WLo may be electrically connected to the odd word line driver 28B. As described above, the even word line driver 28A and the odd word line driver 28B are included in the driver set 28. The driver set 28 is electrically connected to the voltage generation circuit 27. The even word line driver 28A and the odd word line driver 28B may generate various voltages using the voltage supplied from the voltage generation circuit 27, the even word line driver 28A may supply the generated voltage to the even the word line WLe, and the odd word line driver 28B may supply the generated voltage to the odd word line WLo.

Figure 8:
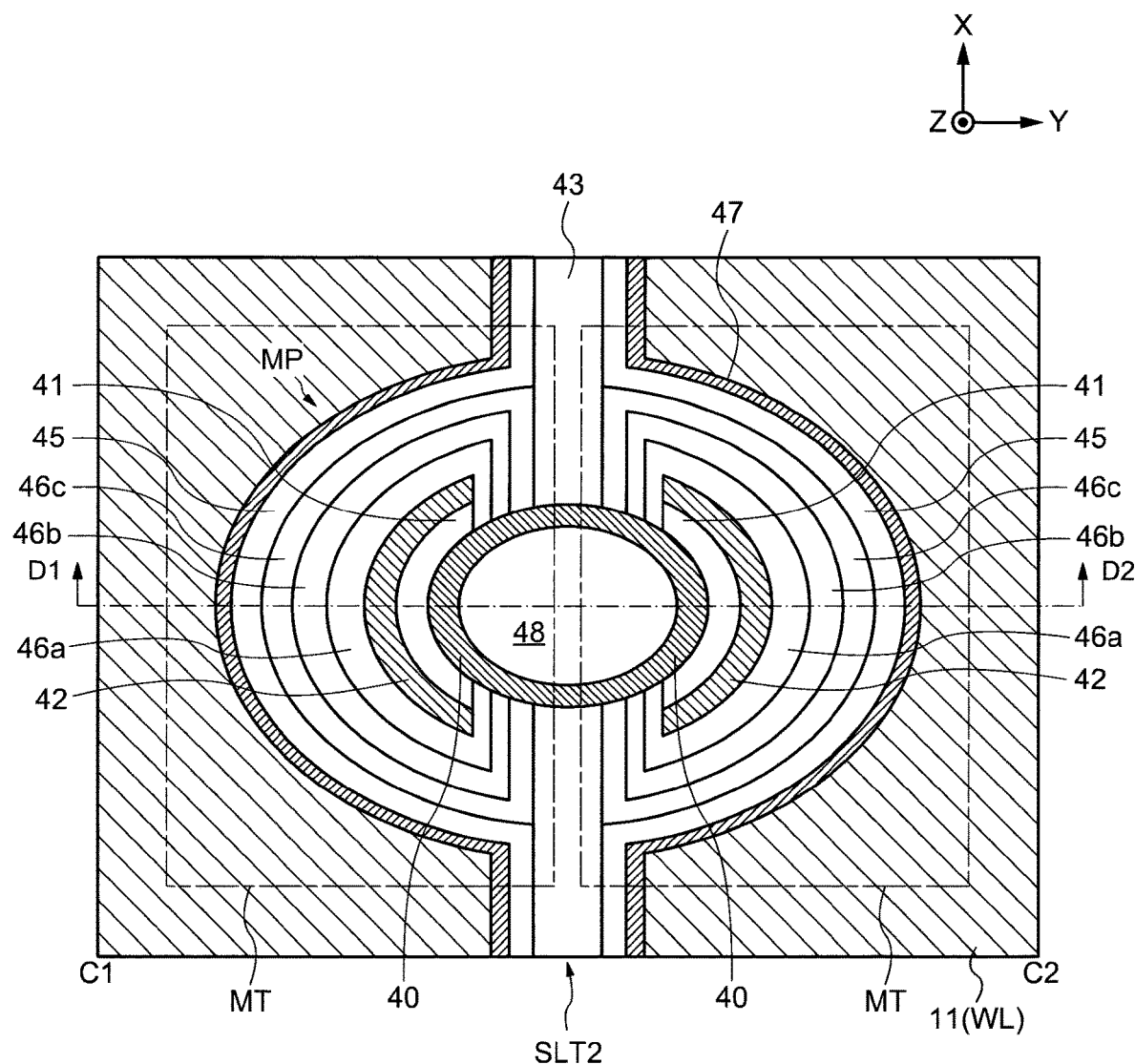
FIG. 8 is a cut-end view of a memory cell transistor shown in FIG. 5 along a line C1-C2 in a first example.
Figure 9:
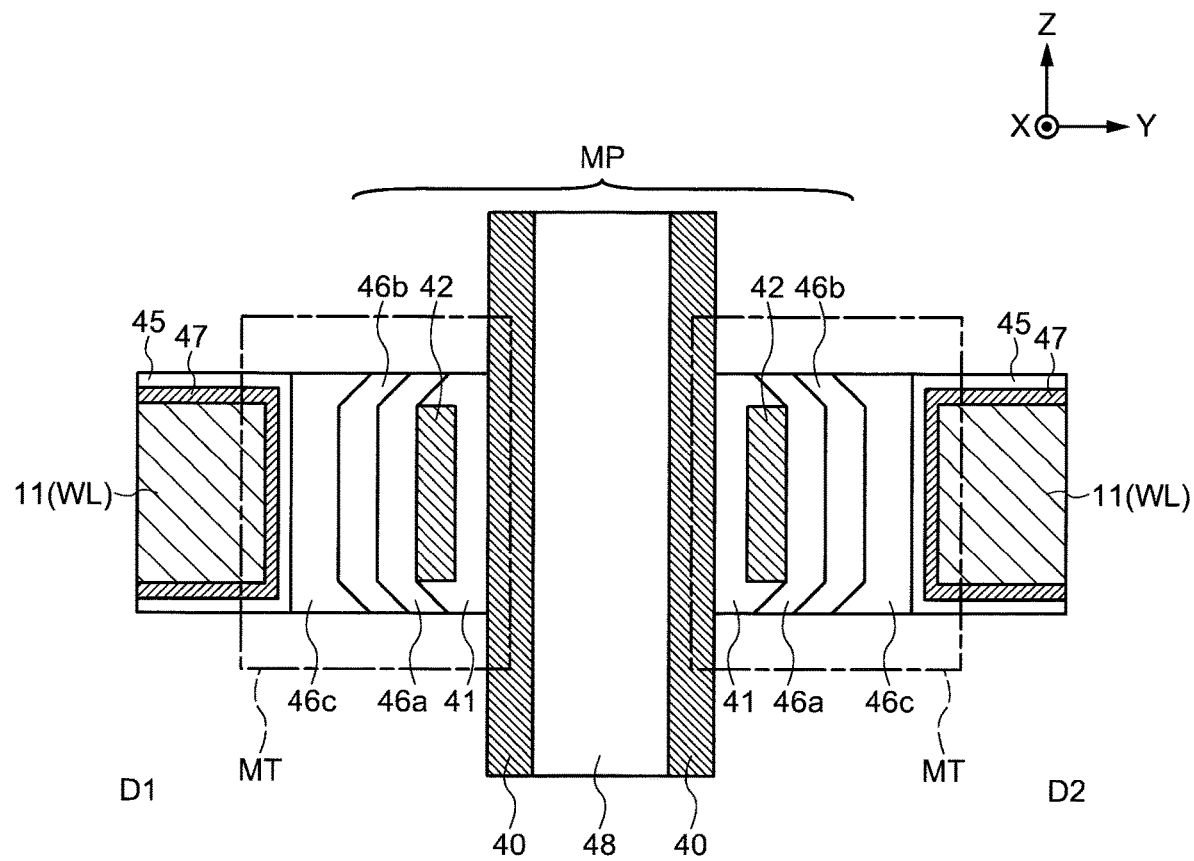
FIG. 9 is a cut-end view of a memory cell transistor shown in FIG. 8 along a line D1-D2.

1-6. Cut End Structure of Memory Pillar MP and Memory Cell Transistor MT 1-6-1. First Example In the structure of the memory cell transistor MT according to the first embodiment, the structure of the first example shown in FIG. 8 and FIG. 9 is used. FIG. 8 is a diagram showing a cut-end surface along a line C1-C2 of FIG. 5, and FIG. 9 is a diagram showing a cut-end surface along a line D1-D2 of the memory cell transistor MT shown in FIG. 8. FIG. 8 and FIG. 9 are cut-end views showing a region including the two memory cell transistors MT. In the first example, the charge storage layer included in the memory cell transistor MT is a conductive film. In the first example, the memory cell transistor MT is a floating gate type memory cell transistor MT. The structure of the memory cell transistor MT shown in the first example is not limited to the structure shown in FIG. 8 and FIG. 9. In the description of FIG. 8 and FIG. 9, descriptions of the same or similar configurations as those of FIG. 1 to FIG. 7 may be omitted.

As shown in FIG. 8 and FIG. 9, the memory pillar MP includes an insulating layer 48, an insulating layer 43, a semiconductor layer 40, an insulating layer 41, a conductive layer 42, and insulating layers 46a to 46c arranged along the direction Z. For example, the insulating layer 48 is formed using a silicon oxide film. The semiconductor layer 40 is arranged so as to surround the insulating layer 48. The semiconductor layer 40 functions as a region where a channel of the memory cell transistor MT is formed. For example, the semiconductor layer 40 is formed using a polysilicon layer. The semiconductor layer 40 is contiguously arranged between the memory cell transistors MT in the same memory pillar MP and is not isolated between the memory cell transistors MT. Therefore, the channels formed in each of the two memory cell transistors MT share part of the memory pillar MP.

The semiconductor layer 40 is contiguous between the two opposing memory cell transistors MT. Therefore, the channels formed in each of the two opposing memory cell transistors MT share part of the memory pillar MP. Specifically, in FIG. 8 and FIG. 9, in the left memory cell transistor MT (first memory cell) and the right memory cell transistor MT (third memory cell) facing each other, a channel (first channel) formed by the first memory cell and a channel (second channel) formed by the third memory cell share part of the memory pillar MP. In this case, "two channels share part of the memory pillar MP" means that the two channels are formed in the same memory pillar MP and the two channels partially overlap. In the first embodiment, the above configuration may be referred to as "two memory cell transistors MT share the channel" or "two memory cell transistors MT face each other".

The insulating layer 41 is arranged around the semiconductor layer 40 and functions as a gate insulating film of each memory cell transistor MT. The insulating layer 41 is separated into two regions in the XY plane shown in FIG. 8. Each of the insulating layer 41 separated into two regions functions as the gate insulating film of the two memory cell transistors MT in the same memory pillar MP. For example, the insulating layer 41 is formed using a stacked structure of a silicon oxide film and a silicon nitride film.

The conductive layer 42 is arranged around the insulating layer 41 and is separated into two regions along the direction Y by the insulating layer 43. Each of the conductive layer 42 separated into two regions functions as the charge storage layer of each of the two memory cell transistors MT. For example, the conductive layer 42 is formed using a polysilicon layer.

For example, the insulating layer 43 is formed using a silicon oxide film. The insulating layer 46a, the insulating layer 46b, and the insulating layer 46c are sequentially arranged around the conductive layer 42 from a side close to the conductive layer 42. For example, the insulating layer 46a and the insulating layer 46c are formed using a silicon oxide film, and the insulating layer 46b is formed using a silicon nitride film. The insulating layer 46a, the insulating layer 46b, and the insulating layer 46c function as a block insulating film of the memory cell transistor MT. The insulating layer 46a, the insulating layer 46b, and the insulating layer 46c are separated into two regions along the direction Y. The insulating layer 43 is arranged between the insulating layer 46c separated into two regions. In addition, the insulating layer 43 is embedded in the slit SLT2. For example, the insulating layer 43 is formed using a silicon oxide film.

For example, an AlO layer 45 is arranged around the first example of the memory pillar MP according to the first embodiment. For example, a barrier metal layer 47 is arranged around the AlO layer 45. For example, the barrier metal layer 47 is formed using a TiN film. The wiring layer 11 functioning as the word line WL is arranged around the barrier metal layer 47. For example, the wiring layer 11 of the memory pillar MP according to the first embodiment is formed using a film made of tungsten.

In the configuration of the memory cell transistor MT shown in FIG. 8 and FIG. 9, two memory cell transistors MT are arranged in one memory pillar MP along the direction Y. The select transistors ST1 and ST2 have the same configuration as that of the memory cell transistor MT. Although not shown, an insulating layer (not shown) may be arranged between the memory cell transistors MT adjacent to each other in the direction Z. In this case, the conductive layer 42 is insulated for each memory cell transistor MT by the insulating layer, the insulating layer 43, and insulating layer 46 arranged between the memory cell transistors adjacent to each other in the direction Z.

1-6-2. Second Example

Figure 10:
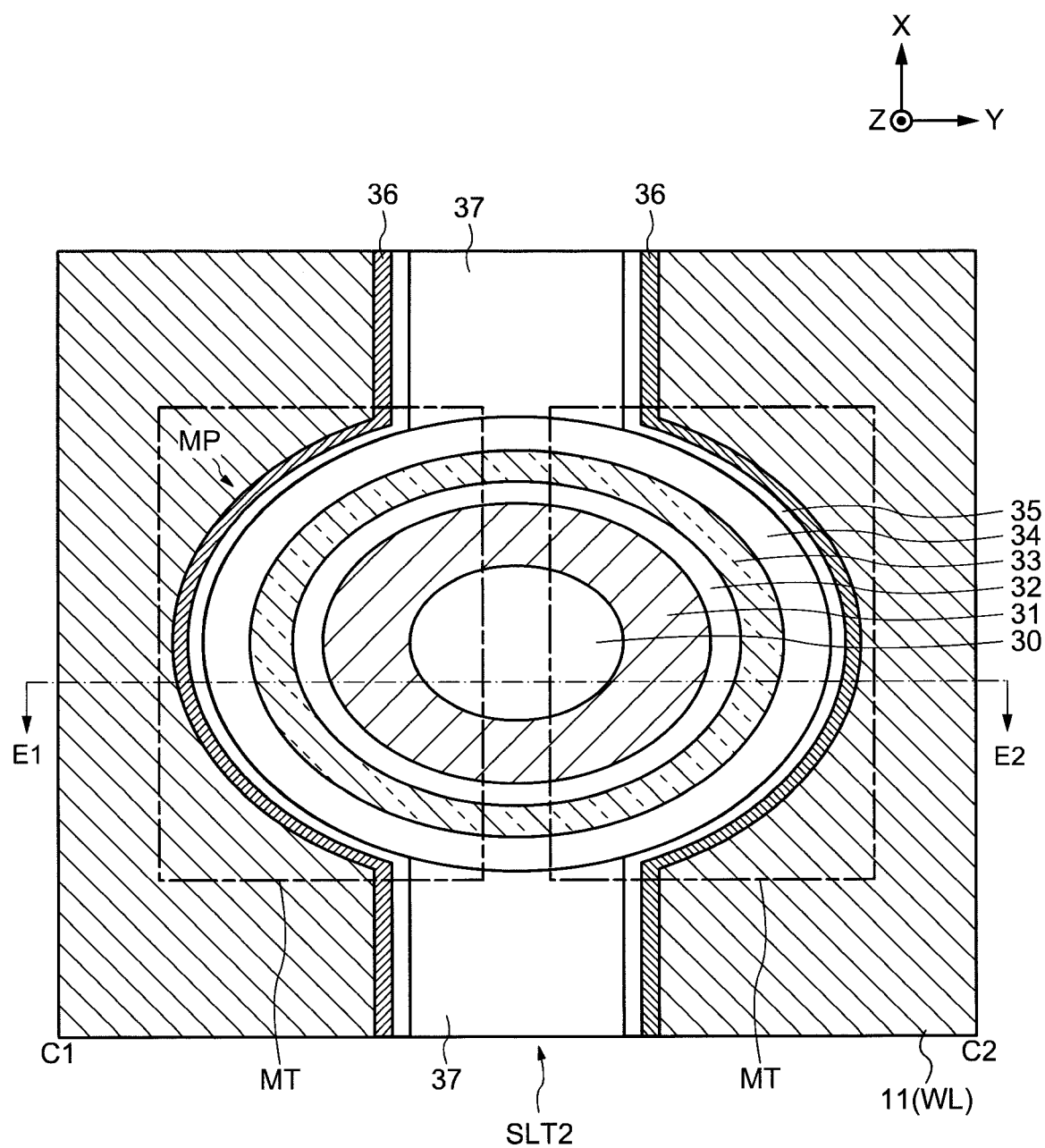
FIG. 10 is a cut-end view of a memory cell transistor shown in FIG. 5 along a line C1-C2 in a second example.
Figure 11:
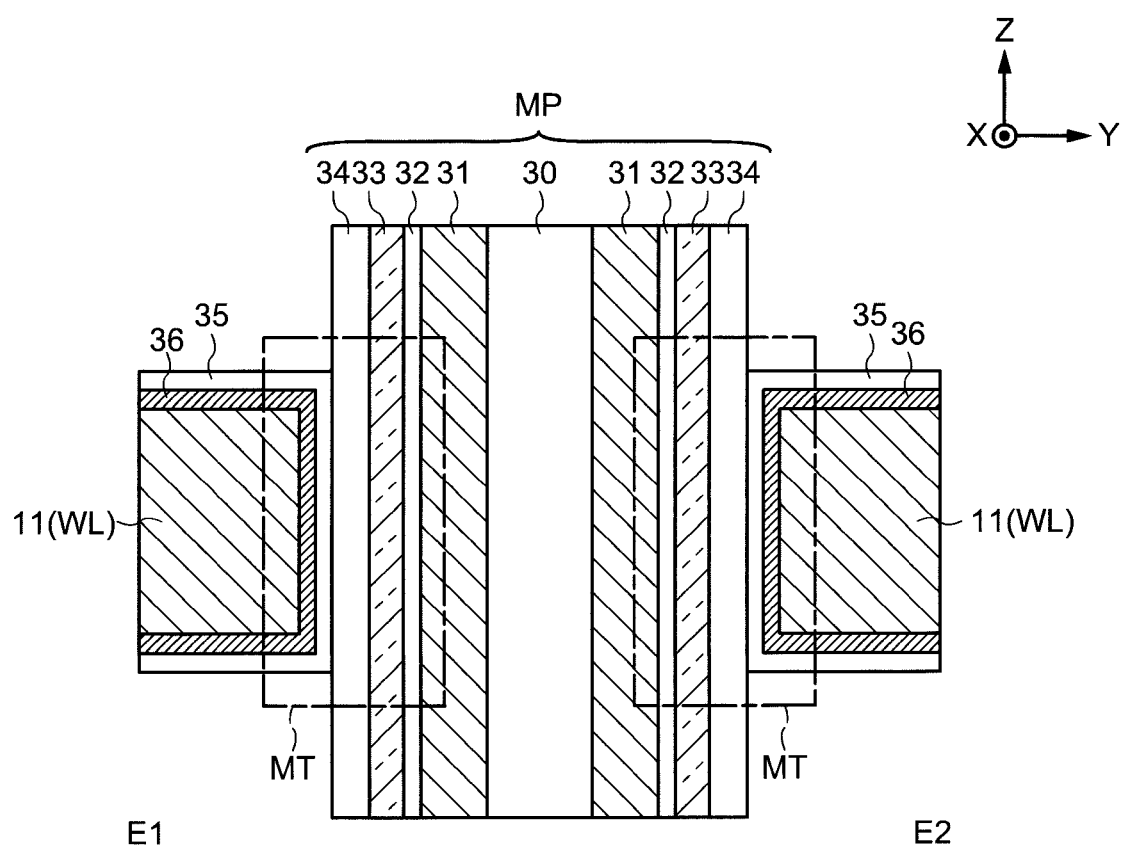
FIG. 11 is a cut-end view of a memory cell transistor shown in FIG. 10 along a line E1-E2.

In the memory cell transistor MT according to the first embodiment, the structure of the second example shown in FIG. 10 and FIG. 11 may be used. FIG. 10 is a diagram showing a cut-end surface along a line C1-C2 of FIG. 5, and FIG. 11 is a diagram showing an E1-E2 cut-end surface of the memory cell transistor MT shown in FIG. 10. FIG. 10 and FIG. 11 are cut-end views of a region including the two memory cell transistors MT. In the second example, the charge storage layer included in the memory cell transistor MT is an insulating film. In the second example, the memory cell transistor MT is a MONOS type memory cell transistor MT. The structure of the memory cell transistor MT shown in the second example is not limited to the structure shown in FIG. 10 and FIG. 11. In the description of FIG. 10 and FIG. 11, descriptions of the same or similar configurations as those of FIG. 1 to FIG. 7 may be omitted.

As shown in FIG. 10 and FIG. 11, the memory pillar MP includes an insulating layer 30, a semiconductor layer 31, and insulating layers 32 to 34 arranged along the direction Z. For example, the insulating layer 30 is formed using a silicon oxide film. The semiconductor layer 31 is arranged so as to surround the periphery of the insulating layer 30, and functions as a region where the channel of the memory cell transistor MT is formed. For example, the semiconductor layer 31 is formed using a polysilicon layer. The semiconductor layer 31 is not separated between the memory cell transistors MT in the same memory pillar MP, and is contiguously arranged. Therefore, the channels formed in each of the two memory cell transistors MT share part of the memory pillar MP.

The insulating layer 32 is arranged so as to surround the periphery of the semiconductor layer 31 and functions as the gate insulating film of the memory cell transistor MT. For example, the insulating layer 32 is formed using a stacked structure of a silicon oxide film and a silicon nitride film. The insulating layer 33 is arranged so as to surround the periphery of the semiconductor layer 31, and functions as the charge storage layer of the memory cell transistor MT. For example, the insulating layer 33 is formed using a silicon nitride film. The insulating layer 34 is arranged so as to surround the periphery of the insulating layer 33, and functions as the block insulating film of the memory cell transistor MT. For example, the insulating layer 34 is formed using a silicon oxide film. An insulating layer 37 is embedded in the slit SLT2 except for the memory pillar MP portion. For example, the insulating layer 37 is formed using a silicon oxide film.

For example, an AlO layer 35 is arranged around the memory pillar MP according to the second example. For example, a barrier metal layer 36 is arranged around the AlO layer 35. For example, the barrier metal layer 36 is formed using a TiN film. The wiring layer 11 functioning as the word line WL is arranged around the barrier metal layer 36. For example, the wiring layer 11 is formed using a film made of tungsten.

Similar to the first example, one memory pillar MP according to the second example includes two memory cell transistors MT along the direction Y. Similar to one memory pillar MP, the select transistors ST1 and ST2 include two transistors along the direction Y.

1-7. Equivalent Circuit of String

Figure 12:
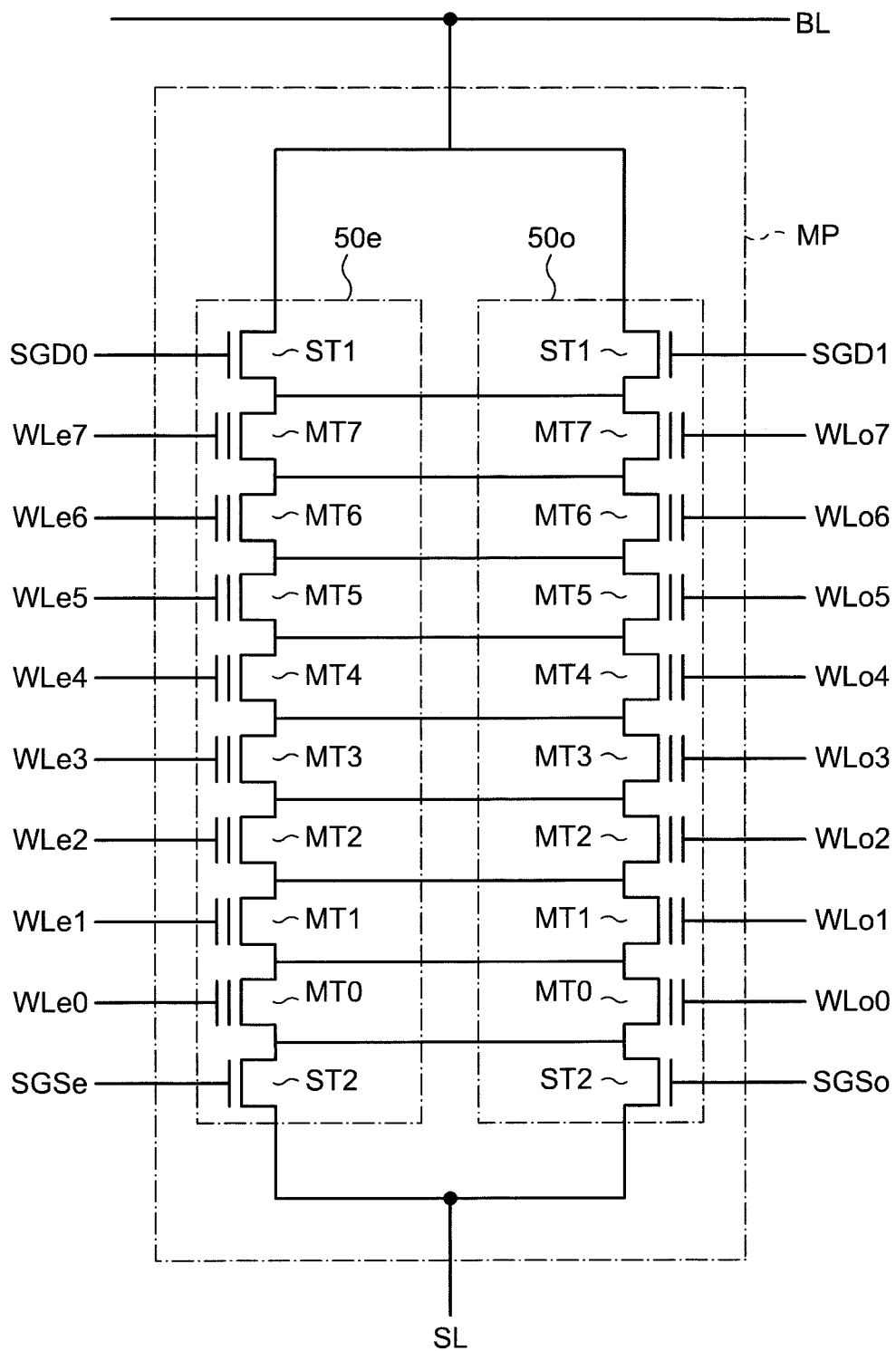
FIG. 12 is a diagram showing an equivalent circuit of adjacent strings in a semiconductor memory device according to the first embodiment.

FIG. 12 is an equivalent circuit diagram of strings adjacent to each other in the semiconductor memory device 1 according to the first embodiment. The equivalent circuit diagram of the strings according to the first embodiment is not limited to the equivalent circuit diagram shown in FIG.

12. In the description of FIG. 12, descriptions of the same or similar configurations as those of FIG. 1 to FIG. 11 may be omitted.

As shown in FIG. 12, the two NAND strings 50e and 50o are formed in one memory pillar MP. Each of the NAND strings 50e and 50o includes the select transistor ST1, the memory cell transistors MT0 to MT7, and the select transistor ST2 electrically connected in series. The NAND string 50e and the NAND string 50o are arranged to face each other. Therefore, the select transistor ST1, the memory cell transistors MT0 to MT7, and the select transistor ST2 included in the NAND string 50e and the select transistor ST1, the memory cell transistors MT0 to MT7, and the select transistor ST2 included in the NAND string 50o are arranged so as to face each other in a one-to-one manner. Specifically, the select transistor ST1 included in the NAND string 50e and the select transistor ST1 included in the NAND string 50o are arranged so as to face each other, the memory cell transistors MT0 to MT7 included in the NAND string 50e and the memory cell transistors MT0 to MT7 included in the NAND string 50o are arranged so as to face each other in a one-to-one manner, and the select transistor ST2 included in the NAND string 50e and the select transistor ST2 included in the NAND string 50o are arranged so as to face each other.

In the following explanation, mainly, an example including two memory pillars MP of the first memory pillar MP (for example, MP4 of FIG. 4) and the second memory pillar MP (for example, MP0 of FIG. 4) adjacent to the first memory pillar MP will be described. The first memory pillar MP may be referred to as a "first semiconductor pillar", the NAND string 50e arranged in the first memory pillar MP may be referred to as a "first string", the memory cell transistors MT0 to MT7 included in the first string may be referred to as a "first memory cell", a side arranged with the first string may be referred to as a "first side", the NAND string 50o arranged in the first memory pillar MP may be referred to as a "third string", the memory cell transistors MT0 to MT7 included in the third string may be referred to as a "third memory cell", and a side arranged with the third string may be referred to as a "second side". Similar to the first memory pillar MP, the second memory pillar MP may be referred to as a "second semiconductor pillar", the NAND string 50e arranged in the second memory pillar MP may be referred to as a "second string", the memory cell transistors MT0 to MT7 included in the second string may be referred to as a "second memory cell", a side arranged with the second string may be referred to as a "first side", the NAND string 50o arranged in the second memory pillar MP may be referred to as a "fourth string", the memory cell transistor MT0 included in the fourth string may be referred to as a "fourth memory cell", and a side arranged with the fourth string may be referred to as a "second side". In addition, the second side is opposite the first side with respect to the memory pillar MP.

For example, the select transistors ST1 of the NAND strings 50e arranged in the first memory pillar MP and the second memory pillar MP are connected to the common select gate lines SGD0. For example, the select transistors ST1 of the NAND strings 50o arranged in the first memory pillar MP and the second memory pillar MP are connected to the common select gate line SGD1. The memory cell transistors MT0 to MT7 of the NAND strings 50e arranged in the first memory pillar MP and the second memory pillar MP are connected to the common word lines WLe0 to WLe7. The memory cell transistors MT0 to MT7 of the NAND strings 50o arranged in the first memory pillar MP and the second memory pillar MP are connected to the same word lines WLo0 to Wlo7. For example, the select transistors ST2 of the NAND strings 50e arranged in the first memory pillar MP and the second memory pillar MP are connected to the common even select gate line SGSe. For example, the select transistors ST2 of the NAND strings 50o arranged in the first memory pillar MP and the second memory pillar MP are connected to the common odd select gate line SGSo.

The common word lines WLe0 to WLe7 connected to the memory cell transistors MT0 to MT7 (the first memory cell and the second memory cell) included in the NAND strings 50e (the first string and the second string) arranged in the first memory pillar MP and the second memory pillar MP may be referred to as "first word lines", and the word lines WLo0 to WLo7 connected to the memory cell transistors MT0 to MT7 (the third memory cell and the fourth memory cell) included in the NAND strings 50o arranged in the first memory pillar MP and the second memory pillar MP may be referred to as "second word lines".

In addition, a portion of the first memory cell where a gate electrode and the first word line are connected is referred to as a first portion, a portion of the second memory cell where a gate electrode and the first word line are connected is referred to as a second portion, a portion of the third memory cell where a gate electrode and the second word line are connected is referred to as a third portion, and a portion of the fourth memory cell where a gate electrode and the second word line WL are connected is referred to as a fourth portion. The first portion and the second portion of the first word line are both arranged on the first side of the memory string, and the third portion and the fourth portion of the second word line are both arranged on the second side of the memory string. Each of the first portion to the fourth portion indicates portions connecting the word line and the memory cell, and may be arranged in the word line, may be arranged in the memory cell, or may be arranged in both the word line and the memory cell. In the present disclosure, the gate electrode may be simply referred to as a gate.

In the NAND strings 50e and 50o, the sources and drains of the opposing select transistor ST1 are electrically connected to each other, the sources and drains of the opposing memory cell transistors MT0 to MT7 are electrically connected to each other, and the sources and drains of the opposing select transistor ST2 are electrically connected to each other. The above-described electrical connection is caused by the channel formed in the opposing transistors sharing part of the memory pillar MP.

The two NAND strings 50e and 50o in the same memory pillar MP are connected to the same bit line BL and the same source-line SL.

1-8. Arrangement of Memory Cell Array

Figure 13:
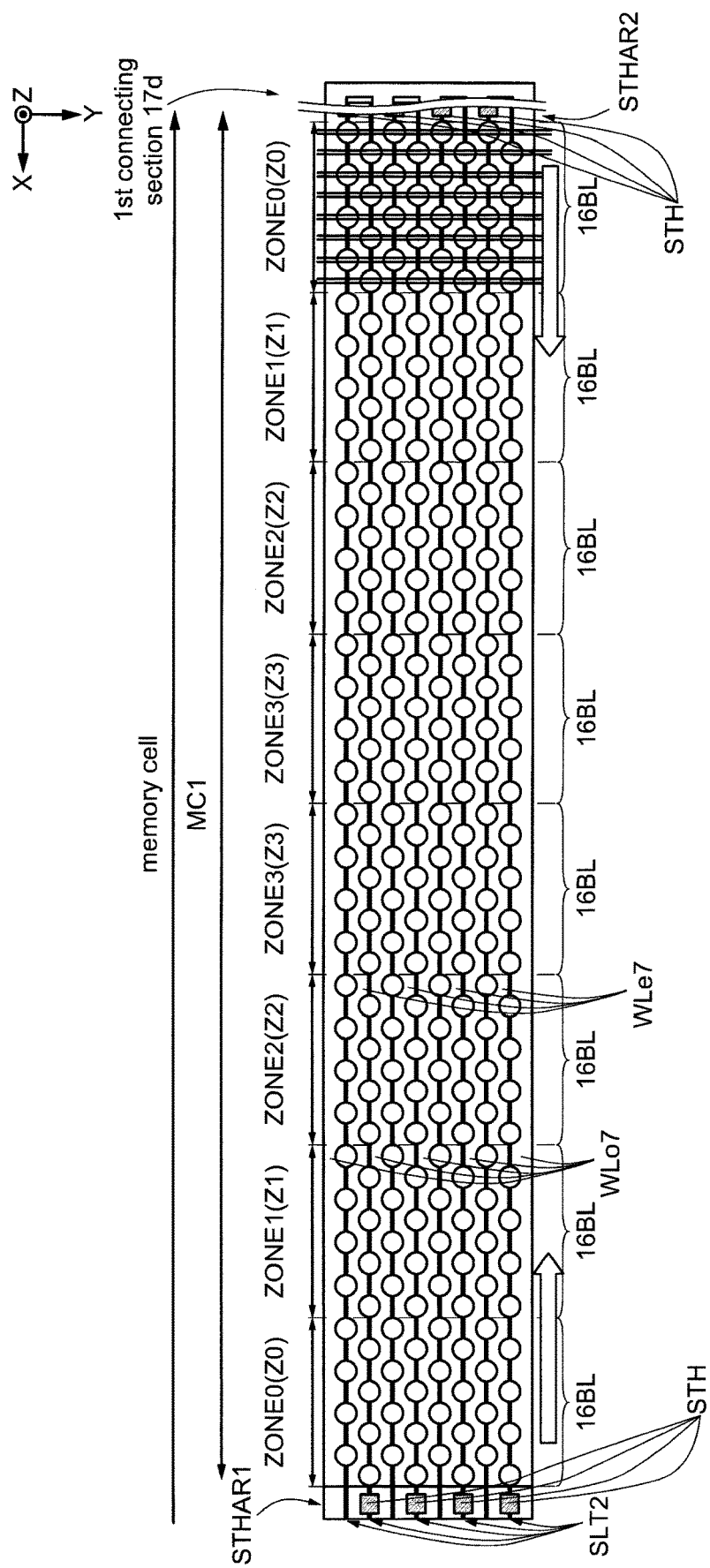
FIG. 13 is a diagram showing an arrangement of a word line, a memory pillar, and a replacement hole according to the first embodiment.
Figure 14:
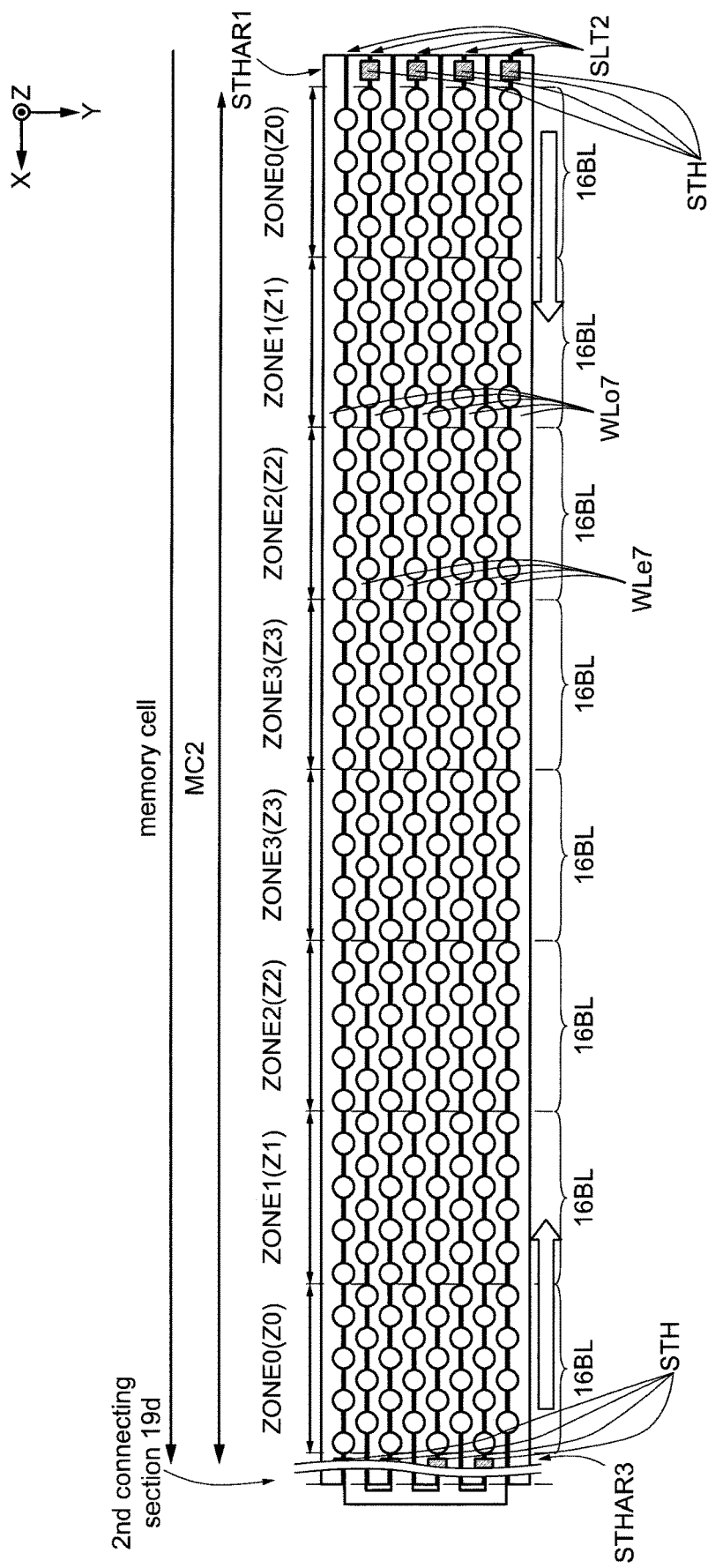
FIG. 14 is a diagram showing an arrangement of a word line, a memory pillar, and a replacement hole according to the first embodiment.
Figure 15:
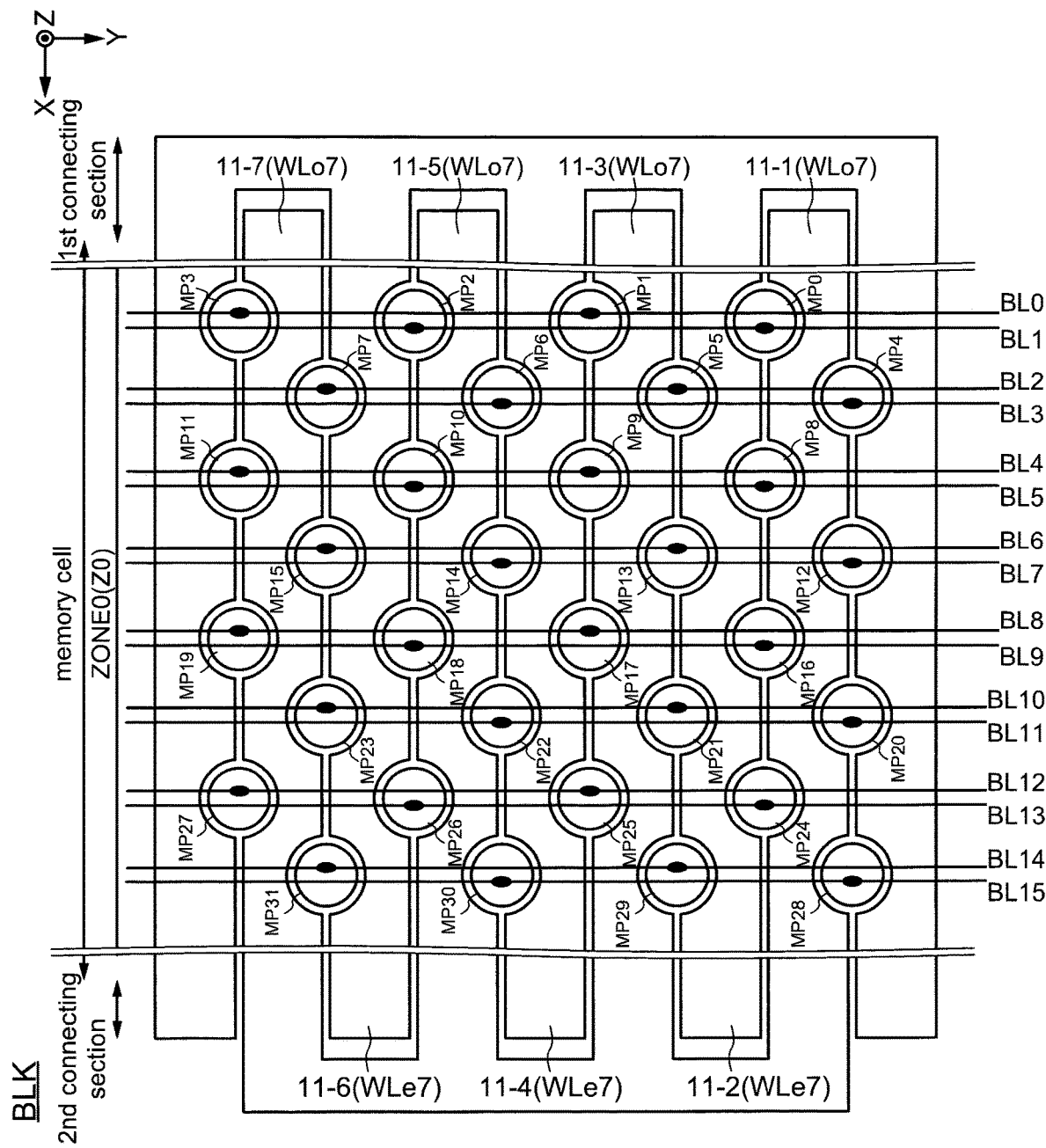
FIG. 15 is a diagram showing an arrangement of a word line, a memory pillar, and a replacement hole according to the first embodiment.

The arrangement of the memory cell array according to the first embodiment and a method for forming the word line WL will be mainly described with reference to FIG. 13 to FIG. 15. FIG. 13 to FIG. 15 are diagrams showing an arrangement of the word line WL, the memory pillar MP, and a replacement hole STH according to the first embodiment. A configuration of the memory cell array 21 according to the first embodiment is not limited to the configuration shown in FIG. 13 to FIG. 15. In the description of FIG. 13 to FIG. 15, descriptions of the same or similar configurations as those of FIG. 1 to FIG. 12 may be omitted.

As shown in FIG. 13, FIG. 14, or FIG. 15, for example, the memory cell unit includes a memory cell unit MC1 and a memory cell unit MC2. The memory cell unit MC1 shown in FIG. 13 is arranged parallel to or substantially parallel to the direction X and adjacent to the memory cell unit MC2 shown in FIG. 14. In addition, the memory cell unit MC1 and the memory cell unit MC2 are arranged symmetrically or substantially symmetrically with respect to a replacement hole portion STHAR1 in the direction X. That is, the memory cell unit MC2 is arranged on the extension of a line drawn in the direction X with respect to the memory cell unit MC1.

In addition, a replacement hole portion STHAR2 is arranged on the opposite side parallel to the direction X on the side where the replacement hole portion STHAR1 is arranged with respect to the memory cell unit MC1. The replacement hole portion STHAR3 is arranged on the opposite side parallel to the direction X on the side where the replacement hole portion STHAR1 is arranged with respect to the memory cell unit MC2. That is, the memory cell unit MC1 is arranged between the replacement hole portion STHAR1 and the replacement hole portion STHAR2, and the memory cell unit MC2 is arranged between the replacement hole portion STHAR1 and the replacement hole portion STHAR3. The replacement hole portion STHAR1, the replacement hole portion STHAR2, and the replacement hole portion STHAR3 include a plurality of replacement holes STH.

In addition, the memory cell unit may include the first connecting section 17d (see FIG. 13), the second connecting section 19d (see FIG. 14), the replacement hole portion STHAR1 (see FIG. 13 and FIG. 14), and the replacement hole portion STHAR2 (see FIG. 13 and FIG. 14).

In FIG. 4, 8 common bit lines BL (bit lines BL0 to BL7) are exemplified, and in FIG. 15, 16 common bit lines BL (bit lines BL0 to BL15) are exemplified. For example, the number of bit lines corresponding to the data length of 4 kByte, 8 kByte, or 16 kByte may be arranged, and the number of bit lines is not particularly limited. In addition, memory pillars MP16 to MP31 connected to the bit lines BL8 to BL15 have the same configuration and function as the memory pillars MP0 to MP15 connected to the bit lines BL0 to BL7. The memory cell transistors MT7 arranged in each memory pillar of the memory pillars MP16 to MP31 are electrically connected to the wiring layers 11-1 to 11-7 functioning as the corresponding word lines WL7 (WLo7 and WLe7). A configuration and functions related to the memory pillars MP16 to MP31 connected to the bit lines BL8 to BL15 shown in FIG. 15 are the same as the configuration and functions related to the memory pillars MP0 to MP15 connected to the bit lines BL0 to BL7 described with reference to FIG. 3 and FIG. 4 and the like. In this case, detailed explanations of the memory pillars MP16 to MP31 connected to the bit lines BL8 to BL15 shown in FIG. 15 will be omitted.

Returning to FIG. 13, the arrangement of the word line, the memory pillar, and the replacement hole in the memory cell unit MC1 will be described. The memory cell unit MC1 shown in FIG. 13 corresponds to part of the block BLK. The memory cell unit MC1 shown in FIG. 13 includes 8 zones ZONE. Each zone ZONE is a region including 16 bit lines BL as shown in FIG. 15. That is, each zone ZONE of the memory cell unit MC1 shown in FIG. 13 includes 32 memory pillars MP connected to 16 bit lines BL as shown in FIG. 15. Therefore, the memory cell unit MC1 shown in FIG. 13 includes 256 memory pillars MP connected to 128 bit lines BL. The zone having 16 bit lines BL may be referred to as a zone 16BL. Each zone ZONE may be referred to as a memory cell group because it includes a plurality of memory cells, and each zone ZONE may be respectively distinguished by being referred to as a first memory cell group, a second memory cell group, a third memory cell group, a fourth memory cell group, . . . . In addition, the memory cell unit MC1 may include more than 8 zones ZONE, and each zone ZONE may include more than 16 bit lines BL.

The memory cell unit MC2 shown in FIG. 14 has the same configuration and function as the memory cell unit MC1 shown in FIG. 13, and corresponds to other parts of the block BLK. Since the memory cell unit MC2 has the same configuration and function as the memory cell unit MC1, the configuration and function of the memory cell unit MC1 will be mainly described in the following explanation. In addition, more memory cell units may be included in the block BLK in addition to the memory cell unit MC1 and the memory cell unit MC2.

The replacement hole STH is a hole for forming the word line WL including the word lines WL7 (WLo7 and WLe7). In the memory cell unit shown in FIG. 13 and FIG. 14, the replacement hole STH is arranged at a constant interval in a direction in which the word line WL extends (parallel to or substantially parallel to the direction X). For example, in the memory cell unit shown in FIG. 13 and FIG. 14, the replacement hole STH is arranged every 64 memory pillars MP connected to 128 bit lines BL. The replacement hole STH may be referred to as a "first hole" or a "second hole".

In this case, an example of a method for forming the word line WL including the word lines WL7 (WLo7 and WLe7) will be briefly described with reference to FIG. 9. In a stage before forming the word line WL, for example, a stacked film of nitride is arranged at a position where the AlO layer 45, the barrier metal layer 47, and the wiring layer 11 shown in FIG. 9 are arranged. The AlO layer 45, the barrier metal layer 47, and the wiring layer 11 are formed after the stacked film of nitride is removed utilizing the replacement hole STH. That is, the stacked film of nitride is replaced with the AlO layer 45, the barrier metal layer 47, and the wiring layer 11. Known techniques used in the technical field of a semiconductor memory device can be applied to the method for forming the word line WL described herein.

In forming the word line WL, a thickness of the insulating layer 46c (thickness in the direction Y) is considered to become thinner the closer it is to the replacement hole STH when the stacked film of nitride is removed. That is, the thickness of the insulating layer 46c is considered to be different for each memory cell transistor MT. Specifically, the closer the memory cell transistor STH is to the replacement hole MT, the thickness of the insulating layer 46c becomes thinner, and the farther the memory cell transistor MT is from the replacement hole STH, the thickness of the insulating layer 46c is considered to become thicker. As a result, even in the same word line WL, it is considered that the further away from the replacement hole STH, the lower the voltage supplied, and the further the memory cell transistor MT from the replacement hole STH, the lower the voltage supplied by the word line WL. In other words, the voltage supplied to the memory cell transistor MT changes depending on the distance from the replacement hole STH, and the voltage supplied to the memory cell transistor MT varies depending on the distance from the replacement hole STH.

For example, in the program operation, the further the memory cell transistor MT is away from the replacement hole STH, the effectively lower the voltage (program voltage) for programming becomes. The fact that the voltage supplied to the memory cell transistor MT varies depending on the distance from the replacement hole STH means that, in other words, the program voltage varies for each memory cell transistor MT. As a result, a problem arises in that the program operation for the memory cell transistor MT varies. In addition, when the voltage supplied to the memory cell transistor MT is low, a problem arises in that the time for the program operation increases.

In the semiconductor storage device 1 of the present disclosure, as shown in FIG. 13, zone ZONE3 (Z3), zone ZONE2 (Z2), zone ZONE1 (Z1), and zone ZONE0 (Z0) are allocated for each zone 16BL in order of distance from the replacement hole STH. Specifically, the zone 16BL farthest from the replacement hole portion STHAR1 is allocated to the zone Z3, the second farthest zone 16BL is allocated to the zone Z2, the subsequent zone 16BL is allocated to the zone Z1, and the nearest zone 16BL is allocated to the zone Z0. Similar to the replacement hole portion STHAR1, the replacement hole portion STHAR2 is also allocated to the zones Z3 to Z0 for each zone 16BL in the order of distance from the replacement hole portion STHAR2. That is, two zones 16BL are allocated to each of the zones Z0 to Z3 in order of distance from the replacement hole STH. The zone Z3 farthest from the replacement hole portion STHAR1 and the zone Z3 farthest from the replacement hole portion STHAR2 are adjacent to each other.

In the semiconductor memory device 1 of the present disclosure, the memory cell unit is allocated for each zone Z3 to Z0. Allocating the memory cell unit for each zone Z3 to Z0 makes it possible to adjust an effective program voltage supplied to the memory cell transistor MT for each zone Z3 to Z0. In other words, in the semiconductor memory device 1 of the present disclosure, variations in the program operation of the memory cell transistor MT (program variations in the memory cell) can be suppressed. In addition, in the semiconductor memory device 1 according to the present disclosure, variations in the program operation of the memory cell transistor MT are suppressed, so that the time of the program operation can be suppressed from increasing.

1-9. Overview of Program Operation

A write operation method of the semiconductor memory device 1 according to the first embodiment will be described. A state in which the select gate line SGD is selected will be described with reference to FIG. 3 and FIG. 4. In the case where any one of the select gate lines SGD0 to SGD3 is selected, a voltage for turning on the select transistor ST1 is supplied to one wiring layer 10-0 to 10-3 corresponding to each select gate line. For example, in one zone ZONE shown in FIG. 15, when the wiring layer 10-1 corresponding to the select gate line SGD1 is selected, the eight select transistors ST1 arranged in the memory pillars MP0, MP1, MP4, MP5, MP8, MP9, MP12 and MP13 are turned on. Similarly, in other zones ZONE, the select transistor ST1 arranged in the memory pillars arranged at the corresponding positions are turned on. As a result, the memory cell transistor MT belonging to the memory pillar corresponding to the select gate line SGD1 is selected in the block BLK. The memory group MG is formed by the memory cell transistors MT selected by each select gate line. In addition, one page is formed by the memory cell transistor MT corresponding to the selected word line WL of the memory group MG. Since the operation when the wiring layer other than the wiring layer 10-1 is selected is the same as that described above, details will not be described here. Therefore, the block BLK includes the memory group MG corresponding to the number of select gate lines SGD, and the memory group MG includes the page corresponding to the number of layers of the word line WL.

For example, a TLC method can be applied to a write method of the memory cell transistor MT. The plurality of memory cell transistors MT to which the TLC method is applied form eight threshold distributions (write levels). For example, the eight threshold distributions are referred to as "ER" level, "A" level, "B" level, "C" level, "D" level, "E" level, "F" level, and "G" level in order from the lower of the threshold voltage. Different 3-bit data is assigned to the "ER" level, "A" level, "B" level, "C" level, "D" level, "E" level, "F" level, and "G" level.

The semiconductor memory device 1 repeatedly executes a program loop in the write operation. For example, the program loop includes the program operation and a verify operation. The program operation is an operation of injecting electrons into the charge storage layer in the selected memory cell transistor MT to increase the threshold voltage of the selected memory cell transistor MT. Alternatively, the program operation is an operation of maintaining the threshold voltage of the selected memory cell transistor MT by prohibiting the injection of electrons into the charge storage layer. The verify operation is an operation of checking whether the threshold voltage of the selected memory cell transistor MT has reached the target level by performing a read operation using a verify voltage following the program operation. The selected memory cell transistor MT whose threshold voltage has reached the target level is then prohibited from writing.

In the semiconductor memory device 1, the threshold voltage of the selected memory cell transistor MT increases to the target level by repeatedly executing the program loop including the program operation and the verify operation as described above.

Electrons accumulated in the charge storage layer may be accumulated in an unstable state. Therefore, electrons accumulated in the charge storage layer of the memory cell transistor MT may escape from the charge storage layer as time elapses from the time when the above-described program operation is completed. When electrons escape from the charge storage layer, the threshold voltage of the memory cell transistor MT decreases. Therefore, the read operation executed after the completion of the write operation, is performed using a read voltage lower than the verify voltage in order to cope with such a decrease in the threshold voltage of the memory cell transistor that may occur over time. The read operation may include the verify operation. An example of the operation described below is an example of the program operation of the semiconductor memory device 1. The write operation of the semiconductor memory device 1 is included in the write operation method.

In the semiconductor memory device 1 according to the first embodiment, in order to adjust the effective program voltage supplied to the memory cell transistor MT, a voltage SRCGND supplied to a node SRC of the sense amplifier unit SAU (see FIG. 19) is controlled for each zone Z3 to Z0. Although details will be described later, since the sense amplifier unit SAU is electrically connected to the bit line BL, the voltage supplied to the bit line BL is controlled for each zone Z3 to Z0 by controlling the voltage SRCGND supplied to the node Z3 to Z0. As a result, the effective program voltage supplied to the memory cell transistor MT can be adjusted for each zone Z3 to Z0.

1-9-1. Example of Configuration of Sense Amplifier and Driver Set

Figure 16:
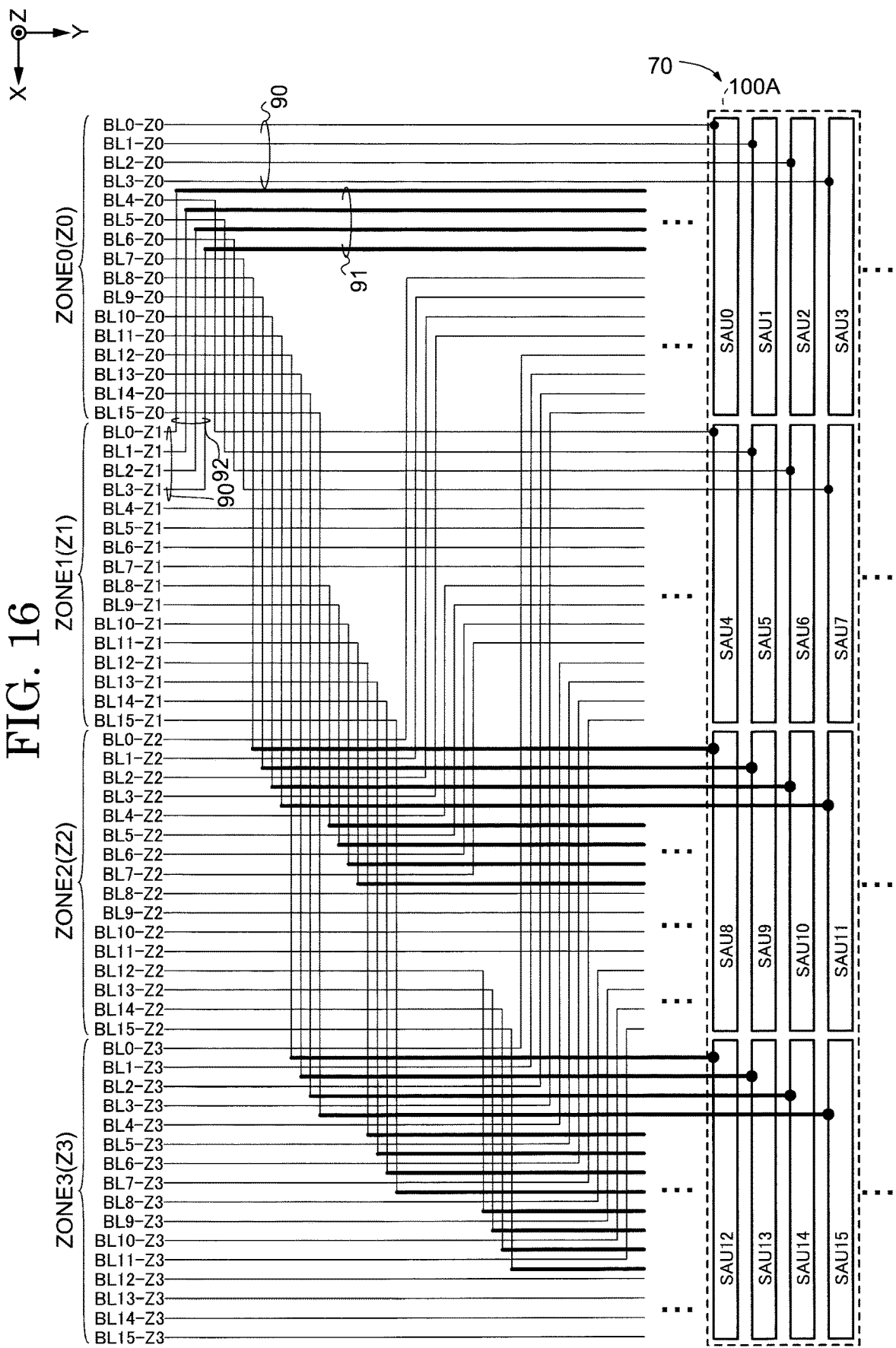
FIG. 16 is a block diagram showing an example of a configuration of a sense amplifier according to the first embodiment.
Figure 17:
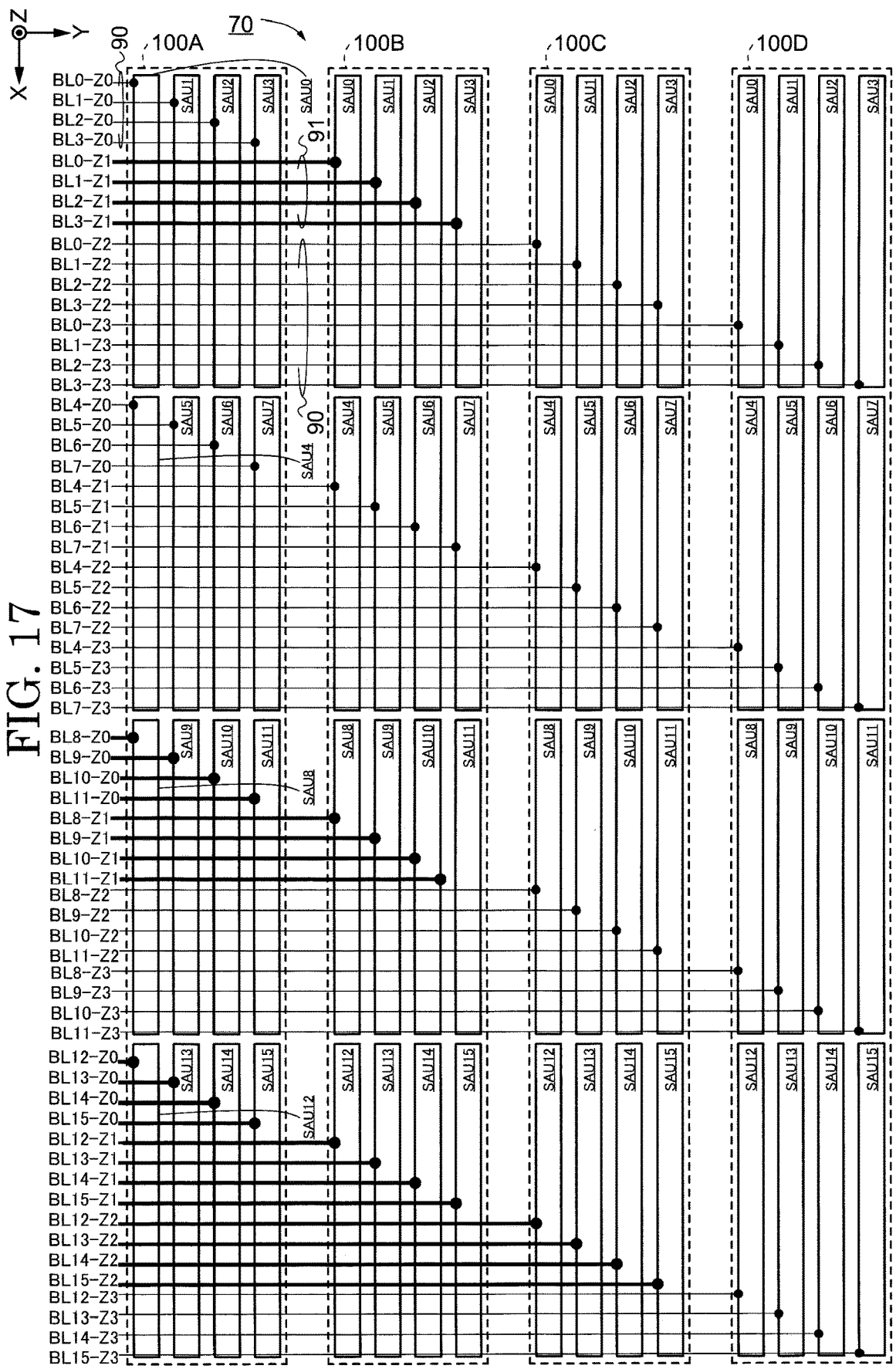
FIG. 17 is a block diagram showing an example of a configuration of a sense amplifier according to the first embodiment.
Figure 18:
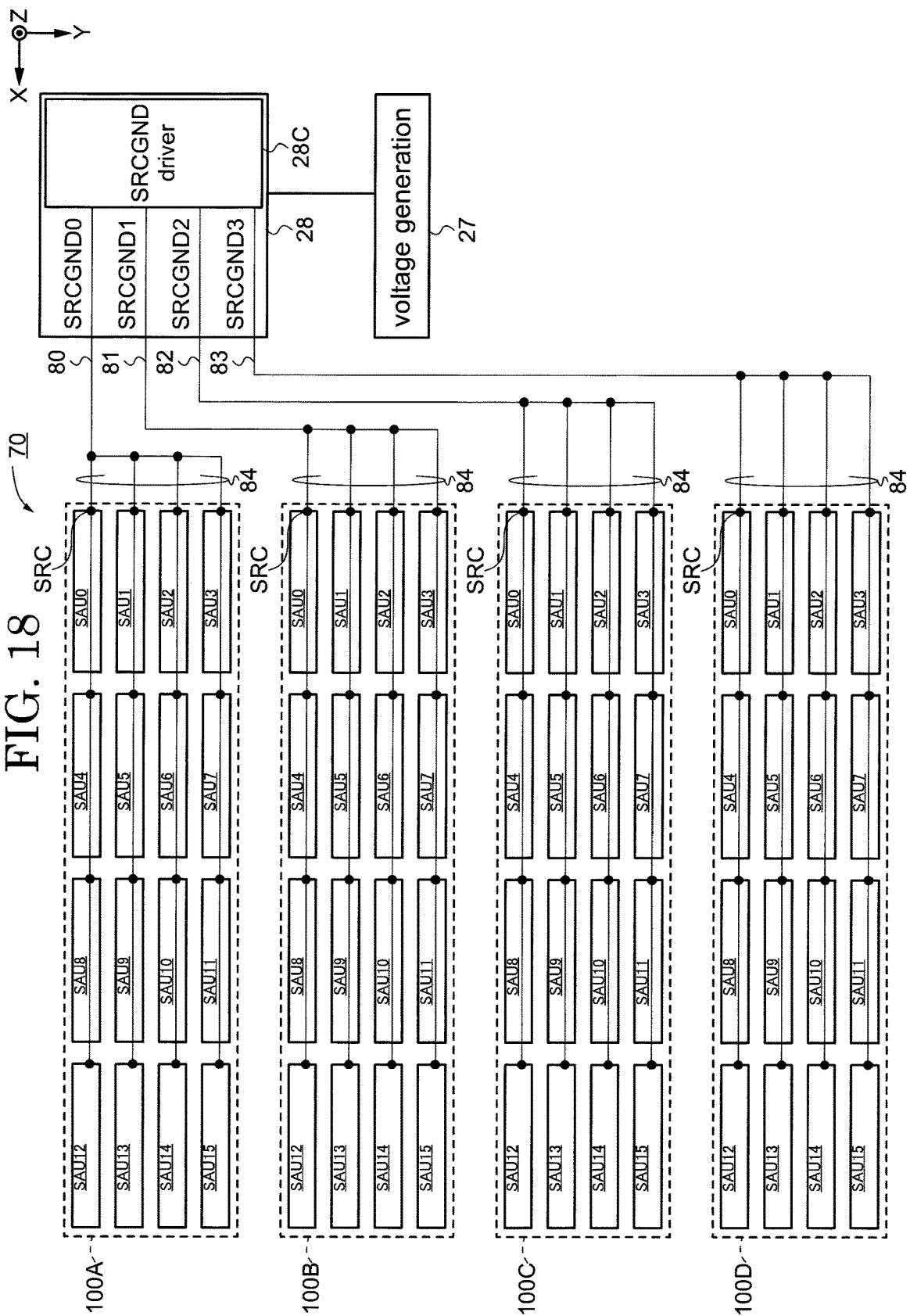
FIG. 18 is a block diagram showing an example of a configuration of a driver set according to the first embodiment.

An example of a configuration of the sense amplifier module 70 and the driver set 28 included in the semiconductor memory device 1 according to the first embodiment will be described with reference to FIG. 16 to FIG. 18. FIG. 16 is a block diagram showing an example of a configuration of the sense amplifier module 70 included in the semiconductor memory device 1 according to the first embodiment, and is a diagram for explaining the connection between a plurality of sense amplifier units SAU0 to SAU15 included in the sense amplifier module 70 and a plurality of bit lines BL0-Z0 to BL15-Z0. FIG. 17 is a block diagram showing an example of a configuration of sense amplifier groups 100B to 100D following a sense amplifier group 100A shown in FIG. 16, and is a diagram for explaining the connection between the plurality of sense amplifier units SAU0 to SAU15 included in the sense amplifier module 70 and the plurality of bit lines BL0-Z0 to BL15-Z0, a plurality of bit lines BL0-Z1 to BL15-Z1, a plurality of bit lines BL0-Z2 to BL15-Z2, and a plurality of bit lines BL0-Z3 to BL15-Z3. FIG. 18 is a block diagram showing an example of a configuration of the driver set 28 included in the semiconductor memory device 1 according to the first embodiment, and is a diagram for explaining the connection between the driver set 28 and the plurality of sense amplifier groups 100A to 100D. The configuration of the sense amplifier module 70 and the driver set 28 according to the first embodiment is not limited to the configuration shown in FIG. 16 to FIG. 18. In the description of FIG. 16 to FIG. 18, descriptions of the same or similar configurations as those of FIG. 1 to FIG. 15 may be omitted.

As shown in FIG. 16, FIG. 17, or FIG. 18, the sense amplifier module 70 includes the plurality of sense amplifier groups 100A to 100D. Each of the plurality of sense amplifier groups 100A to 100D may be referred to as a "first sense amplifier group", a "second sense amplifier group", a "third sense amplifier group", and a "fourth sense amplifier group".

The connection between the plurality of sense amplifier units SAU0 to SAU15 included in the sense amplifier module 70 and the plurality of bit lines BL will be described with reference to FIG. 16 and FIG. 17. Each of the sense amplifier groups 100A, 100B, 100O and 100D includes the sense amplifier units SAU0 to SAU15. For example, the sense amplifier units SAU0 to SAU15 are arranged in a matrix in the extending direction (direction X) of the word line WL and the extending direction (direction Y) of the bit line BL. Each of the sense amplifier units SAU0 to SAU15 is connected to one bit line BL. For example, the number of sense amplifier units SAU included in the sense amplifier module 70 corresponds to the number of bit lines BL.

In the semiconductor memory device 1 according to the first embodiment, each of the sense amplifier units SAU0 to SAU15 in the sense amplifier group 100A is electrically connected to the bit lines BL0-Z0 to BL15-Z0 included in the zone Z0 in a one-to-one manner. For example, the bit line BL0-Z0 is electrically connected to the sense amplifier unit SAU0, and the bit line BL7-Z0 is electrically connected to the sense amplifier unit SAU7.

Similar to the sense amplifier group 100A, each of the sense amplifier units SAU0 to SAU15 in the sense amplifier group 100B is electrically connected to the bit lines BL0-Z1 to BL15-Z1 included in the zone Z1 in a one-to-one manner, each of the sense amplifier units SAU0 to SAU15 in the sense amplifier group 100O is electrically connected to the bit lines BL0-Z2 to BL15-Z2 included in the zone Z2 in a one-to-one manner, and each of the sense amplifier units SAU0 to SAU15 in the sense amplifier group 100D is electrically connected to the bit lines BL0-Z3 to BL15-Z3 included in the zone Z1 in a one-to-one manner.

The semiconductor memory device 1 according to the first embodiment includes a wiring 90 indicated by a solid line in the direction Y, a wiring 92 indicated by a solid line in the direction X, and a wiring 91 indicated by a thick solid line in the direction Y. Using the wiring 90 indicated by the solid line in the direction Y, the wiring 92 indicated by the solid line in the direction X, and the wiring 91 indicated by the thick solid line in the direction Y, each of the plurality of bit lines BL is connected to the corresponding sense amplifier unit SAU among the sense amplifier units SAU0 to SAU15.

As shown in FIG. 16, for example, each of the bit lines BL0-Z0 to BL3-Z0 included in the zone Z0 is connected to the corresponding sense amplifier unit SAU among the sense amplifier units SAU0 to SAU3 in the sense amplifier group 100A by using the wiring 90 indicated by the solid line in the direction Y. Each of the bit lines BL4-Z0 to BL7-Z0 included in the zone Z0 is connected to the corresponding sense amplifier unit SAU among the sense amplifier units SAU4 to SAU7 in the sense amplifier group 100A by using the wiring 90 indicated by the solid line in the direction Y and the wiring 92 indicated by the solid line in the direction X. Each of the bit lines BL8-Z0 to BL15-Z0 included in the zone Z0 is connected to the corresponding sense amplifier unit SAU among the sense amplifier units SAU8 to SAU15 in the sense amplifier group 100A by using the wiring 90 indicated by the solid line in the direction Y, the wiring 92 indicated by the solid line in the direction X, and the wiring 91 indicated by the thick solid line in the direction Y.

Similar to the bit lines BL0-Z0 to BL3-Z0 included in the zone Z0, the bit lines BL0-Z1 to BL15-Z1 included in the zone Z1, the bit lines BL0-Z2 to BL15-Z2 included in the zone Z2, and the bit lines BL0-Z3 to BL15-Z3 included in the zone Z3 are also connected to the corresponding sense amplifier units SAU among the sense amplifier units SAU8 to SAU15 in each sense amplifier group 100.

In the semiconductor memory device 1 according to the first embodiment, the wiring 90 indicated by the solid line in the direction Y and the wiring 91 indicated by the thick solid line in the direction Y are formed in different layers via an insulating layer. That is, the wiring 90 indicated by the solid line in the direction Y and the wiring 91 indicated by the thick solid line in the direction Y can be arranged so as to overlap each other. The wiring 92 indicated by the solid line in the direction X may be formed in the same layer as either the wiring 90 indicated by the solid line in the direction Y or the wiring 91 indicated by the thick solid line in the direction Y, and may be formed in different layers from the wiring 90 indicated by the solid line in the direction Y and the wiring 91 indicated by the thick solid line in the direction Y via the insulating layer. That is, the wiring 92 indicated by the solid line in the direction X and the wiring 90 indicated by the solid line in the direction Y can be arranged overlapping each other, and the wiring 92 indicated by the solid line in the direction X and the wiring 91 indicated by the thick solid line in the direction Y can be arranged overlapping each other.

In the embodiment shown in FIG. 16, the number wirings 90 indicated by the solid line in the direction Y is 40, the number wirings 91 indicated by the thick solid line in the direction Y is 24, and the number wirings 92 indicated by the solid line in the direction X is 48. The embodiments shown in FIG. 16 and FIG. 17 are examples, and the configurations such as the wiring connection is not limited to the configuration shown in FIG. 16 and FIG. 17.

Next, the connection between the driver set 28 and the plurality of sense amplifier groups 100A to 100D will be described with reference to FIG. 18.

The driver set 28 includes the SRCGND driver 28C. The driver set 28 is electrically connected to the voltage generation circuit 27. The driver set 28 is supplied with a voltage and a control signal from the voltage generation circuit 27.

For example, the SRCGND driver 28C generates a voltage SRCGND0 (SRCGND[0]), a voltage SRCGND1 (SRCGND[1]), a voltage SRCGND2 (SRCGND[2]), and a voltage SRCGND3 (SRCGND[3]), based on the voltage and the control signal supplied from the voltage generation circuit 27. The SRCGND driver 28C has a function of supplying different voltages SRCGND for each of the zones Z0 to Z3 to the plurality of sense amplifier units SAU associated with each of the zones Z0 to Z3. The voltage SRCGND0 (SRCGND[0]), the voltage SRCGND1 (SRCGND[1]), the voltage SRCGND2 (SRCGND[2]), and the voltage SRCGND3 (SRCGND[3]) may be referred to as "first voltage" or "second voltage".

In the embodiment shown in FIG. 18, for example, wirings 84 indicated by solid lines in the direction X are electrically connected to each of the source ground supply lines 80 to 83 supplying the voltage SRCGND. The wiring 84 indicated by the solid line in the direction X is electrically connected to the node SRC of the sense amplifier units SAU0 to SAU15 included in the sense amplifier groups 100. The source ground supply lines 80 to 83 may be referred to as the voltage supply line, and each of the source ground supply lines 80 to 83 may be referred to as a "first voltage supply line", a "second voltage supply line", a "third voltage supply line", and a "fourth voltage supply line".

The SRCGND driver 28C supplies the voltage SRCGND0 (SRCGND[0]) to the source ground supply line 80, supplies the voltage SRCGND1 (SRCGND[1]) to the source ground supply line 81, supplies the voltage SRCGND2 (SRCGND[2]) to the source ground supply line 82, and supplies the voltage SRCGND3 (SRCGND[3]) to the source ground supply line 83.

The sense amplifier units SAU0 to SAU15 in the sense amplifier group 100A are supplied with the voltage SRCGND0 (SRCGND[0]) via the wiring 84 indicated by the solid line in the direction X. The sense amplifier units SAU0 to SAU15 in the sense amplifier group 100B are supplied with the voltage SRCGND1 (SRCGND[1]) via the wiring 84 indicated by the solid line in the direction X. The sense amplifier units SAU0 to SAU15 in the sense amplifier group 100C are supplied with the voltage SRCGND2 (SRCGND[2]) via the wiring 84 indicated by the solid line in the direction X. The sense amplifier units SAU0 to SAU15 in the sense amplifier group 100D are supplied with the voltage SRCGND3 (SRCGND[3]) via the wiring 84 indicated by the solid line in the direction X.

In the embodiment shown in FIG. 18, although the example in which the SRCGND driver 28C generates four voltages SRCGND is shown, the voltage SRCGND generated by the SRCGND driver 28C may be two or more. The voltage SRCGND generated by the SRCGND driver 28C may be determined based on the number of the zones Z0 to Z3. In addition, in the semiconductor memory device 1 according to the first embodiment, the wiring indicated by the solid line in the direction X is the wiring arranged parallel or substantially parallel to the direction X, and the wiring indicated by the solid line in the direction Y and the wiring indicated by the solid line in the direction Y are the wirings arranged parallel or substantially parallel to the direction Y.

In the semiconductor memory device 1 according to the first embodiment, as shown in FIG. 15 and FIG. 16, it is possible to replace the arrangement (order) of the wiring connected to the bit lines BL arranged in each of the zones Z0 to Z3 by using the wiring parallel or substantially parallel to the direction X and the wiring parallel or substantially parallel to the direction Y.

The replaced wiring is electrically connected to the sense amplifier units SAU corresponding to each bit line BL. Specifically, the bit lines BL (see FIG. 13) connected to the adjacent memory pillars MP are connected to the sense amplifier units SAU arranged in the same direction (in this case, the direction X). Although details will be described later, the sense amplifier unit SAU may supply the voltage SRCGND supplied to the node SRC to the bit line BL.

As a result, in the semiconductor memory device 1 according to the first embodiment, as shown in FIG. 18, the voltages SRCGND0 (SRCGND[0]) to SRCGND3 (SRCGND[3]) can be supplied to the sense amplifier units SAU0 to SAU15 arranged in the same sense amplifier group 100 by using the wiring 84 parallel or substantially parallel to the direction X. Therefore, the sense amplifier units SAU0 to SAU15 arranged in the same sense amplifier group 100 can supply the same voltage SRCGND to the bit lines BL arranged in the same zones Z0 to Z3.

Specifically, the sense amplifier units SAU0 to SAU15 arranged in the sense amplifier group 100A supplies the voltage SRCGND0 (SRCGND[0]) to the bit lines BL0-Z0 to BL15-Z0 arranged in the zone Z0, the sense amplifier units SAU0 to SAU15 arranged in the sense amplifier group 100B supplies the voltage SRCGND1 (SRCGND[1]) to the bit lines BL0-Z1 to BL15-Z1 arranged in the zone Z1, the sense amplifier units SAU0 to SAU15 arranged in the sense amplifier group Z2 supplies the voltage SRCGND2 (SRCGND[2]) to the bit lines BL0-Z2 to BL15-Z2 arranged in the zone the sense amplifier group 100D, and the sense amplifier units SAU0 to SAU15 arranged in the sense amplifier group 100D supplies the voltage SRCGND3 (SRCGND[3]) to the bit lines BL0-Z3 to BL15-Z3 arranged in the zone Z3.

1-9-2. Circuit Configuration of Sense Amplifier Unit SAU

Figure 19:
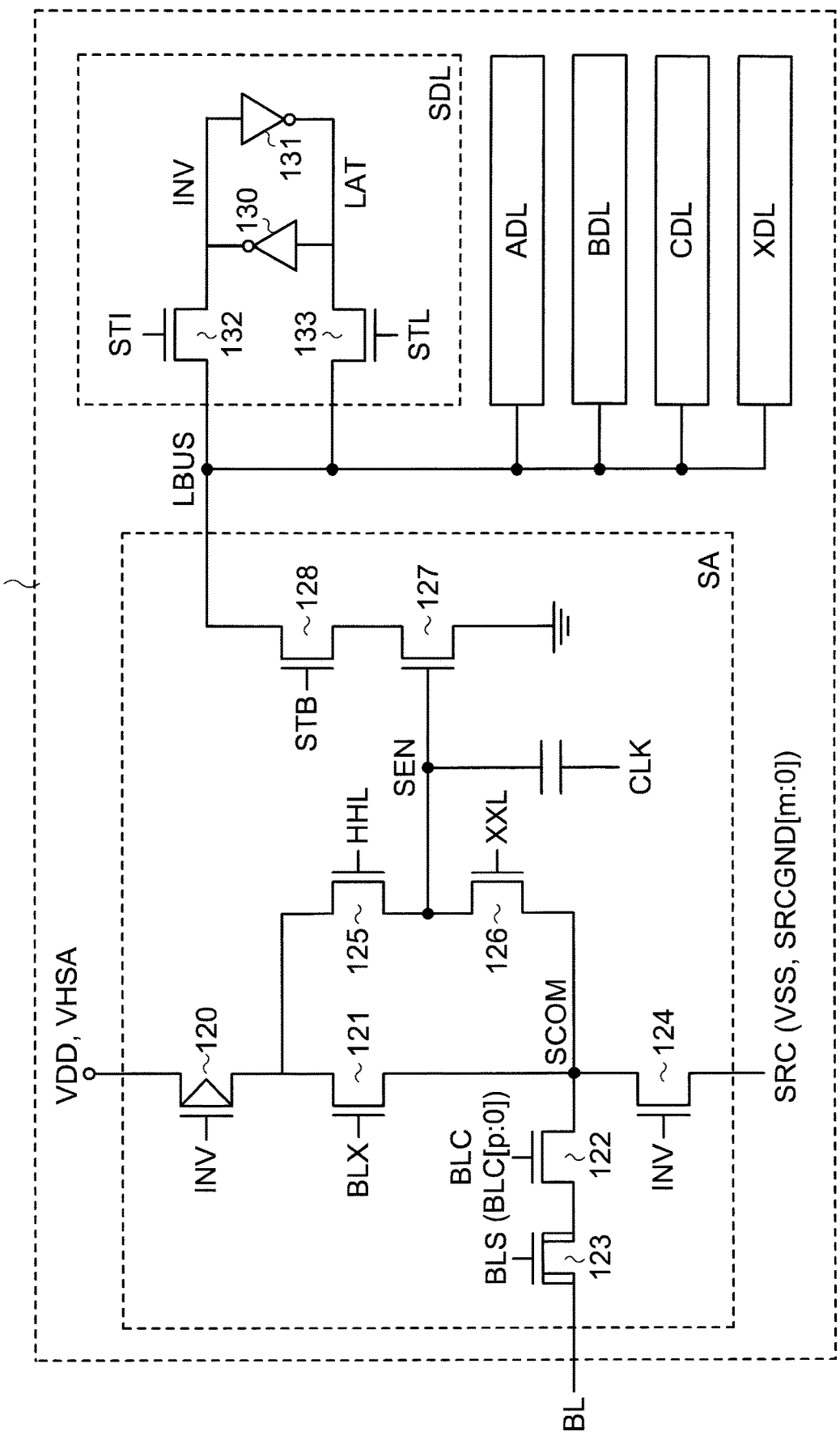
FIG. 19 is a circuit diagram showing an example of a circuit configuration of a sense amplifier unit according to the first embodiment.

Next, an example of a circuit configuration of the sense amplifier unit SAU will be described. FIG. 19 is a circuit diagram showing an example of a circuit configuration of the sense amplifier unit SAU according to the first embodiment. The circuit configuration of the sense amplifier unit SAU shown in FIG. 9 is an example, and the circuit configuration of the sense amplifier unit SAU of the nonvolatile semiconductor memory device according to the first embodiment is not limited to the example shown in FIG. 19. Descriptions of the same or similar configurations as those in FIG. 1 to FIG. 18 may be omitted.

The sense amplifier module 70 includes a plurality of sense amplifier units SAU each associated with the bit lines BL0 to BL(L−1). FIG. 19 shows a circuit configuration of one sense amplifier unit SAU.

For example, the sense amplifier unit SAU can temporarily store the data corresponding to the threshold voltage read to the corresponding bit line BL. In addition, the sense amplifier unit SAU can perform a logical operation using temporarily stored data. Although details will be described later, the semiconductor memory device 1 can execute the program operation using the sense amplifier unit SAU.

As shown in FIG. 19, the sense amplifier unit SAU includes a sense amplifier unit SA and latch circuits SDL, ADL, BDL, CDL, and XDL. The sense amplifier unit SA and the latch circuits SDL, ADL, BDL, CDL, and XDL are connected by a bus LBUS so as to be able to transmit and receive data to and from each other. The sense amplifier unit SA is connected between a power supply line and the node SRC. The node SRC is supplied with a voltage lower than the voltage supplied to the power supply line. The power supply line is a voltage supply line that supplies a high-level voltage to the sense amplifier unit SA. The node SRC is a node that supplies a low-level voltage to the sense amplifier unit SA. The sense amplifier unit SA operates by supplying the voltage to the power supply line and the node SRC. In addition, the power supply line and the node SRC may be configured to supply voltages to elements other than the sense amplifier unit SA in the sense amplifier unit SAU. The high-level voltage is, for example, a voltage VDD, a voltage VHSA, and the like, and the low-level voltage is, for example, a voltage VSS, a voltage SRCGND[m:0], and the like. The power supply lines may be referred to as a "voltage supply line," a "voltage supply terminal," or a "high voltage supply terminal," and the node SRC may be referred to as a "voltage supply terminal" or a "low voltage supply terminal."

For example, in the read operation, the sense amplifier unit SA senses the data (threshold voltage) read to the corresponding bit line BL, and determines whether the data corresponding to the read threshold voltage is "0" or "1". For example, the sense amplifier unit SA includes a p-channel MOS transistor 120, n-channel MOS transistors 121 to 128, and a capacitor 129.

One end of the transistor 120 is connected to the power supply line, and a gate of the transistor 120 is connected to a node INV in the latch circuit SDL. One end of the transistor 121 is connected to the other end of the transistor 120, the other end of the transistor 121 is connected to a node SCOM, and a control signal BLX is input to the gate of the transistor 121. One end of the transistor 122 is connected to the node SCOM, and a control signal BLC is input to the gate of the transistor 122. The transistor 123 is a high voltage MOS transistor, and one end of the transistor 123 is connected to the other end of the transistor 122, the other end of the transistor 123 is connected to the corresponding bit line BL, and a control signal BLS is input to the gate of the transistor 123. Although details will be described later, the transistor 122 is supplied with the control signal BLC at its gate and has a function of supplying a voltage supplied to the node SCOM to the bit line BL. The transistor 122 may be referred to as a "control transistor."

In the semiconductor storage device 1 of the present disclosure, the effective programmed voltage supplied to the memory cell transistor MT can be adjusted. In the first embodiment, the effective programmed voltage supplied to the memory cell transistor MT is adjusted by controlling the voltage SRCGND supplied to the node SRC of the sense amplifier unit SAU for each zone Z3 to Z0. Although details will be described later, in the semiconductor memory device 1 according to the present disclosure, the effective program voltage supplied to the memory cell transistor MT can be adjusted by using the control signal BLC. As a result, it is possible to suppress the program variation of the memory cell by using the semiconductor memory device 1 of the present disclosure. In this case, different control signals BLC[p:0] (p is an integer of 1 or more) are supplied depending on the bit line BL connected to the sense amplifier unit SAU.

One end of the transistor 124 is connected to the node SCOM, the other end of the transistor 124 is connected to the node SRC, and a gate of the transistor 124 is connected to the node INV. One end of the transistor 125 is connected to the other end of the transistor 120, the other end of the transistor 125 is connected to a node SEN, and a control signal HHL is input to a gate of the transistor 125. One end of the transistor 126 is connected to the node SEN, the other end of the transistor 126 is connected to the node SCOM, and a control signal XXL is input to the gate of the transistor 126.

One end of the transistor 127 is grounded, and a gate of the transistor 127 is connected to the node SEN. One end of the transistor 128 is connected to the other end of the transistor 127, the other end of the transistor 128 is connected to the bus LBUS, and a control signal STB is input to a gate of the transistor 128. One end of the capacitor 129 is connected to the node SEN, and a clock CLK is input to the other end of the capacitor 129. For example, the voltage VSS is supplied to the clock CLK.

For example, the control signals BLX, BLC, BLS, HHL, XXL, STI, STL and STB described above are generated by the sequencer 24. In addition, the power supply line connected to one end of the transistor 120 is supplied with the voltage VDD or the voltage VHSA which is an internal power supply voltage of the semiconductor memory device 1, and the node SRC is supplied with the voltage VSS which is a ground voltage of the semiconductor memory device 1 and the voltage SRCGND[m:0] (m is an integer of 1 or more) which is supplied to the bit line Program BL.

The latch circuits SDL, ADL, BDL, CDL and XDL temporarily hold the read data. For example, the latch circuit XDL is connected to the register 25, and is used to input and output data between the sense amplifier unit SAU and the input/output circuit 22.

For example, the latch circuit SDL includes inverters 130 and 131 and n-channel MOS transistors 132 and 133. An input node of the inverter 130 is connected to a node LAT, and an output node of the inverter 130 is connected to the node INV. An input node of the inverter 131 is connected to the node INV, and an output node of the inverter 131 is connected to the node LAT. One end of the transistor 132 is connected to the node INV, the other end of the transistor 132 is connected to the bus LBUS, and a control signal STI is input to a gate of the transistor 132. One end of the transistor 133 is connected to the node LAT, the other end of the transistor 133 is connected to the bus LBUS, and the control signal STL is input to a gate of the transistor 133. For example, the data held in the node LAT corresponds to the data held in the latch circuit SDL, and the data held in the node INV corresponds to the inverted data of the data held in the node LAT. For example, since the circuit configurations of the latch circuits ADL, BDL, CDL and XDL are the same as the circuit configuration of the latch circuit SDL, descriptions will be omitted.

In the sense amplifier unit SAU described above, the timing at which each sense amplifier unit SAU determines the data corresponding to the threshold voltage read to the bit line BL is based on the timing at which the control signal STB is asserted. In the semiconductor memory device 1, "the sequencer 24 asserts the control signal STB" corresponds to the sequencer 24 changing the control signal STB from the "L" level to the "H" level.

The configuration of the sense amplifier unit SAU is not limited to the configuration and the function described with reference to FIG. 19. For example, in the sense amplifier unit SAU, the transistor 128 to which the control STB is input may be the p-channel MOS transistor. In this case, "the sequencer 24 asserts the control signal STB" corresponds to the sequencer 24 changing the control signal STB from the "H" level to the "L" level.

In addition, the number of latch circuits included in the sense amplifier unit SAU can be designed to be any number. For example, the number of latch circuits is designed based on the number of bits of data held by one memory cell transistor MT. In addition, the plurality of bit lines BL may be connected to one sense amplifier unit SAU via a selector.

1-9-3. Example of Program Operation

Figure 20:
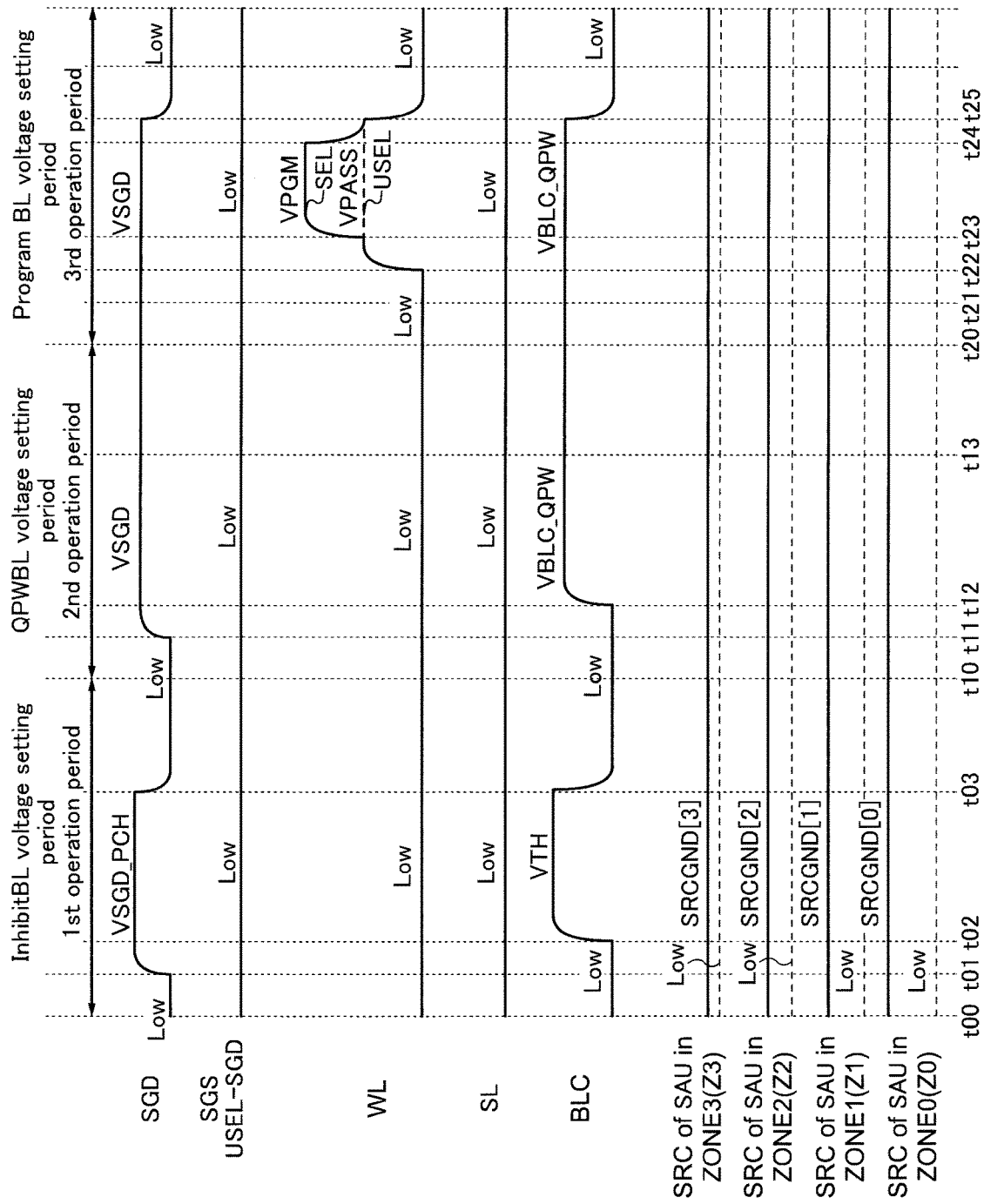
FIG. 20 is a diagram showing a timing chart of various signals at the time of a program operation of a nonvolatile semiconductor memory device according to the first embodiment.
Figure 21:
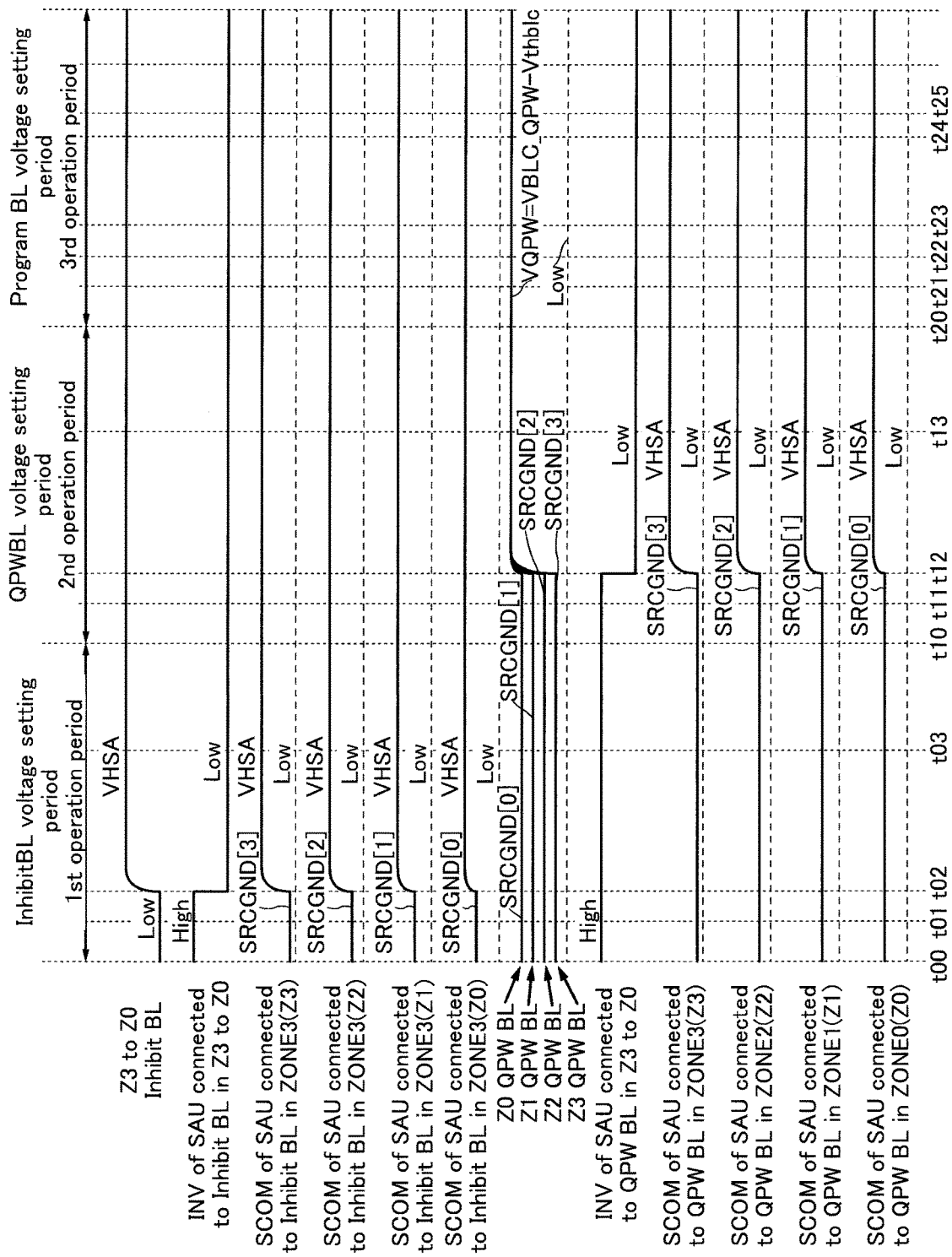
FIG. 21 is a diagram showing a timing chart of various signals at the time of a program operation of a nonvolatile semiconductor memory device according to the first embodiment.
Figure 22:
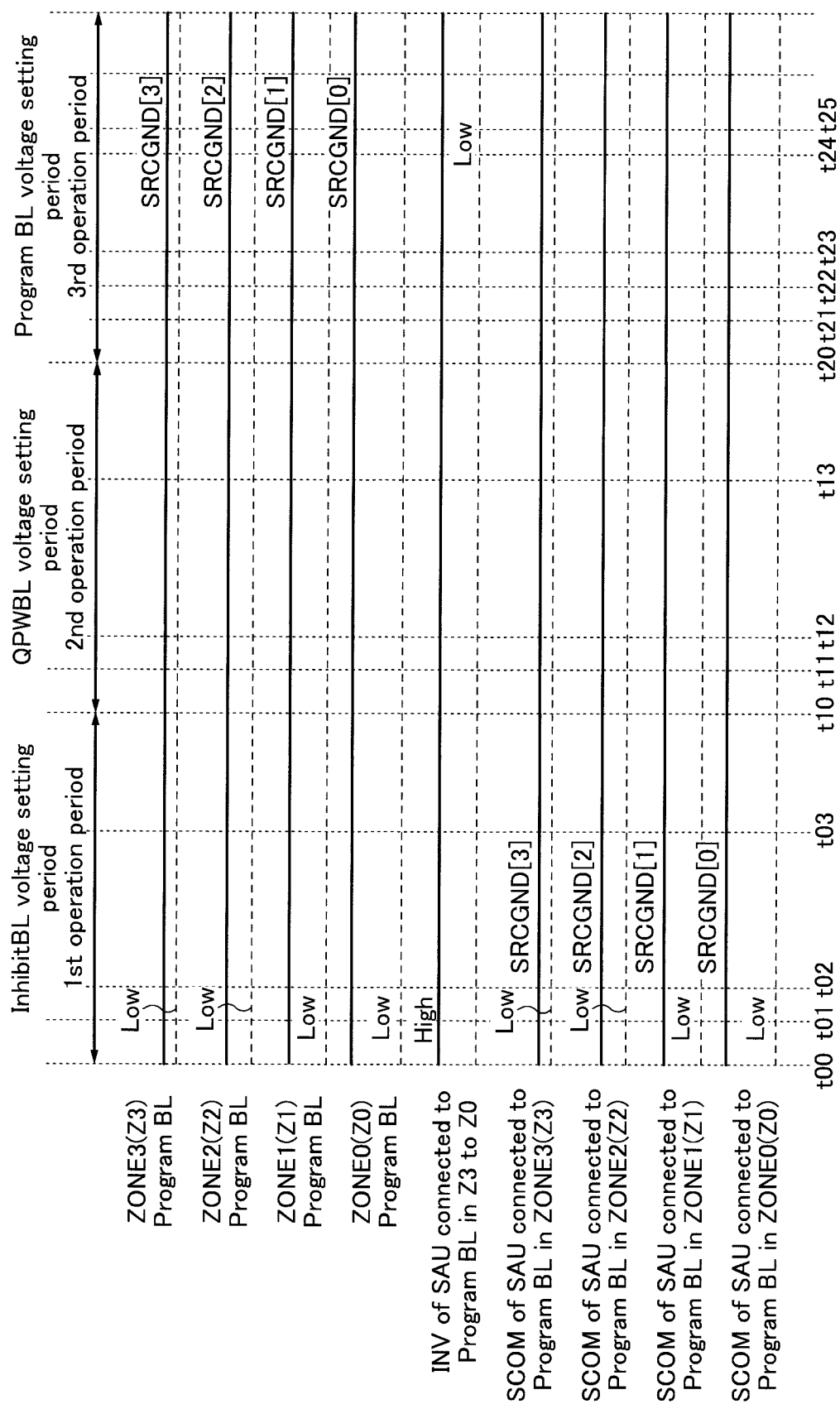
FIG. 22 is a diagram showing a timing chart of various signals at the time of a program operation of a nonvolatile semiconductor memory device according to the first embodiment.
Figure 23:
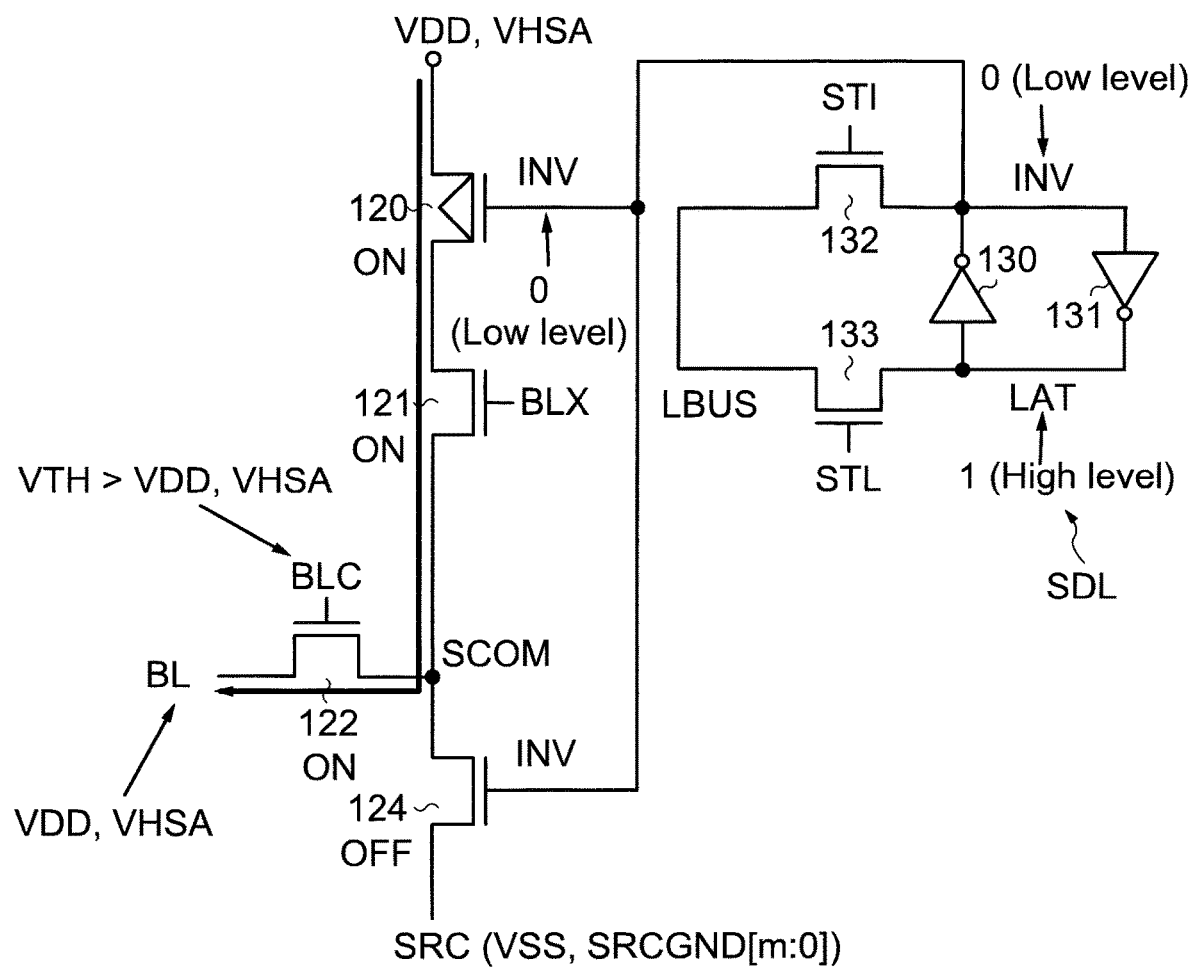
FIG. 23 is a schematic circuit diagram for explaining an operation of a sense amplifier unit SAU at the time of a program operation of a semiconductor memory device according to the first embodiment.
Figure 24:
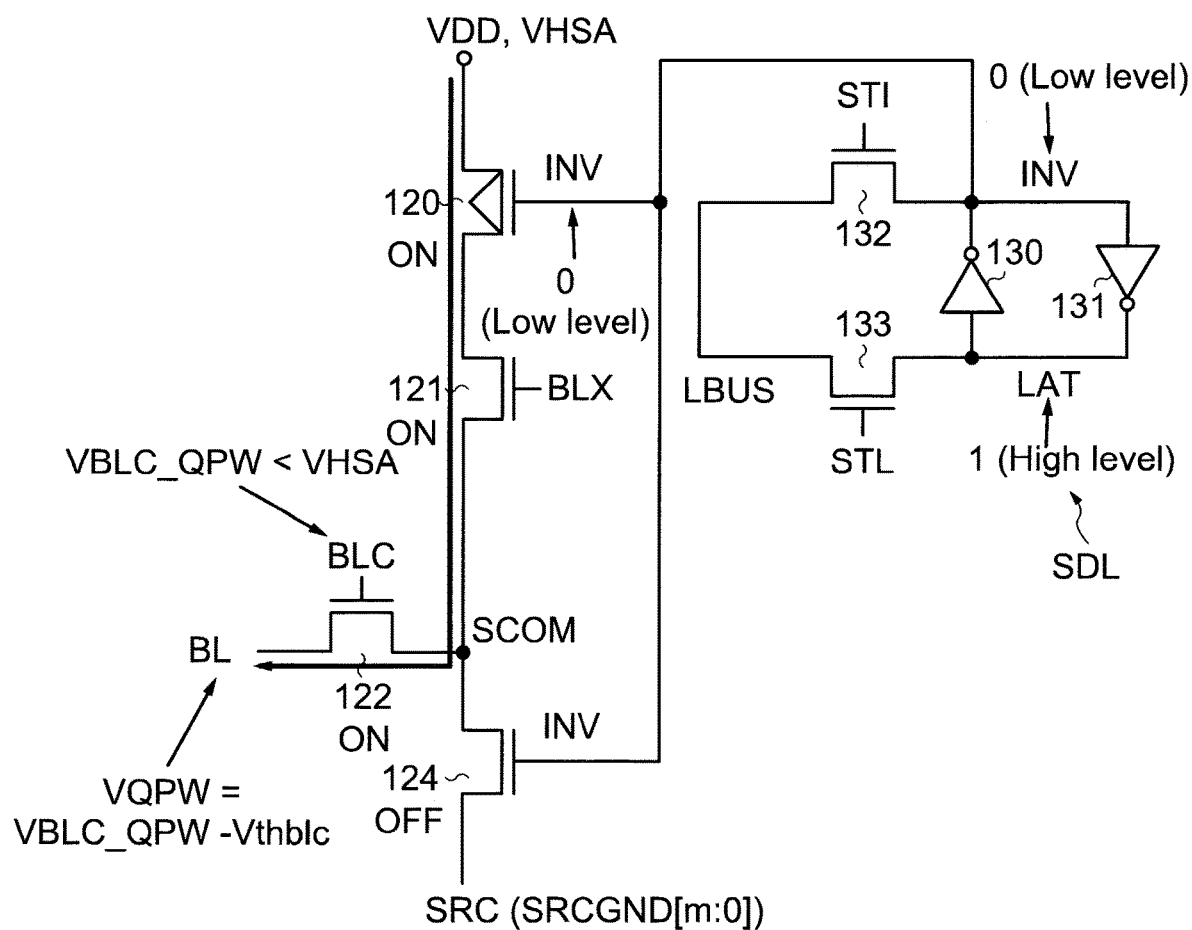
FIG. 24 is a schematic circuit diagram for explaining an operation of a sense amplifier unit SAU at the time of a program operation of a semiconductor memory device according to the first embodiment.
Figure 25:
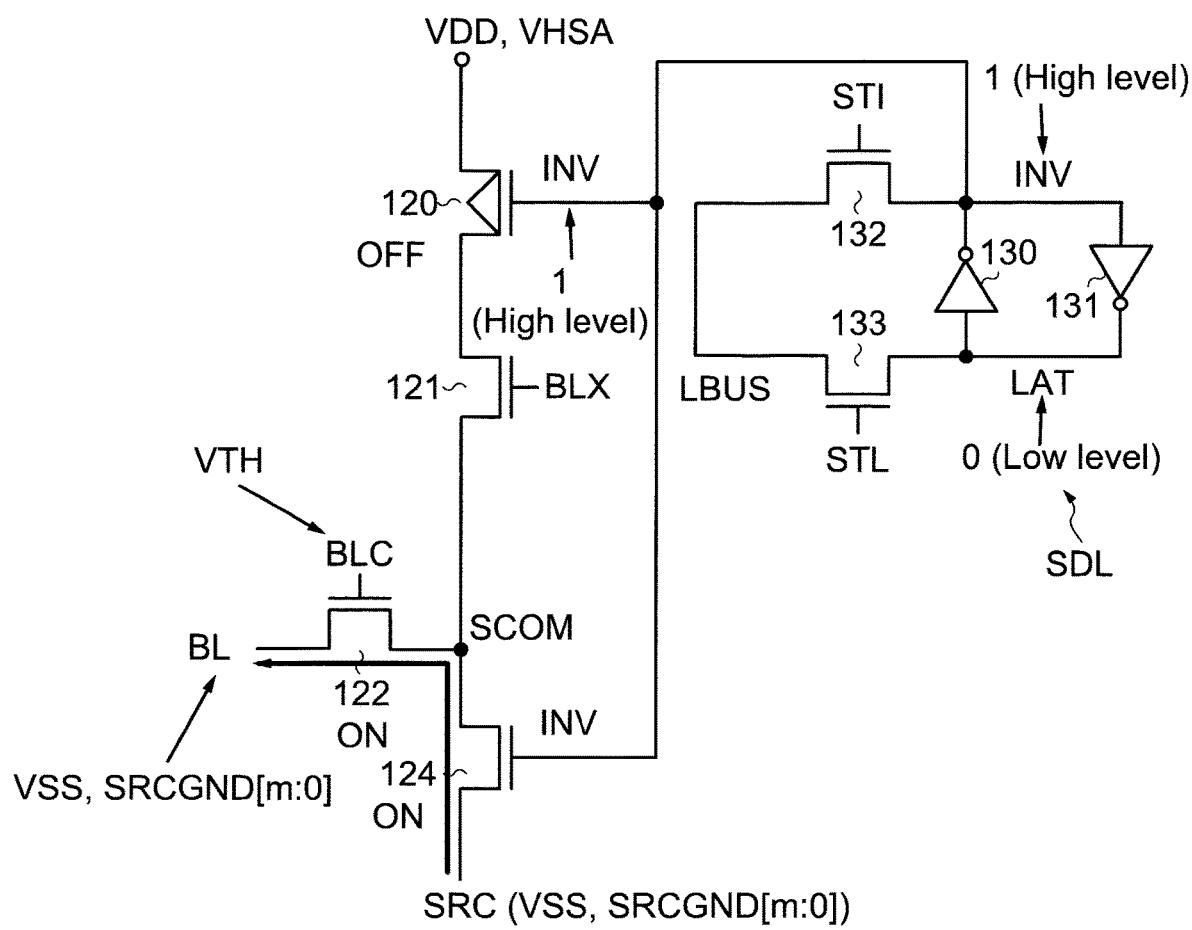
FIG. 25 is a schematic circuit diagram for explaining an operation of a sense amplifier unit SAU at the time of a program operation of a semiconductor memory device according to the first embodiment.

FIG. 20 to FIG. 22 are diagrams showing timing charts of various signals at the time of a program operation of the semiconductor memory device 1 according to the first embodiment. FIG. 23 to FIG. 25 are schematic circuit diagrams for explaining the operation of the sense amplifier unit SAU at the time of the program operation of the semiconductor memory device 1 according to the first embodiment. The timing charts shown in FIG. 20 to FIG. 22 are schematic timing charts showing examples of temporal changes in voltages supplied to various circuit components. The operation of the sense amplifier unit SAU shown in FIG. 20 to FIG. 22 and the operation of the sense amplifier unit SAU shown in FIG. 23 to FIG. 25 are examples, and the operation of the timing chart and the sense amplifier unit SAU of the semiconductor memory device 1 according to the first embodiment is not limited to the examples shown in FIG. 20 to FIG. 25. Descriptions of the same or similar configurations as those in FIG. 1 to FIG. 19 may be omitted.

In the following explanation, in the NAND strings 50o, 50e (see FIG. 12), the word line connected to the write target memory cell transistor MT (the memory cell transistor MT to which the program voltage is written) is referred to as a selected word line SEL-WL, and the word line connected to the other memory cell transistor MT is referred to as an unselected word line USEL-WL. In addition, among the NAND strings 50o and 50e, the bit line BL electrically connected to the NAND strings 50o and 50e including the write target memory cell transistor MT is called a bit line Program BL. In addition, in the program operation, by making the voltage supplied to the bit line higher than the voltage VSS, the part of the channel of the memory cell transistor MT connected to the bit line supplied with the voltage higher than the voltage VSS is programmed with a program voltage VPGM (see FIG. 20) supplied at the time of the program operation effectively weakened. That is, in the program operation, setting the voltage supplied to the bit line to be higher than the voltage VSS makes it possible to suppress excessive voltages from being supplied to the memory cell transistor MT. In the semiconductor memory device 1 of the present disclosure, such a bit line is called a bit line QPWBL. Further, other than the bit line Program BL and the bit line QPWBL, a bit line BL electrically connected to the NAND string 50o or 50e including the memory cell transistor MT (the memory cell transistor MT in which the program voltage is not written) other than the write target memory cell transistor MT is referred to as a bit line Inhibit BL.

In addition, in the following explanation, the sequencer 24 (see FIG. 1) controls the voltage generation circuit 27 (see FIG. 1), the row decoder 29 (see FIG. 1), and the sense amplifier module 70 (see FIG. 1), and the voltage generation circuit 27, the row decoder 29, the driver set 28, or the sense amplifier module 70 supplies a voltage to the select gate line SGD (for example, an even select gate line SG0), the select gate line SGS (for example, the even select gate line SGSe, the odd select gate line SGSo), an unselected gate line USEL-SGD (for example, the odd select gate line SG1), the selected word line SEL-WL, the unselected word line USEL-WL, the source line SL, the control signal BLC, and the node SRC of the sense amplifier unit. In the semiconductor memory device 1 according to the first embodiment, for example, the bit line Program BL is supplied with the source ground voltage SRCGND[m:0] from the node SRC.

A program operation period in the semiconductor memory device 1 according to the first embodiment includes a period in which a voltage is set in the bit line Inhibit BL, a period in which a voltage is set in the bit line QPWBL, and a period in which a voltage is set in the bit line Program BL. The period in which the voltage is set to the bit line Inhibit BL is referred to as a first operation period, a period in which the voltage is set to the bit line QPWBL is referred to as a second operation period, and a period in which the voltage is set to the bit line Program BL is referred to as a third operation period.

As shown in FIG. 20, in the entire program operation period (from time t00 to time t25) in the semiconductor memory device 1, the select gate line SGS, the unselected gate line USEL-SGD, the selected word line SEL-WL, the unselected word line USEL-WL, and the source line SL are supplied with the low-level voltages. For example, the low-level voltage is the voltage VSS. In addition, in the entire program operation period (from the time t00 to the time t25) in the semiconductor memory device 1, the node SRC of the sense amplifier unit SAU in the zone Z3 is supplied with the voltage SRCGND[3], the node SRC of the sense amplifier unit SAU in the zone Z2 is supplied with the voltage SRCGND[2], the node SRC of the sense amplifier unit SAU in the zone Z1 is supplied with the voltage SRCGND[1], and the node SRC of the sense amplifier unit SAU in the zone Z0 is supplied with the voltage SRCGND[0]. The voltage SRCGND[0] is higher than the voltage SRCGND[1], the voltage SRCGND[1] is higher than the voltage SRCGND[2], and the voltage SRCGND[2] is higher than the voltage SRCGND[3]. In the semiconductor storage device 1, the distance from the replacement hole portion STHAR1, the replacement hole portion STHAR2, or the distance from the replacement hole portion STHAR3 is far in the order of the zone Z3, zone Z2, zone Z1, zone Z0. Therefore, the lower voltage SRCGND is supplied to the bit line BL allocated to the zone the further the distance from the replacement hole portion STHAR2 or the replacement hole portion STHAR3 at which the zone is located. In the following explanation, the sense amplifier units SAU0 to SAU15 may be collectively referred to as the sense amplifier unit SAU.

1-9-3-1. Example of First Operation Period

Voltages and the like supplied to each signal line and each node in the entire first operation period (time t00 to time t10) will be mainly described with reference to FIG. 20 to FIG. 25. In the program operation according to the first embodiment, first, a first operation in the first operation is performed on the memory cell transistor MT included in the NAND strings 50o and 50e using the sequencer 24. The first operation period is a period (an Inhibit BL voltage setting period) in which a voltage is set to the bit line Inhibit BL.

Voltages and the like supplied to each signal line and each node in the time t00 to the time t00 in the first operation period will be described.

As shown in FIG. 20, the control signal BLC is supplied with the low-level voltage. The select gate line SGD is supplied with the low-level voltage from the time t00 to the time t01, and is supplied with a voltage VSGH_PCH from the low-level voltage from the time t01 to the time t02.

The voltages supplied to each of the bit line Inhibit BL in the zones Z3 to Z0, the node INV of the sense amplifier unit SAU connected to the bit line Inhibit BL in the zones Z3 to Z0, the node SCOM of the sense amplifier unit SAU connected to the bit line Inhibit BL in the zones Z3 to Z0, the bit line QPWBL in the zones Z3 to Z0, the node INV of the sense amplifier unit SAU connected to the bit line QPWBL in the zones Z3 to Z0, the node SCOM connected to the bit line QPWBL in the zones Z3 to Z0, the bit line Program BL in the zones Z3 to Z0, the node INV of the sense amplifier unit SAU connected to the bit line Program BL in the zones Z3 to Z0, and the node SCOM of the sense amplifier unit SAU connected to the bit line Program BL in the zones Z3 to Z0 shown in FIG. 21 or FIG. 22 will be described with reference to a schematic circuit diagram of the sense amplifier unit SAU of FIG. 25. Although an example in which the control signal BLC shown in FIG. 25 is supplied with a voltage VTH is shown, in the explanation of the time t00 to the time t02 in the first operation period, it is assumed that the control signal BLC is supplied with a voltage of a low level, the transistor 122 connected to the control signal BLC is turned off (OFF), and the bit line BL holds an initial low level (for example, the voltage VSS).

The node INV of the latch circuit SDL holds "1" (a voltage at a high level), and the node LAT of the latch circuit SDL holds "0" (a voltage at a low level). Therefore, the transistor 120 connected to the node INV is turned OFF, and the transistor 124 connected to the node INV is turned ON. The control signal BLC is supplied with a low-level voltage, and the transistor 122 is turned off. Therefore, the node SCOM is supplied with the voltage VSS or the voltage SRCGND[m:0] from the node SRC. In the semiconductor memory device 1 of the present disclosure, the voltage SRCGND[m:0] is the voltage SRCGND[0], the voltage SRCGND[1], the voltage SRCGND[2], and the voltage SRCGND[3].

Therefore, in the time t00 to the time t02 in the first operation period shown in FIG. 21 or FIG. 22, the bit line Inhibit BL in the zones Z3 to Z0 is supplied with the low-level voltage, the node INV of the sense amplifier unit SAU connected to the bit line Inhibit BL in the zones Z3 to Z0 is supplied with the high-level voltage, the node SCOM of the sense amplifier unit SAU connected to the bit line Inhibit BL in the zone Z3 is supplied with the voltage SRCGND[3], the node SCOM of the sense amplifier unit SAU connected to the bit line Inhibit BL in the zone Z2 is supplied with the voltage SRCGND[2], the node SCOM of the sense amplifier unit SAU connected to the bit line Inhibit BL in the zone Z1 is supplied with the voltage SRCGND[1], and the node SCOM of the sense amplifier unit SAU connected to the bit line Inhibit BL in the zone 0 is supplied with the voltage SRCGND[0]. Similar to the voltage supplied to each node associated with the bit line Inhibit BL, the bit line QPWBL in the zones Z3 to Z0 is supplied with the low-level voltage, the node INV of the sense amplifier unit SAU connected to the bit line QPWBL in the zones Z3 to Z0 is supplied with the high-level voltage, the node SCOM of the sense amplifier unit SAU connected to the bit line QPWBL in the zone Z3 is supplied with the voltage SRCGND[3], the node SCOM of the sense amplifier unit SAU connected to the bit line QPWBL in the zone Z2 is supplied with the voltage SRCGND[2], the node SCOM of the sense amplifier unit SAU connected to the bit line QPWBL in the zone Z1 is supplied with the voltage SRCGND[1], and the node SCOM of the sense amplifier unit SAU connected to the bit line QPWBL in the zone Z0 is supplied with the voltage SRCGND[0]. In addition, similar to the voltage supplied to each node associated with the bit line Inhibit BL, the bit line Program BL in the zones Z3 to Z0 is supplied with the low-level voltage, the node INV of the sense amplifier unit SAU connected to the bit line Program BL in the zones Z3 to Z0 is supplied with the high-level voltage, the node SCOM of the sense amplifier unit SAU connected to the bit line Program BL in the zone Z3 is supplied with the voltage SRCGND[3], the node SCOM of the sense amplifier unit SAU connected to the bit line Program BL in the zone Z2 is supplied with the voltage SRCGND[2], the node SCOM of the sense amplifier unit SAU connected to the bit line Program BL in the zone 1 is supplied with the voltage SRCGND[1], and the node SCOM of the sense amplifier unit SAU connected to the bit line Program BL in the zone Z0 is supplied with the voltage SRCGND[0].

Next, voltages and the like supplied to each signal line and each node in the time t02 to the time t03 in the first operation period will be described.

As shown in FIG. 20, the control signal BLC is supplied with the voltage VTH. The select gate line SGD is supplied with the voltage VSGH_PCH. In this case, the select transistor ST1 (see FIG. 12) included in the NAND strings 50o and 50e (see FIG. 12) is turned off based on the voltage differential between the voltage VSGH_PCH and the voltage VTH.

Voltages supplied to each of the bit line Inhibit BL in the zones Z3 to Z0, the node INV of the sense amplifier unit SAU connected to the bit line Inhibit BL in the zones Z3 to Z0, and the node SCOM of the sense amplifier unit SAU connected to the bit line Inhibit BL in the zones Z3 to the zone Z0 shown in FIG. 21 or FIG. 22 will be described with reference to the schematic circuit diagram of the sense amplifier unit SAU of FIG. 23.

The node INV of the latch circuit SDL holds "0" (a voltage at a low level), and the node LAT of the latch circuit SDL holds "1" (a voltage at a high level). Therefore, the transistor 120 connected to the node INV is turned on, and the transistor 124 connected to the node INV is turned off. Although not shown, the control BLX is supplied with the high-level voltage, and the transistor 121 is turned on. The control signal BLC is supplied with the voltage VTH, and the transistor 122 is turned on. Therefore, the node SCOM is supplied with the voltage VDD or the voltage VHSA and the bit line BL is supplied with the voltage VDD or the voltage VHSA. The voltage VDD or the voltage VHSA is lower than the voltage VTH. (The voltage VTH is higher than the voltage VDD or the voltage VHSA by a threshold voltage Vthblc or more of the transistor 122.)

Therefore, from the time t02 to the time t03 in the first operation period shown in FIG. 21 or FIG. 22, the bit line Inhibit BL in the zones Z3 to Z0 is supplied with the voltage VHSA from the low-level voltage, the node INV of the sense amplifier unit SAU connected to the bit line Inhibit BL in the zones Z3 to Z0 is supplied with the low-level voltage from the high-level voltage, and the node SCOM of the sense amplifier unit SAU connected to the bit line Inhibit BL in the zones Z3 to Z0 is supplied with the voltage VHSA.

In addition, from the time t02 to the time t03 in the first operation period shown in FIG. 21 or FIG. 22, the bit line QPWBL in the zone Z3 is supplied with the voltage SRCGND[3], the bit line QPWBL in the zone Z2 is supplied with the voltage SRCGND[2], the bit line QPWBL in the zone Z1 is supplied with the voltage SRCGND[1], the bit line QPWBL in the zone Z0 is supplied with the voltage SRCGND[0], the node INV of the sense amplifier unit SAU connected to the bit line QPWBL in the zones Z3 to Z0 is supplied with the high-level voltage, the node SCOM of the sense amplifier unit SAU connected to the bit line QPWBL in the zone Z3 is supplied with the voltage SRCGND[3], the node SCOM of the sense amplifier unit SAU connected to the bit line QPWBL in the zone Z2 is supplied with the voltage SRCGNND[2], the node SCOM of the sense amplifier unit SAU connected to the bit line QPWBL in the zone Z1 is supplied with the voltage SRCGND[1], and the node SCOM of the sense amplifier unit SAU connected to the bit line QPWBL in the zone Z0 is supplied with the voltage SRCGND[0]. In addition, similar to the voltages supplied to each node associated with the bit line QPWBL, the bit line Program BL in the zone Z3 is supplied with the voltage SRCGND[3], the bit line Program BL in the zone Z2 is supplied with the voltage SRCGND[2], the bit line Program BL in the zone Z1 is supplied with the voltage SRCGND[1], the bit line Program BL in the zone Z0 is supplied with the voltage SRCGND[0], the node INV of the sense amplifier unit SAU connected to the bit line Program BL in the zones Z3 to Z0 is supplied with the high-level voltage, the node SCOM of the sense amplifier unit SAU connected to the bit line Program BL in the zone Z3 is supplied with the voltage SRCGND[3], the node SCOM of the sense amplifier unit SAU connected to the bit line Program BL in the zone Z2 is supplied with the voltage SRCGND[2], the node SCOM of the sense amplifier unit SAU connected to the bit line Program BL in the zone Z1 is supplied with the voltage SRCGND[1], and the node SCOM of the sense amplifier unit SAU connected to the bit line Program BL in the zone Z0 is supplied with the voltage SRCGND[0].

Next, voltages and the like supplied to each signal line and each node in the time t03 to the time t10 in the first operation period will be described.

As shown in FIG. 20, the control signal BLC is supplied with the low-level voltage from the voltage VTH. The select gate line SGD is supplied with the low-level voltage from the voltage VSGH_PCH.

From the time t03 to the time t10 in the first operation period shown in FIG. 21 or 22, the bit line Inhibit BL in the zones Z3 to Z0 is kept at the voltage VHSA in a floating state, the node INV of the sense amplifier unit Inhibit SAU connected to the bit line Inhibit BL in the zones Z3 to Z0 is supplied with the low-level voltage, and the node SCOM of the sense amplifier unit SAU connected to the bit line Inhibit BL in the zones Z0 to Z0 is supplied with the voltage VHSA. In addition, the bit line QPWBL in the zone Z3 is supplied with the voltage SRCGND[3], the bit line QPWBL in the zone Z2 is supplied with the voltage SRCGND[2], the bit line QPWBL in the zone Z1 is supplied with the voltage SRCGND[1], the bit line QPWBL in the zone Z0 is supplied with the voltage SRCGND[0], the node INV of the sense amplifier unit SAU connected to the bit line QPWBL in the zones Z3 to Z0 is supplied with the high-level voltage, the node INV of the sense amplifier unit SAU connected to the bit line QPWBL in the zone Z3 is supplied with the voltage SRCGND[3], the node SCOM of the sense amplifier unit SAU connected to the bit line QPWBL in the zone Z2 is supplied with the voltage SRCGND[2], the node SCOM of the sense amplifier unit SAU connected to the bit line QPWBL in the zone Z1 is supplied with the voltage SRCGND[1], and the node SCOM of the sense amplifier unit SAU connected to the bit line QPWBL in the zone Z0 is supplied with the voltage SRCGND[0]. Further, the bit line Program BL in the zone Z3 is supplied with the voltage SRCGND[3], the bit line Program BL in the zone Z2 is supplied with the voltage SRCGND[2], the bit line Program BL in the zone Z1 is supplied with the voltage SRCGND[1], the bit line Program BL in the zone Z0 is supplied with the voltage SRCGND[0], the node INV of the sense amplifier unit SAU connected to the bit line Program BL in the zones Z3 to Z0 is supplied with the high-level voltage, the node SCOM of the sense amplifier unit SAU connected to the bit line Program BL in the zone Z3 is supplied with the voltage SRCGND[3], the node SCOM of the sense amplifier unit SAU connected to the bit line Program BL in the zone Z2 is supplied with the voltage SRCGND[2], the node SCOM of the sense amplifier unit SAU connected to the bit line Program BL in the zone Z1 is supplied with the voltage SRCGND[1], and the node SCOM of the sense amplifier unit SAU connected to the bit line Program BL in the zone Z0 is supplied with the voltage SRCGND[0].

Similar to the time t03 to the time t10 in the first operation period, from the time t10 to the time t25 in the second operation period and the third operation period following the first operation period, the inhibit line Inhibit BL in the zones Z3 to Z0 is kept at the voltage VJSA in the floating state, the node INV of the sense amplifier unit SAU connected to the bit line Inhibit BL in the zones Z3 to Z0 is supplied with the low-level voltage, and the node SCOM of the sense amplifier unit SAU connected to the bit line Inhibit BL in the zones Z3 to Z0 is supplied with the voltage VHSA. Therefore, in the second operation period and the third operation period described in the following [1-9-3-2. Example of Second Operation Period] and [1-9-3-3. Example of Third Operation Period], descriptions of the voltages supplied to the bit line Inhibit BL in the zones Z3 to Z0, the node INV of the sense amplifier unit SAU connected to the bit line Inhibit BL in the zones Z3 to Z0, and the node SCOM of the sense amplifier unit SAU connected to the bit line Inhibit BL in the zones Z3 to Z0 may be omitted.

1-9-3-2. Example of Second Operation Period

Voltages and the like supplied to each signal line and each node in the entire second operation period (time t10 to time t20) will be mainly described with reference to FIG. 20 to FIG. 25. In the program operation according to the first embodiment, following the first operation, the second operation in the second operation period is performed on the memory cell transistor MT included in the NAND strings 50o and 50e using the sequencer 24. The second operation period is a period (a QPWBL voltage setting period) in which a voltage is set to the bit line QPWBL.

In the entire second operation period (time t10 to time t20) shown in FIG. 21 or FIG. 22, similar to the time t03 to the t10, the bit line Program BL in the zone Z3 is supplied with the voltage SRCGND[3], the bit line Program BL in the zone Z2 is supplied with the voltage SRCGND[2], the bit line Program BL in the zone Z1 is supplied with the voltage SRCGND[1], the bit line Program BL in the zone Z0 is supplied with the voltage SRCGND[0], the node INV of the sense amplifier unit SAU connected to the bit line Program BL in the zones Z3 to Z0 is supplied with the high-level voltage, the node SCOM of the sense amplifier unit SAU connected to the bit line Program BL in the zone Z3 is supplied with the voltage SRCGND[3], the node SCOM of the sense amplifier unit SAU connected to the bit line Program BL in the zone Z2 is supplied with the voltage SRCGND[2], the node SCOM of the sense amplifier unit SAU connected to the bit line Program BL in the zone Z1 is supplied with the voltage SRCGND[1], and the node SCOM of the sense amplifier unit SAU connected to the bit line Program BL in the zone Z0 is supplied with the voltage SRCGND[0].

Voltages and the like supplied to each signal line and each node in the time t10 to the time t12 in the second operation period will be described.

As shown in FIG. 20, the control signal BLC is supplied with the low-level voltage. The select gate line SGD is supplied with the low-level voltage from the time t10 to the time t11, and is supplied with a voltage VSGD from the low-level voltage from the time t11 to the time t12. The voltage VSG is higher than a voltage VQPW by a threshold voltage of the select transistor ST1 and lower than the voltage VHSA.

From the time t10 to the time t12 of the second operation period shown in FIG. 21 or FIG. 22, similar to the time t03 to the time t10, the bit line QPWBL in the zone Z3 is supplied with the voltage SRCGND[3], the bit line QPWBL in the zone Z2 is supplied with the voltage SRCGND[2], the bit line QPWBL in the zone Z1 is supplied with the voltage SRCGND[1], the bit line QPWBL in the zone Z0 is supplied with the voltage SRCGND[0], the node INV of the sense amplifier unit SAU connected to the bit line QPWBL in the zones Z3 to Z0 is supplied with the high-level voltage, the node SCOM of the sense amplifier unit SAU connected to the bit line QPWBL in the zone Z3 is supplied with the voltage SRCGND[3], the node SCOM of the sense amplifier unit SAU connected to the bit line QPWBL in the zone Z2 is supplied with the voltage SRCGND[2], the node SCOM of the sense amplifier unit SAU connected to the bit line QPWBL in the zone Z1 is supplied with the voltage SRCGND[1], and the node SCOM of the sense amplifier unit SAU connected to the bit line QPWBL in the zone Z0 is supplied with the voltage SRCGND[0].

Next, voltages and the like supplied to each signal line and each node in the time t12 to the time t13 in the second operation time period will be described. The select gate line SGD holds the voltage VSGD.

Voltages supplied to each of the bit line QPWBL in the zones Z3 to Z0, the node INV of the sense amplifier unit SAU connected to the bit line QPWBL in the zones Z3 to Z0, and the node SCOM of the sense amplifier unit SAU connected to the bit line QPWBL in the zones Z3 to Z0 shown in FIG. 21 or FIG. 22 will be described with reference to the schematic circuit diagram of the sense amplifier unit SAU of FIG. 24.

The node INV of the latch circuit SDL holds "0" (a voltage at a low-level), and the node LAT of the latch circuit SDL holds "1" (a voltage at a high level). Therefore, the transistor 120 connected to the node INV is turned on, and the transistor 124 connected to the node INV is turned off. Although not shown, the control BLX is supplied with the high-level voltage, and the transistor 121 is turned on. The control signal BLC is supplied with a voltage VBLC_QPW, and the transistor 122 is turned on. Therefore, for example, the node SCOM is supplied with the voltage VHSA. Since the voltage VBLC_QPW is smaller than the voltage VHSA, the bit line BL is supplied with a voltage VBLC_QPW-Vthblc. The voltage VBLC_QPW-Vthblc is a voltage lower than the voltage VBLC_QPW by the threshold voltage Vthblc of the transistor 122.

Therefore, in the time t12 to the time t13 in the second operation period shown in FIG. 21 or FIG. 22, the bit line QPWBL in the zone Z3 is supplied with the voltage VQPW (=VBLC_QPW-Vthblc) from the voltage SRCGND[3], the bit line QPWBL in the zone Z2 is supplied with the voltage VQPW from the voltage SRCGND[2], the bit line QPWBL in the zone Z1 is supplied with the voltage VQPW from the voltage SRCGND[1], the bit line QPWBL in the zone Z0 is supplied with the voltage VQPW from the voltage SRCGND[0], the node INV of the sense amplifier unit connected to the bit line QPWBL in the zones Z3 to Z0 is supplied with the low-level voltage from the high-level voltage, the node SCOM of the sense amplifier unit SAU connected to the bit line QPWBL in the zone Z3 is supplied with the voltage VHSA from the voltage SRCGND[3], the node SCOM of the sense amplifier unit SAU connected to the bit line QPWBL in the zone Z2 is supplied with the voltage VHSA from the voltage SRCGND[2], the node SCOM of the sense amplifier unit SAU connected to the bit line QPWBL in the zone Z1 is supplied with the voltage VHSA from the voltage SRCGND[1], and the node SCOM of the sense amplifier unit SAU connected to the bit line QPWBL in the zone Z0 is supplied with the voltage VHSA from the voltage SRCGND[0].

Therefore, in the time t13, the select gate line SGD is supplied with the voltage VSGD, and the bit line QPWBL in the zones Z3 to Z0 is supplied with the voltage VQPW. In this case, the select transistor ST1 (see FIG. 12) included in the NAND strings 50o and 50e (see FIG. 12) is turned on based on the voltage differential between the voltage VSGD and the voltage VQPW. That is, a current flows through the part of the channel of the memory cell transistor MT electrically connected to the bit line QPWBL.

Next, voltages and the like supplied to each signal line and each node in the time t13 to the time t20 in the second operation time period will be described. As shown in FIG. 20, the control signal BLC holds the voltage VBLC_QPW. The select gate line SGD holds the voltage VSGD. Similar to the time t12 to the time t13 shown in FIG. 21 or 22, the bit line QPWBL in the zones Z3 to Z0 is supplied with the voltage VQPW, the node INV of the sense amplifier unit SAU connected to the bit line QPWBL in the zones Z3 to Z0 is supplied with the low-level voltage, and the node SCOM of the sense amplifier unit SAU connected to the bit line QPWBL in the zones Z3 to Z0 is supplied with the voltage VHSA.

Similar to the time t13 to the time t20 in the second operation period, in the time t20 to the time t25 in the third operation period following the second operation period, the bit line QPWBL in the zones Z3 to Z0 is supplied with the voltage VQPW, the node INV of the sense amplifier unit SAU connected to the bit line QPWBL in the zones Z3 to Z0 is supplied with the low-level voltage, and the node SCOM of the sense amplifier unit INV connected to the bit line QPWBL in the zones Z3 to Z0 is supplied with the voltage VHSA. Therefore, in the third operation period described in the following [1-9-3-3. Example of Third Operation Period], descriptions of the voltages supplied to the bit line QPWBL in the zones Z3 to Z0, the node INV of the sense amplifier unit SAU connected to the bit line QPWBL in the zones Z3 to Z0, and the node SCOM of the sense amplifier unit SAU connected to the bit line QPWBL in the zones Z3 to Z0 may be omitted.

1-9-3-3. Example of Third Operation Period

Voltages and the like supplied to each signal line and each node in the entire third operation period (time t20 to time t25) will be mainly described with reference to FIG. 20 to FIG. 25. In the program operation according to the first embodiment, following the second operation, the third operation in the third operation period is performed on the memory cell transistor MT included in the NAND strings 50o and 50e using the sequencer 24. The third operation period is a period (a Program BL voltage setting period) in which a voltage is set to the bit line Program BL.

Voltages and the like supplied to each signal line and each node in the time t20 to the time t22 in the third operation time will be described.

As shown in FIG. 20, the control signal BLC holds the voltage VBLC_QPW. The select gate line SGD holds the voltage VSGD. The voltage VSG is higher than the voltage SRCGND0 by the threshold voltage of the select transistor ST1.

In the time t20 to the time t22 of the third operating period shown in FIG. 21 or FIG. 22, similar to the time t03 to the time t10, the bit line Program BL in the zones Z3 to Z0 is supplied with the low-level voltage, the node INV of the sense amplifier unit SAU connected to bit line Program BL in the zones Z3 to Z0 is supplied with the high-level voltage, the node SCOM of the sense amplifier unit SAU connected to bit line Program BL in the zone Z3 is supplied with the voltage SRCGND[3], the node SCOM of the sense amplifier unit SAU connected to bit line Program BL in the zone Z2 is supplied with the voltage SRCGND[2], the node SCOM of the sense amplifier unit SAU connected to bit line Program BL in the zone Z1 is supplied with the voltage SRCGND[1], and the node SCOM of the sense amplifier unit SAU connected to bit line Program BL in the zone Z0 is supplied with the voltage SRCGND[0].

Next, voltages and the like supplied to each signal line and each node in the time t25 to the time t22 in the second operation time period will be described. The select gate line SGD holds the voltage VSGD.

Voltages supplied to each of the bit line Program BL in the zones Z3 to Z0, the node INV of the sense amplifier unit SAU connected to the bit line Program BL in the zones Z3 to Z0, and the node SCOM of the sense amplifier unit SAU connected to the bit line Program BL in the zones Z3 to Z0 shown in FIG. 21 or FIG. 22 will be described with reference to the schematic circuit diagram of the sense amplifier unit SAU of FIG. 25. Although an example in which the control signal BLC shown in FIG. 25 is supplied with the voltage VTH is shown, it is assumed that the control signal BLC holds the voltage of the voltage VBL_QPW and the transistor 122 connected to the control signal BLC is turned on in the description of the time t22 to the time t25 in the third operation period.

The node INV of the latch circuit SDL holds "1" (a voltage at a high level), and the node LAT of the latch circuit SDL holds "0" (a voltage at a low-level). Therefore, the transistor 120 connected to the node INV is turned OFF, and the transistor 124 connected to the node INV is turned ON. The control signal BLC is supplied with the low-level voltage, and the transistor 122 is turned off. Therefore, for example, the bit line BL is supplied with the voltage SRCGND[m:0] from the node SRC via the node SCOM. In the semiconductor memory device 1 of the present disclosure, the voltage SRCGND[m:0] is the voltage SRCGND[0], the voltage SRCGND[1], the voltage SRCGND[2], and the voltage SRCGND[3].

Therefore, in the time t22 to the time t25 of the third operation period shown in FIG. 21 or FIG. 22, the bit line Program BL in the zone Z3 is supplied with the voltage SRCGND[3], the bit line Program BL in the zone Z2 is supplied with the voltage SRCGND[2] from the low-level voltage, the bit line Program BL in the zone Z1 is supplied with the voltage SRCGND[1] from the low-level voltage, the bit line Program BL in the zone Z0 is supplied with the voltage SRCGND[0] from the low-level voltage, the node INV of the sense amplifier unit SAU connected to the bit line Program BL in the zones Z3 to Z0 is supplied with the high-level voltage, the node SCOM of the sense amplifier unit SAU connected to the bit line Program BL in the zone Z3 is supplied with the voltage SRCGND[3], the node SCOM of the sense amplifier unit SAU connected to the bit line Program BL in the zone Z2 is supplied with the voltage SRCGND[2], the node SCOM of the sense amplifier unit SAU connected to the bit line Program BL in the zone Z1 is supplied with the voltage SRCGND[1], and the node SCOM of the sense amplifier unit SAU connected to the bit line Program BL in the zone Z0 is supplied with the voltage SRCGND[0].

In addition, in the time t22 to the time t25 in the third operation period shown in FIG. 20, the selected word line SEL-WL is supplied with a voltage VPASS from the low-level voltage and then supplied with the voltage VPGM. Thereafter, the selected word line SEL-WL is lowered from the voltage VPGM to the voltage VPASS. The unselected word line USEL-WL is supplied with the voltage VPASS from the low-level voltage.

For example, focusing on the zone Z3, the channel of the memory cell transistor MT connected to the bit line Program BL in the zone Z3 is supplied with the voltage SRCGND[3]. In the memory cell transistor MT connected to the bit line Program BL in the zone Z3, the voltage VPGM is supplied to the gate electrode of the memory cell transistor MT to which the selected word line SEL-WL is connected. As a result, a voltage VPGM-voltage SRCGND[3] is supplied between the gate electrode and the channel. Therefore, in the bit line Program BL in the zone Z3, the threshold voltage of the memory cell transistor MT connected to the selected word line SEL-WL is raised.

Similar to the zone Z3, a voltage VPGM-voltage SRCGND[2] is supplied between the gate electrode and the channel of the memory cell transistor MT connected to the bit line Program BL in the zone Z2, a voltage VPGM-voltage SRCGND[1] is supplied between the gate electrode and the channel of the memory cell transistor MT connected to the bit line Program BL in the zone Z1, and a voltage VPGM-SRCGND[0] is supplied between the gate electrode and the channel of the memory cell transistor MT connected to the bit line Program BL in the zone Z0. Therefore, in the bit line Program BL in the zone Z2 to the zone Z0, the threshold voltage of the memory cell transistor MT connected to the selected word line SEL-WL is raised.

Voltages and the like supplied to each signal line and each node after the time t25 in the third operation period will be described. The select gate line SGD, the selected word line SEL-WL, the unselected word line USEL-WL, and the control signal BLC are supplied with the low-level voltage. The bit line Program BL in the zone Z3 is supplied with the voltage SRCGND[3], the bit line Program BL in the zone Z2 is supplied with the voltage SRCGND[2], the bit line Program BL in the zone Z1 is supplied with the voltage SRCGND[1], the bit line Program BL in the zone Z0 is supplied with the voltage SRCGND[0], the node INV of the sense amplifier unit SAU connected to the bit line Program BL in the zones Z3 to Z0 is supplied with the low-level voltage from the high-level voltage, the node SCOM of the sense amplifier unit SAU connected to the bit line Program BL in the zone Z3 is supplied with the voltage SRCGND[3], the node SCOM of the sense amplifier unit SAU connected to the bit line Program BL in the zone Z2 is supplied with the voltage SRCGND[2], the node SCOM of the sense amplifier unit SAU connected to the bit line Program BL in the zone Z1 is supplied with the voltage SRCGND[1], and the node SCOM of the sense amplifier unit SAU connected to the bit line Program BL in the zone Z0 is supplied with the voltage SRCGND[0].

As described above, the third operation period ends. In the third operation period, although the program voltage VPGM is supplied to the word line WL, a voltage higher than the voltage VSS is supplied from the bit line Program BL to the channel of the memory cell transistor MT depending on the distance from the replacement hole STH. As a result, since the effective program voltage VPGM can be reduced for each zone corresponding to the distance from the replacement hole STH, the threshold voltage can be stored in the memory cell transistor MT of each zone using a voltage suitable for the thickness of the insulating layer of the memory cell transistor MT for each zone.

1-10. First Modification of Configuration of Sense Amplifier and Driver Set

Figure 26:
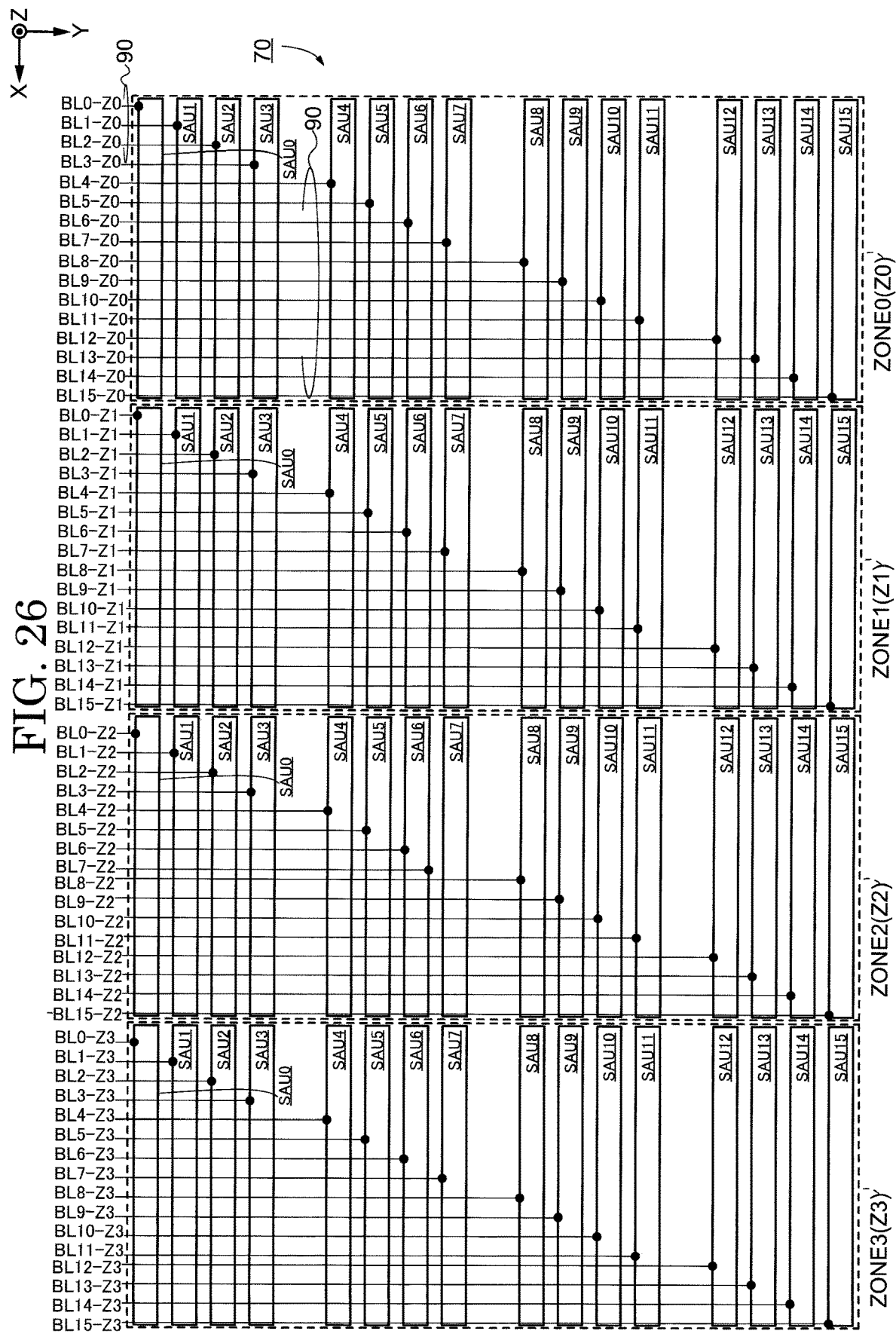
FIG. 26 is a block diagram showing a first modification of a configuration of a sense amplifier module included in a semiconductor memory device according to the first embodiment.
Figure 27:
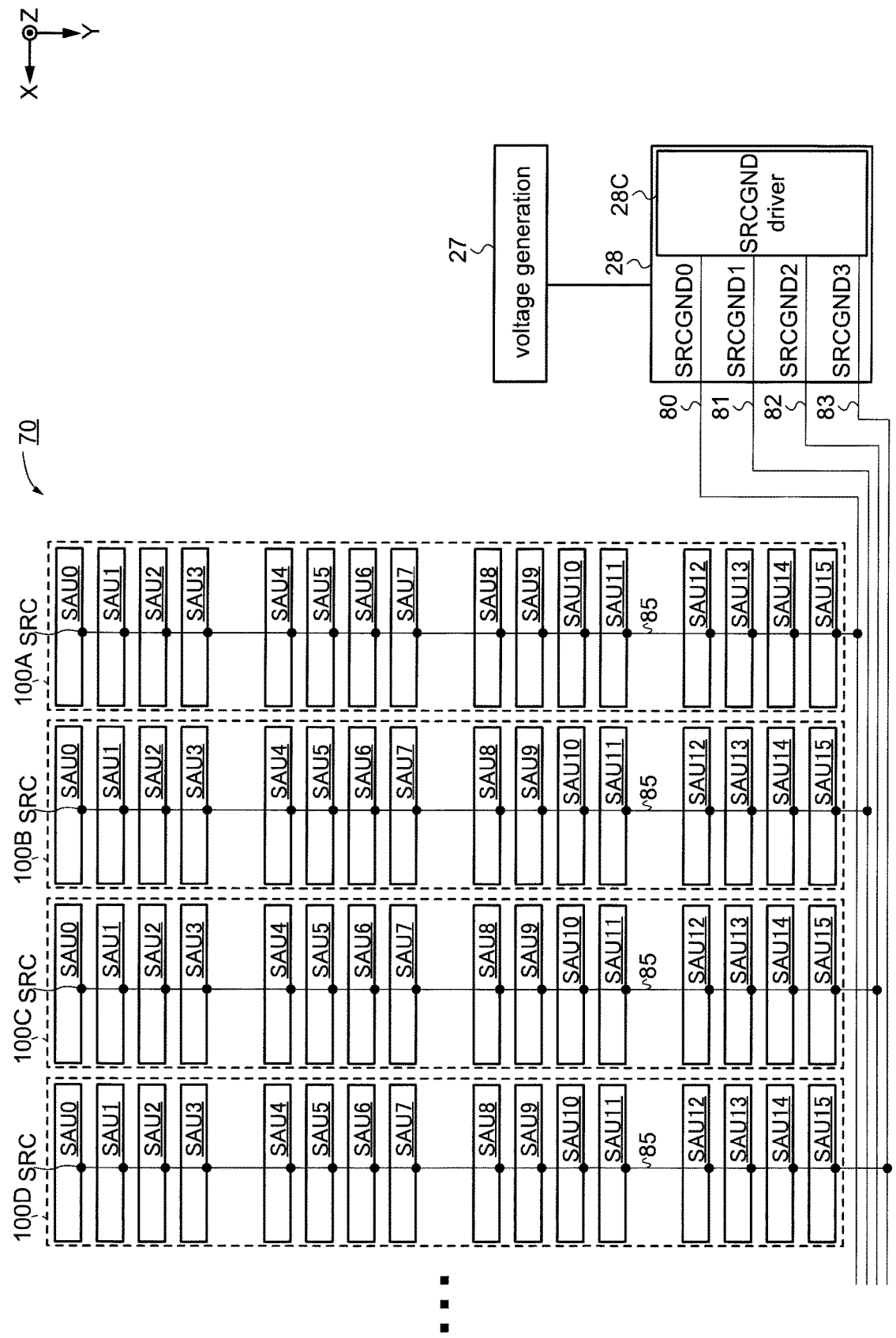
FIG. 27 is a block diagram showing a first modification of a configuration of a driver set included in a semiconductor memory device according to the first embodiment.

A first modification of the configuration of the sense amplifier module 70 and the driver set 28 included in the semiconductor memory device 1 according to the first embodiment will be described with reference to FIG. 26 and FIG. 27. FIG. 26 is a block diagram showing a first modification of the configuration of the sense amplifier module 70 included in the semiconductor memory device 1 according to the first embodiment, and is a diagram for explaining the connectivity between the plurality of sense amplifier units SAU0 to SAU15 in the sense amplifier groups 100A to 100D included in the sense amplifier module 70 and the plurality of bit lines BL0-Z0 to BL15-Z3. FIG. 27 is a block diagram showing a first modification of the configuration of the driver set 28 included in the semiconductor memory device 1 according to the first embodiment, and is a diagram for explaining the connection between the driver set 28 and the plurality of sense amplifier groups 100A to 100D. The first modification of the configuration of the sense amplifier module 70 and the driver set 28 according to the first embodiment is not limited to the configuration shown in FIG. 26 and FIG. 27. In the description of FIG. 26 and FIG. 27, descriptions of the same or similar configurations as those of FIG. 1 to FIG. 25 may be omitted.

The configuration of the first modification shown in FIG. 26 is different from the configuration of the sense amplifier module 70 and the driver set 28 shown in FIG. 16 and FIG. 17 in that the plurality of sense amplifier groups 100A to 100D is arranged in the extending direction (direction Y) of the bit line BL. In the configuration of the first modification shown in FIG. 26, since the other points are the same as the configurations of the sense amplifier module 70 and the driver set 28 shown in FIG. 16 and FIG. 17, the differences will be mainly described here.

For example, in the first modification, each of the bit lines BL0-Z0 to BL15-Z0 included in the zone Z0 is electrically connected to the corresponding sense amplifier unit SAU in a one-to-one manner among the sense amplifier units SAU0 to SAU15 by using the wiring 90 indicated by the solid line in the direction Y. For example, the bit line BL0-Z0 is electrically connected to the sense amplifier unit SAU0 using the wiring 90 indicated by the solid line in the direction Y, and the bit line BL7-Z0 is electrically connected to the sense amplifier unit SAU7 using the wiring 90 indicated by the solid line in the direction Y.

Similar to the sense amplifier group 100A, each of the sense amplifier units SAU0 to SAU15 in the sense amplifier group 100B is electrically connected to the bit lines BL0-Z1 to BL15-Z1 included in the zone Z1 in a one-to-one manner using the wiring 90 indicated by the solid line in the direction Y, each of the sense amplifier units SAU0 to SAU15 in the sense amplifier group 100C is electrically connected to the bit lines BL0-Z2 to BL15-Z2 included in the zone Z2 in a one-to-one manner using the wiring 90 indicated by the solid line in the direction Y, and each of the sense amplifier units SAU0 to SAU15 in the sense amplifier group 100D is electrically connected to the bit lines BL0-Z3 to BL15-Z3 included in the zone Z3 in a one-to-one manner using the wiring 90 indicated by the solid line in the direction Y.

Next, the first modification of the configuration of the driver set 28 included in the semiconductor memory device 1 according to the first embodiment will be described with reference to FIG. 27. The configuration of the first modification shown in FIG. 27 is different from the configuration of the driver set 28 shown in FIG. 18 in that the plurality of sense amplifier groups 100A to 100D is arranged in the extending direction (direction Y) of the bit line BL, and that each of the sense amplifier units SAU0 to SAU15 included in the plurality of sense amplifier groups 100A to 100D is electrically connected to each of the source ground supply lines 80 to 83 via a wiring 85 indicated by the solid line in the direction Y. In the configuration of the first modification shown in FIG. 27, since the other points are the same as the configuration of the sense amplifier module 70 and the driver set 28 shown in FIG. 18, differences will be mainly described here.

In the embodiment shown in FIG. 27, for example, the wiring 85 in the direction Y is electrically connected to each of the source ground supply lines 80 to 83 that supply the source ground voltage. The wiring 85 indicated by the solid line in the direction Y is electrically connected to the node SRC of the sense amplifier units SAU0 to SAU15 included in each sense amplifier group 100.

Similar to the SRCGND driver 28C shown in FIG. 18, the SRCGND driver 28C shown in FIG. 27 supplies the voltage SRCGND0 (SRCGND[0]) to the source ground supply line 80, supplies the voltage SRCGND1 (SRCGND[1]) to the source ground supply line 81, supplies the voltage SRCGND2 (SRCGND[2]) to the source ground supply line 82, and supplies the voltage SRCGND3 (SRCGND[3]) to the source ground supply line 83.

The sense amplifier units SAU0 to SAU15 in the sense amplifier group 100A are supplied with the voltage SRCGND0 (SRCGND[0]) via the wiring 85 indicated by the solid line in the direction Y. The sense amplifier units SAU0 to SAU15 in the sense amplifier group 100B are supplied with the voltage SRCGND1 (SRCGND[1]) via the wiring 85 indicated by the solid line in the direction Y. The sense amplifier units SAU0 to SAU15 in the sense amplifier group 100C are supplied with the voltage SRCGND2 (SRCGND[2]) via the wiring 85 indicated by the solid line in the direction Y. The sense amplifier units SAU0 to SAU15 in the sense amplifier group 100D are supplied with the voltage SRCGND3 (SRCGND[3]) via the wiring 85 indicated by the solid line in the direction Y.

In the semiconductor memory device 1 according to the first embodiment, as shown in FIG. 27, the plurality of sense amplifier groups 100A to 100D is arranged parallel to the extending direction (direction Y) of the bit line BL arranged in each zone Z0 to Z3, and the wiring parallel or substantially parallel to the direction Y is used, so that the bit line BL arranged in each zone Z0 to Z3 and the plurality of sense amplifier units SAU0 to SAU15 can be electrically connected. In addition, the plurality of sense amplifier groups 100A to 100D are arranged parallel to the extending direction (direction Y) of the bit line BL arranged in each zone Z0 to Z3, and the wiring parallel to or substantially parallel to the direction Y is used, so that the plurality of sense amplifier units SAU0 to SAU15 in the plurality of sense amplifier groups 100A to 100D can be electrically connected to the source ground supply lines 80 to 83 that supply the source ground voltages different from each other.

Figure 28:
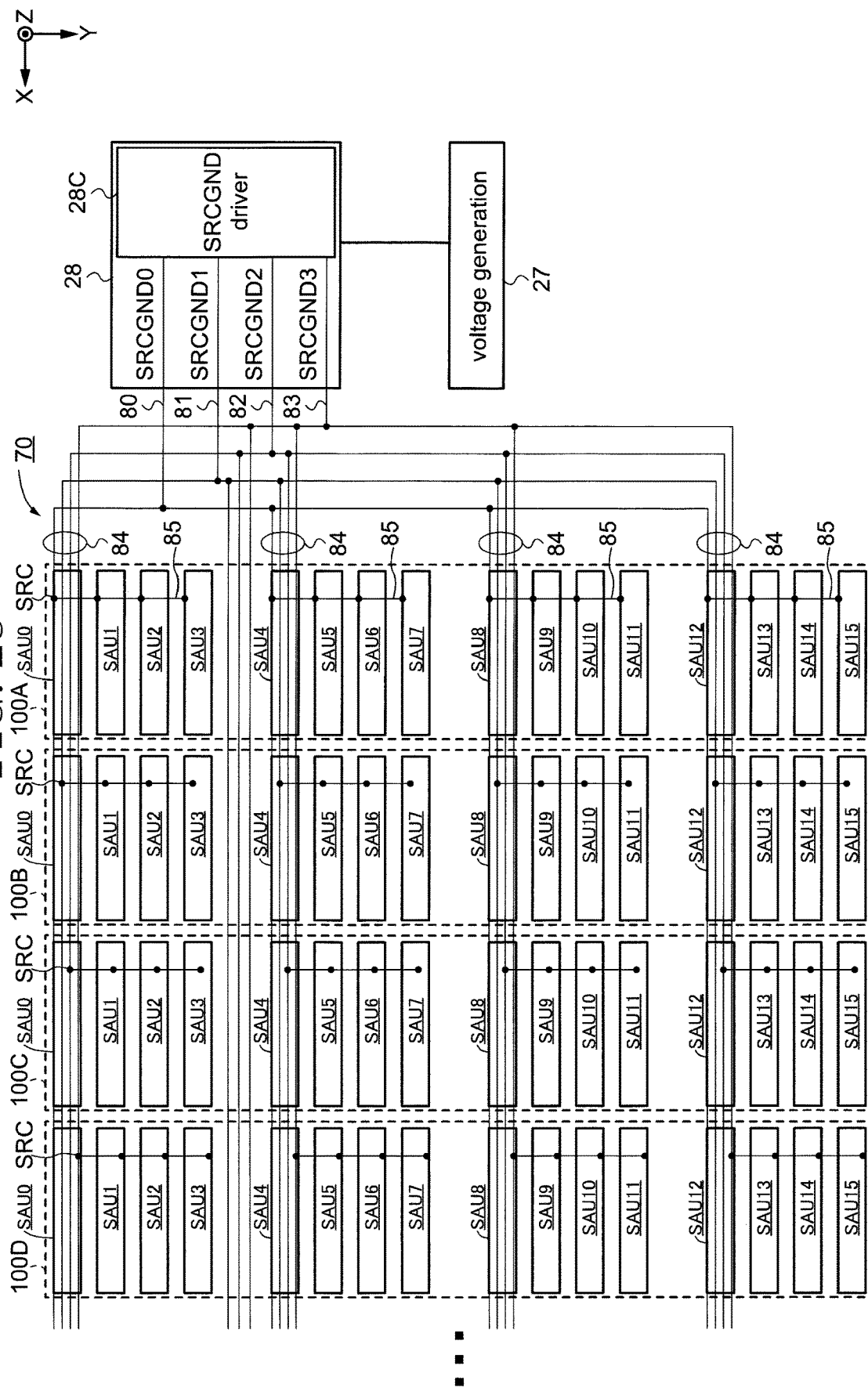
FIG. 28 is a block diagram showing a second modification of a configuration of a driver set included in a semiconductor memory device according to the first embodiment.

1-11. Second Modification of Configuration of Sense Amplifier and Driver Set A second modification of the configuration of the sense amplifier module 70 and the driver set 28 included in the semiconductor memory device 1 according to the first embodiment will be described with reference to FIG. 28. FIG. 28 is a block diagram showing a second modification of the configuration of the driver set 28 included in the semiconductor memory device 1 according to the first embodiment, and is a diagram for explaining the connection between the driver set 28 and the plurality of sense amplifier groups 100A to 100D. The second modification of the configuration of the driver set 28 according to the first embodiment is not limited to the configuration shown in FIG. 28. In the description of FIG. 28, descriptions of the same or similar configurations as those in FIG. 1 to FIG. 27 may be omitted.

The configuration of the second modification illustrated in FIG. 28 is different from the configuration of the first modification shown in FIG. 27 in that the sense amplifier units SAU0 to SAU15 in the plurality of sense amplifier groups 100A to 100D are connected to the driver set 28 by using the wiring 85 in the direction Y, the wiring 84 in the direction X, and the source ground supply lines 80 to 83 for supplying the voltage SRCGND. In the configuration of the second modification shown in FIG. 28, since the other points are the same as the configuration of the second modification example shown in FIG. 27, differences will be mainly described here.

For example, in the second modification, using the wiring 84 indicated by the solid line in the direction X and the wiring 85 indicated by the solid line in the direction Y, the source ground supply line 80 and the sense amplifier units SAU0 to SAU15 in the sense amplifier group 100A are electrically connected, the source ground supply line 81 and the sense amplifier units SAU0 to SAU15 in the sense amplifier group 100B are electrically connected, the source ground supply line 82 and the sense amplifier units SAU0 to SAU15 in the sense amplifier group 100C are electrically connected, and the source ground supply line 83 and the sense amplifier units SAU0 to SAU15 in the sense amplifier group 100D are electrically connected.

As a result, the voltage SRCGND0 (SRCGND[0]) is supplied to the sense amplifier units SAU0 to SAU15 in the sense amplifier group 100A via the source ground supply line 80, the wiring 84 indicated by the solid line in the direction X, and the wiring 85 indicated by the solid line in the direction Y, the voltage SRCGND1 (SRCGND[1]) is supplied to the sense amplifier units SAU to SAU15 in the sense amplifier group 100B via the source ground supply line 81, the wiring 84 indicated by the solid line in the direction X, and the wiring 85 indicated by the solid line in the direction Y, the voltage SRCGND2 (SRCGND[2]) is supplied to the sense amplifier units SAU0 to SAU15 in the sense amplifier group 100C via the source ground supply line 82, the wiring 84 indicated by the solid line in the direction X, and the wiring 85 indicated by the solid line in the direction Y, and the voltage SRCGND3 (SRCGND[3]) is supplied to the sense amplifier units SAU0 to SAU15 in the sense amplifier group 100D via the source ground supply line 83, the wiring 84 indicated by the solid line in the direction X, and the wiring 85 indicated by the solid line in the direction Y.

In the second modification, the source ground supply line 80 and the sense amplifier units SAU0 to SAU15 in the sense amplifier group 100A are electrically connected by using the wiring 84 indicated by the solid line in the direction X and the wiring 85 indicated by the solid line in the direction Y. As a result, in the semiconductor memory device 1 of the present disclosure, as compared with the case where either one of the wiring 84 indicated by the solid line in the direction X or the wiring 85 indicated by the solid line in the direction Y is used, it is possible to reduce the delay of signals caused by the wiring resistance and the capacitance between wirings.

Second Embodiment

The semiconductor memory device 1 according to the second embodiment is different from the semiconductor memory device 1 according to the first embodiment in that the signal supplied to the control signal BLC of the sense amplifier unit SAU (see FIG. 19) is controlled for each zone Z3 to Z0 in order to adjust the effective program voltage supplied to the memory cell transistor MT. Although details will be described later, since the sense amplifier unit SAU is electrically connected to the bit line BL, the voltage supplied to the bit line BL is controlled for each zone Z3 to Z0, and the signal supplied to the control signal BLC is controlled for each zone Z3 to Z0. As a result, the effective program voltage supplied to the memory cell transistor MT can be adjusted for each zone Z3 to Z0. As a result, it is possible to suppress the program variation of the memory cell by using the semiconductor memory device 1 of the present disclosure.

2-1. Example of Configuration of Sense Amplifier and Driver Set

An example of the configuration of the sense amplifier module 70 and the driver set 28 included in the semiconductor memory device 1 according to the second embodiment will be described with reference to FIG. 29. FIG. 29 is a block diagram showing an example of a configuration of the driver set 28 included in the semiconductor memory device 1 according to the second embodiment, and is a diagram for explaining the connection between the driver set 28 and the plurality of sense amplifier groups 100A to 100D. The configuration of the sense amplifier module 70 and the driver set 28 according to the second embodiment is not limited to the configuration shown in FIG. 29. In the description of FIG. 29, descriptions of the same or similar configurations as those of FIG. 1 to FIG. 28 may be omitted.

An example of the configuration of the sense amplifier module 70 and the driver set 28 included in the semiconductor memory device 1 according to the second embodiment shown in FIG. 29 is different from the example of the configuration of the sense amplifier module 70 and the driver set 28 included in the semiconductor memory device 1 according to the first embodiment shown in FIG. 18 in that the driver set 28 includes the BLC driver 28D. In the configuration of the sense amplifier module 70 and the driver set 28 included in the semiconductor memory device 1 according to the second embodiment shown in FIG. 29, since the other points are the same as the configuration of the sense amplifier module 70 and the driver set 28 included in the semiconductor memory device 1 according to the first embodiment shown in FIG. 18, differences will be mainly described here.

The driver set 28 shown in FIG. 29 includes the BLC driver 28D. The driver set 28 is electrically connected to the voltage generation circuit 27. The driver set 28 is supplied with the voltage and the control signal from the voltage generation circuit 27.

For example, the BLC driver 28D generates the control signals BLC0 to BLC3 based on the voltage supplied from the voltage generation circuit 27 and the control signal. For example, the control signal BLC0 includes the voltage VTH, the voltage VBLC_QPW, and a voltage VBLC_p0 (VBLC_p[0]). For example, the control signal BLC1 includes the voltage VTH, the voltage VBLC_QPW, and a voltage VBLC_p1 (VBLC_p[1]). For example, the control signal BLC2 includes the voltage VTH, the voltage VBLC_QPW, and a voltage VBLC_p2 (VBLC_p[2]). For example, the control signal BLC3 includes the voltage VTH, the voltage VBLC_QPW, and a voltage VBLC_p3 (VBLC_p[3]). The BLC driver 28D has a function of supplying the control signals BLC0 to BLC3 different for each of the zones Z0 to Z3 to the plurality of sense amplifier units SAU associated with each zone Z0 to Z3.

In the embodiment shown in FIG. 29, for example, a wiring 94 indicated by the solid line in the direction X is electrically connected to each of signal lines 96 to 99 supplying the control signals BLC0 to BLC3. The wiring 94 indicated by the solid line in the direction X is electrically connected to the node SRC control signals BLC of the sense amplifier units SAU0 to SAU15 included in each sense amplifier group 100. Since the signal lines 96 to 99 are supplied with the control signals BLC0 to BLC3, the signal line 96 may be referred to as a "first control signal line", the signal line 97 may be referred to as a "second control signal line", the signal line 98 may be referred to as a "second control signal line", the signal line 99 may be referred to as a "third control signal line", the control signal BLC0 may be referred to as a "first control signal", the control signal BLC1 may be referred to as a "second control signal", the control signal BLC2 may be referred to as a "second control signal", and the control signal BLC3 may be referred to as a "third control signal".

The BLC driver 28D supplies the control signal BLC0 to the signal line 96, the control signal BLC1 to the signal line 97, the control signal BLC2 to the signal line 98, and the control signal BLC3 to the signal line 99.

The sense amplifier units SAU0 to SAU15 in the sense amplifier group 100A are supplied with the control signal BLC0 via the wiring 94 indicated by the solid line in the direction X. The sense amplifier units SAU0 to SAU15 in the sense amplifier group 100B are supplied with the control BLC1 via the wiring 94 indicated by the solid line in the direction X. The sense amplifier units SAU0 to SAU15 in the sense amplifier group 1000 are supplied with the control BLC2 via the wiring 94 indicated by the solid line in the direction X. The sense amplifier units SAU0 to SAU15 in the sense amplifier group 100D are supplied with the control BLC3 via the wiring 94 indicated by the solid line in the direction X.

In the embodiment shown in FIG. 29, although an example in which the BLC driver 28D generates four control signals BLC0 to BLC3 is shown, the number of control signals generated by the BLC driver 28D may be two or more. The control signal generated by the BLC driver 28D may be determined based on the number of zones. In addition, in the semiconductor memory device 1 according to the second embodiment, the wiring indicated by the solid line in the direction X is a wiring arranged parallel or substantially parallel to the direction X, and the wiring indicated by the solid line in the direction Y is a wiring arranged parallel or substantially parallel to the direction Y.

In the semiconductor memory device 1 according to the second embodiment, as shown in FIG. 29, the control signals BLC0 to BLC3 can be supplied to the sense amplifier units SAU0 to SAU15 arranged in the same sense amplifier group 100 by using the wiring 94 parallel or substantially parallel to the direction X. Therefore, the sense amplifier units SAU0 to SAU15 arranged in the same sense amplifier group 100 can supply the control signals BLC0 to BLC3 to the bit lines BL arranged in the same zones Z0 to Z3.

Specifically, the sense amplifier units SAU0 to SAU15 arranged in the sense amplifier group 100A supply the control signal BLC0 to the bit lines BL0-Z0 to BL15-Z0 arranged in the zone Z0, the sense amplifier units SAU0 to SAU15 arranged in the sense amplifier group 100B supply the control signal BLC1 to the bit lines BL0-Z1 to BL15-Z1 arranged in the zone Z1, the sense amplifier units SAU0 to SAU15 arranged in the sense amplifier group 1000 supply the control signal BLC2 to the bit lines BL0-Z2 to BL15-Z2 arranged in the zone Z2, and the sense amplifier units SAU0 to SAU15 arranged in the sense amplifier group 100D supply the control signal BLC3 to the bit line BL0-Z3 to BL15-Z3 arranged in the zone Z3.

2-2. Example of Program Operation

Figure 30:
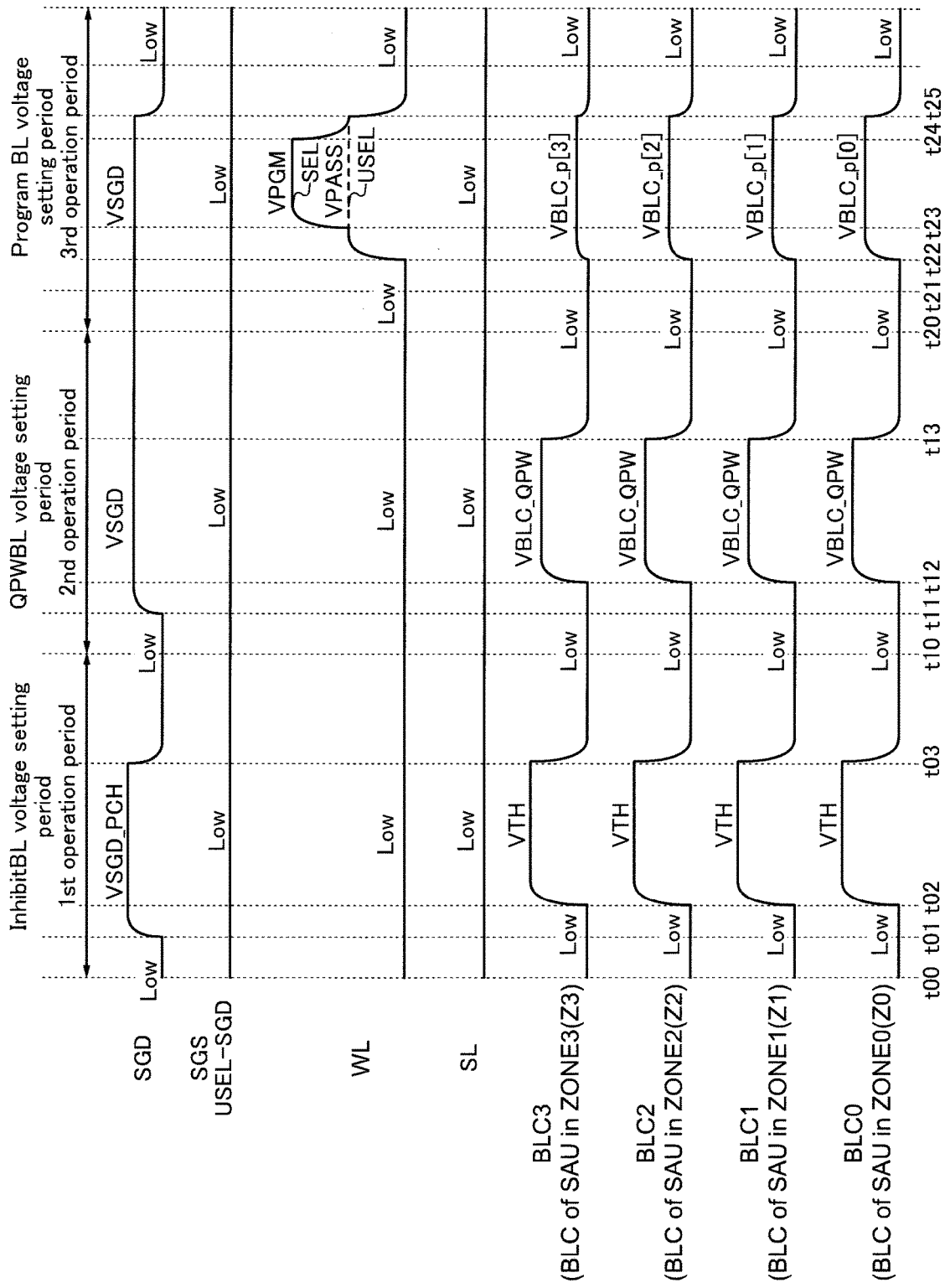
FIG. 30 is a diagram showing a timing chart of various signals at the time of a program operation of a nonvolatile semiconductor memory device according to the second embodiment.
Figure 31:
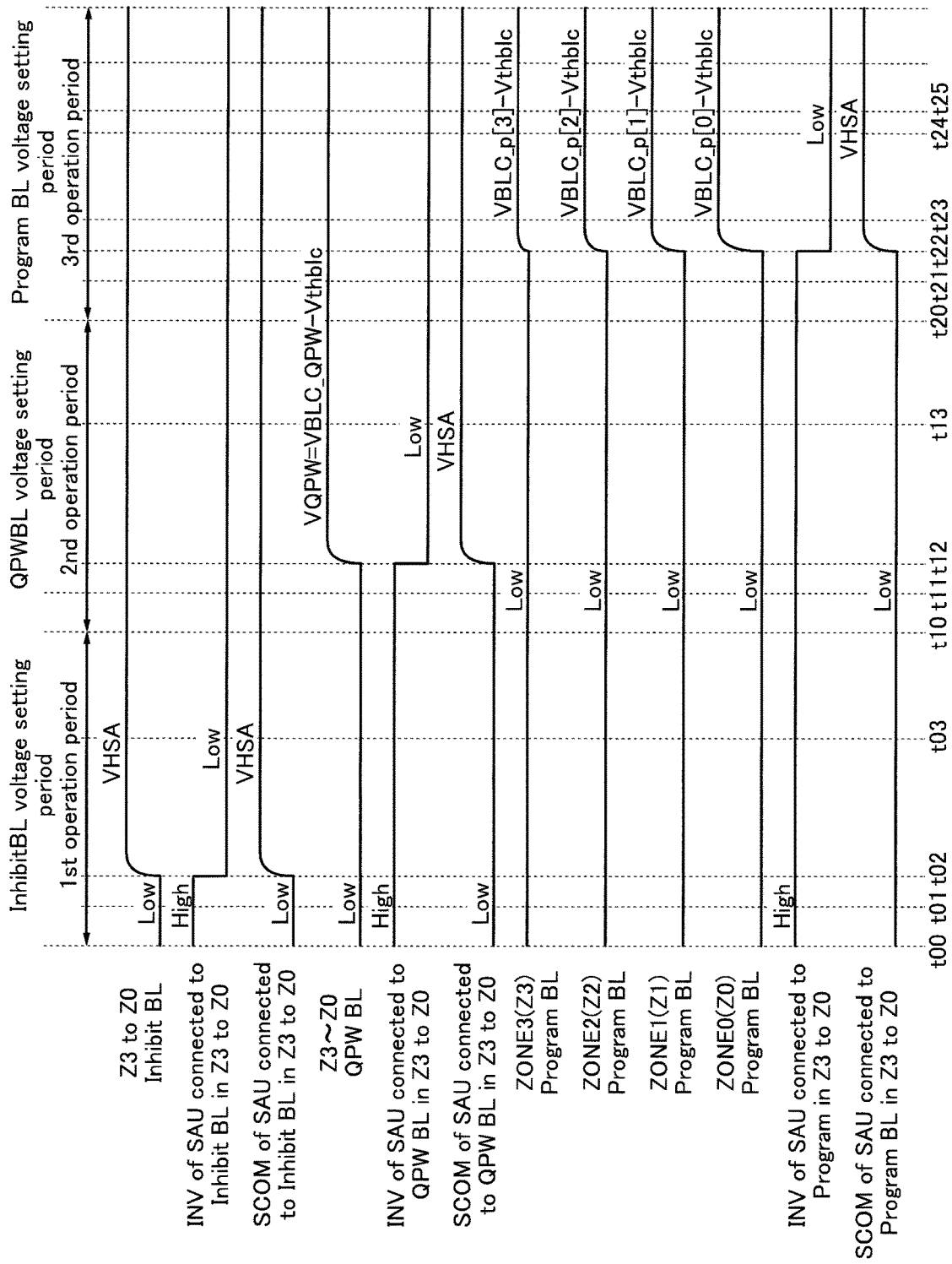
FIG. 31 is a diagram showing a timing chart of various signals at the time of a program operation of a nonvolatile semiconductor memory device according to the second embodiment.
Figure 32:
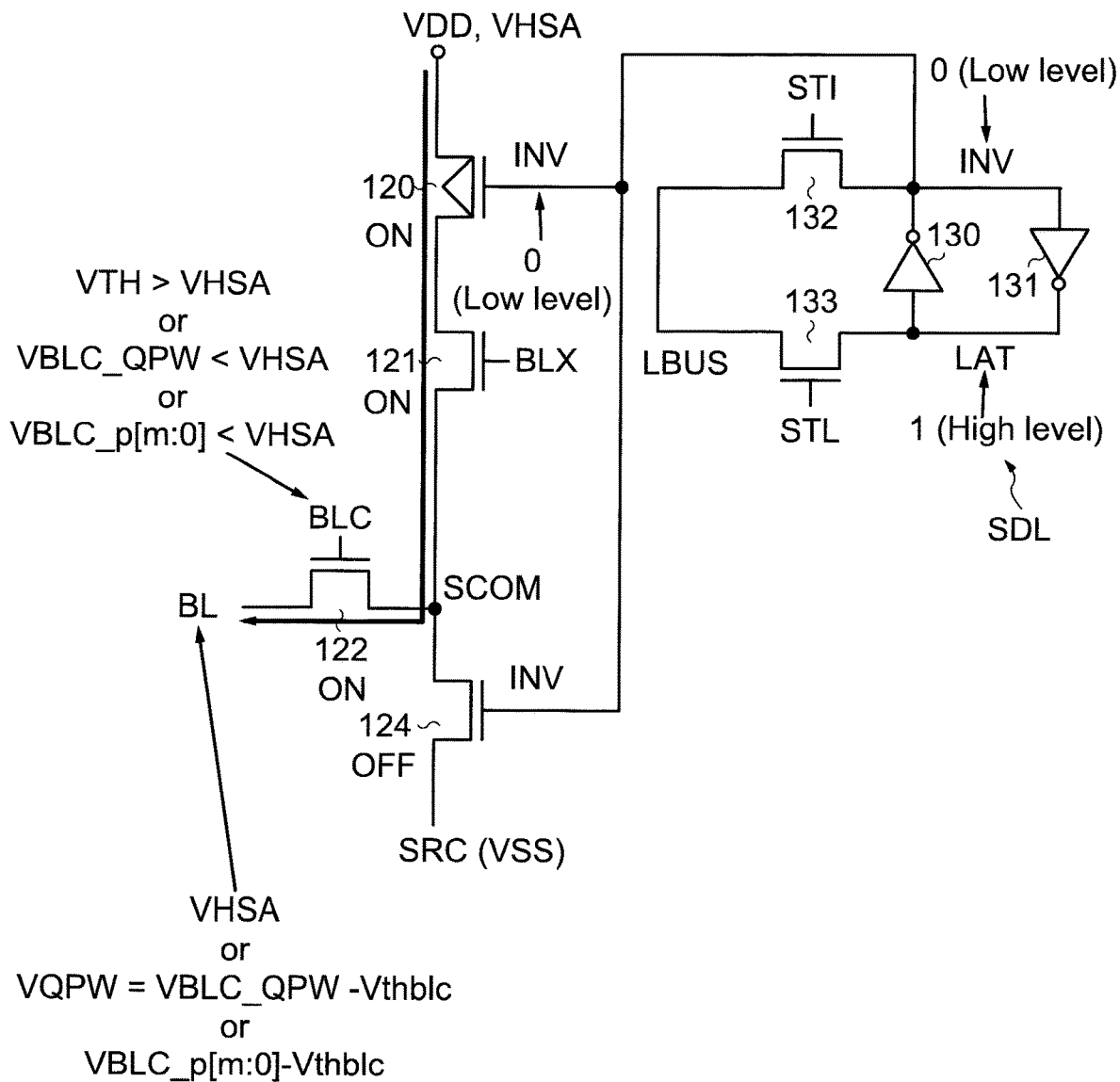
FIG. 32 is a schematic circuit diagram for explaining an operation of a sense amplifier unit SAU at the time of a program operation of a semiconductor memory device according to the second embodiment.

FIG. 30 and FIG. 31 are diagrams showing timing charts of various signals at the time of a program operation of the semiconductor memory device 1 according to the second embodiment. FIG. 32 is a schematic circuit diagram for explaining the operation of the sense amplifier unit SAU at the time of the program operation of the semiconductor memory device 1 according to the second embodiment. The timing charts shown in FIG. 30 and FIG. 31 are schematic timing charts showing an example of temporal changes in voltages supplied to various circuit components. The timing charts shown in FIG. 30 and FIG. 31 and the operation of the sense amplifier unit SAU shown in FIG. 32 are examples, and the timing chart and the operation of the sense amplifier unit SAU of the semiconductor memory device 1 according to the second embodiment are not limited to the examples shown in FIG. 30 to FIG. 32. Descriptions of the same or similar configurations as those in FIG. 1 to FIG. 29 may be omitted.

In the NAND strings 50*o* and 50*e* of the second embodiment (see FIG. 12), since the configurations and functions of the write target memory cell transistor MT, the selected word line SEL-WL, the unselected word line USEL-WL, the bit line Program BL, the bit line QPWBL, and the bit line Inhibit BL are the same as those of the first embodiment, explanation thereof may be omitted here.

Similar to the first embodiment, in the second embodiment, the sequencer 24 (see FIG. 1) controls the voltage generation circuit 27 (see FIG. 1), the row decoder 29 (see FIG. 1), and the sense amplifier module 70 (see FIG. 1), and the voltage generation circuit 27, the row decoder 29, the driver set 28, or the sense amplifier module 70 supplies voltages to the select gate line SGD (for example, the even select gate line SG0), the select gate line SGS (for example, the even select gate line SGSe, the odd select gate line SGSo), the unselected gate line USEL-SGD (for example, the odd select gate line SG1), the selected word line SEL- WL, the unselected word line USEL-WL, the source line SL, the control signal BLC, and the node SRC of the sense amplifier unit SAU.

In the semiconductor memory device 1 according to the second embodiment, the voltage VTH, the voltage VBLC_QPW, the voltage VBLC_p[0], the voltage VBLC_p[1], the voltage VBLC_p[2], or the voltage VBLC_p[3] is supplied to the bit line Program BL using the control signals BLC0 to BLC3.

Similar to the first embodiment, the program operation period in the semiconductor memory device 1 according to the second embodiment includes a period (first operation period) in which a voltage is set to the bit line Inhibit BL, a period (second operation period) in which a voltage is set to the bit line QPWBL, and a period (third operation period) in which a voltage is set to the bit line Program BL.

Since the selected gate line SGS, the unselected gate line USEL-SGD, the selected word line SEL-WL, the unselected word line USEL-WL, the source line SL, the bit line Inhibit BL in the zones Z3 to Z0, the node INV of the sense amplifier unit SAU connected the bit line Inhibit BL in the zones Z3 to Z0, the bit line QPWBL in the zones Z3 to Z0, and the node INV of the sense amplifier unit SAU connected to the bit line QPWBL in the zones Z3 to Z0 shown in FIG. 30 are supplied with the same signals or voltages as those described with reference to FIG. 20 in the entire program operation period (from the time t00 to the time t25) in the semiconductor memory device 1, explanation thereof may be omitted here. In addition, the node SCOM of the sense amplifier unit SAU connected to the bit line Inhibit BL in the zones Z3 to Z0 shown in FIG. 30 and the node SCOM of the sense amplifier unit SAU connected to the bit line QPWBL in the zones Z3 to Z0 are different in that the low-level voltage is supplied during the period in which the same signal shown in FIG. 21 is supplied with the voltage SRCGND[0] to the voltage [SRCGND 3]. Since other configurations and functions are the same as those of the same signals shown in FIG. 21, explanation thereof may be omitted here.

In addition, the voltage VBLC_p3 (VBLC_p[3]) is higher than the voltage VBLC_p2 (VBLC_p[2]), the voltage VBLC_p2 (VBLC_p[2]) is higher than the voltage VBLC_p1 (VBLC_p[1]), and the voltage VBLC_p1 (VBLC_p[1]) is higher than the voltage VBLC_p0 (VBLC_p[0]). The BLC driver 28D has a function of supplying the control signals BLC0 to BLC3 different for each of the zones Z0 to Z3 to the plurality of sense amplifier units SAU associated with each of the zones Z0 to Z3. In the semiconductor storage device 1 according to the second embodiment, the distance from the replacement hole portion STHAR1, the replacement hole portion STHAR2, or the replacement hole portion STHAR3 is further in the order of the zone Z3, zone Z2, zone Z1, and the zone Z0. Therefore, the lower voltage VBLC_p is supplied to the bit line BL allocated to the zone the further the distance from the replacement hole portion STHAR2 or the replacement hole portion STHAR3 the zone is located. In the following explanation, the sense amplifier units SAU0 to SAU15 may be collectively referred to as the sense amplifier unit SAU.

2-2-1. Example of First Operation Period

Voltages and the like supplied to each signal line and each node in the entire first operation period (time t00 to time t10) will be mainly described with reference to FIG. 30 and FIG. 31. Similar to the first embodiment, in the program operation according to the second embodiment, first, the first operation in the first operation period is performed on the memory cell transistor MT included in the NAND strings 50o and 50e using the sequencer 24. The first operation period is a period (the Inhibit BL voltage setting period) in which a voltage is set to the bit line Inhibit BL.

Voltages and the like supplied to each signal line and each node in the time t00 to the time t02 in the first operation period will be described. As shown in FIG. 30, the control signals BLC3 to BLC0 are supplied with the low-level voltage.

Since the voltages supplied to each of the bit line Program BL in the zones Z3 to Z0, the node INV of the sense amplifier unit SAU connected to the bit line Program BL in the zones Z3 to Z0, and the node SCOM of the sense amplifier unit SAU connected to the bit line Program BL in the zones Z3 to Z0 shown in FIG. 31 are the same as those described with reference to the schematic circuit diagram of the sense amplifier unit SAU of FIG. 25 of the first embodiment, explanation thereof may be omitted here.

The bit line Program BL in the zones Z3 to Z0 is supplied with the low-level voltage, the node INV of the sense amplifier unit SAU connected to the bit line Program BL in the zones Z3 to Z0 is supplied with the high-level voltage, and the node SCOM of the sense amplifier unit SAU connected to the bit line Program BL in the zones Z3 to Z0 is supplied with the low-level voltage (for example, the voltage VSS).

Next, voltages and the like supplied to each signal line and each node in the time t02 to the time t03 in the first operation period will be described.

As shown in FIG. 30, the control signals BLC3 to BLC0 are supplied with the voltage VTH. The select gate line SGD is supplied with the voltage VSGH_PCH, and the select transistor ST1 (see FIG. 12) included in the NAND strings 50o and 50e (see FIG. 12) is turned off based on the voltage difference between the voltage VSGH_PCH and the voltage VTH.

As shown in FIG. 31, the bit line Program BL in the zones Z3 to Z0 is supplied with the low-level voltage, the node INV of the sense amplifier unit SAU connected to the bit line Program BL in the zones Z3 to Z0 is supplied with the high-level voltage, and the node SCOM of the sense amplifier unit SAU connected to the bit line Program BL in the zones Z3 to Z0 is supplied with the low-level voltage.

Similar to the first embodiment, in the second embodiment, the bit line Inhibit BL in the zones Z3 to Z0 is supplied with the voltage VHSA from the low-level voltage, the node INV of the sense amplifier unit SAU connected to the bit line Inhibit BL in the zones Z3 to Z0 is supplied with the low-level voltage from the high-level voltage, and the node SCOM of the sense amplifier unit SAU connected to the bit line Inhibit BL in the zones Z3 to Z0 is supplied with the voltage VHSA.

Next, voltages and the like supplied to each signal line and each node in the time t03 to the time t10 in the first operation period will be described.

As shown in FIG. 30, the control signal BLC is supplied with the low-level voltage from the voltage VTH. The select gate line SGD is supplied with the low-level voltage from the voltage VSGH_PCH.

As shown in FIG. 31, the bit line Program BL in the zones Z3 to Z0 is supplied with the low-level voltage, the node INV of the sense amplifier unit SAU connected to the bit line Program BL in the zones Z3 to Z0 is supplied with the high-level voltage, and the node SCOM of the sense amplifier unit SAU connected to the bit line Program BL in the zones Z3 to Z0 is supplied with the low-level voltage.

Similar to the time t03 to the time t10 in the first operation period, in the second operation period following the first operation period, the bit line Program BL in the zones Z3 to Z0 is supplied with the low-level voltage, the node INV of the sense amplifier unit SAU connected to the bit line Program BL in the zones Z3 to Z0 is supplied with the high-level voltage, and the node SCOM of the sense amplifier unit SAU connected to the bit line Program BL in the zones Z3 to Z0 is supplied with the low-level voltage.

2-2-2. Example of Second Operation Period

Voltages and the like supplied to each signal line and each node in the entire second operation period (time t10 to time t20) will be mainly described with reference to FIG. 30 and FIG. 31. Similar to the first embodiment, in the program operation according to the second embodiment, following the first operation, the second operation in the second operation period is performed on the memory cell transistor MT included in the NAND strings 50o and 50e using the sequencer 24. The second operation period is a period (the QPWBL voltage setting period) in which a voltage is set to the bit line QPWBL.

Voltages and the like supplied to each signal line and each node in the time t10 to the time t12 in the second operation period will be described. As shown in FIG. 30, the control signals BLC3 to BLC0 are supplied with the low-level voltage.

Next, voltages and the like supplied to each signal line and each node in the time t12 to the time t13 in the second operation time period will be described. As shown in FIG. 30, the control signals BLC3 to BLC0 are supplied with the low-level voltage from the voltage VBLC_QPW. Similar to the first embodiment, in the second embodiment, the select gate line SGD is supplied with the voltage VSGD, and the bit line QPWBL in the zones Z3 to Z0 is supplied with the voltage VQPW from the low-level voltage. In this case, the select transistor ST1 (see FIG. 12) included in the NAND strings 50o and 50e (see FIG. 12) is turned on based on the voltage difference between the voltage VSGD and the voltage VQPW. That is, a current flows through the part of the channel of the memory cell transistor MT electrically connected to the bit line QPWBL.

Next, voltages and the like supplied to each signal and each node in the time t13 to the time t20 of the second operation time period will be described. As shown in FIG. 30, the control signals BLC3 to BLC0 are supplied with the low-level voltage from the voltage VBLC_QPW. The select gate line SGD holds the voltage VSGD.

2-2-3. Example of Third Operation Period

Voltages and the like supplied to each signal line and each node in the entire third operation period (time t20 to time t25) will be mainly described with reference to FIG. 30 and FIG. 31. Similar to the first embodiment, in the program operation according to the second embodiment, following the second operation, the third operation in the third operation period is performed on the memory cell transistor MT included in the NAND strings 50o and 50e using the sequencer 24. The third operation period is a period (the Program BL voltage setting period) in which a voltage is set to the bit line Program BL.

Voltages and the like supplied to each signal line and each node in the time t20 to the time t22 in the third operation period will be described. As shown in FIG. 30, the control signals BLC3 to BLC0 are supplied with the low-level voltage. Similar to the first embodiment, in the second embodiment, the select gate line SGD holds the voltage VSGD in the time t20 to the time t22. The voltage VSG is higher than the voltage SRCGND0 by the threshold voltage of the select transistor ST1.

Similar to the time t03 to the time t10, in the time t20 to the time t22 in the third operation period shown in FIG. 31, the bit line Program BL in the zones Z3 to Z0 is supplied with the low-level voltage, the node INV of the sense amplifier unit SAU connected to the bit line Program BL in the zones Z3 to Z0 is supplied with the high-level voltage, and the node SCOM of the sense amplifier unit SAU connected to the bit line Program BL in the zone Z3 is supplied with the low-level voltage.

Next, voltages and the like supplied to each signal line and each node in the time t22 to the time t25 in the third operation time period will be described. As shown in FIG. 30, the control signal BLC3 is supplied with the voltage VBLC_p[3], the control signal BLC2 is supplied with the voltage VBLC_p[2], the control signal BLC1 is supplied with the voltage VBLC_p[1], and the control signal BLC0 is supplied with the voltage VBLC_p[0].

Voltages supplied to each of the bit line Program BL in the zones Z3 to Z0, the node INV of the sense amplifier unit SAU connected to the bit line Program BL in the zones Z3 to Z0, and the node SCOM of the sense amplifier unit SAU connected to the bit line Program BL in the zones Z3 to Z0 shown in FIG. 31 will be described with reference to a schematic circuit diagram of the sense amplifier unit SAU of FIG. 32.

The node INV of the latch circuit SDL holds "0" (a voltage at a low-level), and the node LAT of the latch circuit SDL holds "1" (a voltage at a high level). Therefore, the transistor 120 connected to the node INV is turned on, and the transistor 124 connected to the node INV is turned off. Although not shown, the control BLX is supplied with the high-level voltage, and the transistor 121 is turned on. The control signal BLC of the sense amplifier units SAU0 to SAU15 electrically connected to the bit lines BL0-Z3 to BL15-Z3 in the zone Z3 is supplied with the control signal BLC3 including the voltage VBLC_p[3], and the transistor 122 is turned on. Since the transistor 122 is supplied with the control signal BLC3 including the voltage VBLC_p[3] at its gate, and supplied with the voltage VHSA at its node SCOM and turned on, a voltage VBLC_p[3]−Vthblc lower by the threshold voltage Vthblc of the transistor 122 is generated. The transistor 122 supplies the voltage VBLC_p[3]−Vthblc to the bit line BL. Therefore, the bit lines BL0-Z3 to BL15-Z3 in the zone Z3 are supplied with the voltage VBLC_p[3]−Vthblc lower than the voltage VBLC_p[3] by the threshold voltage Vthblc of the transistor 122. The control signal BLC of the sense amplifier units SAU0 to SAU15 electrically connected to the bit lines BL0-Z2 to BL15-Z2 of the zone Z2 is supplied with the control signal BLC2 including the voltage VBLC_p[2], and the transistor 122 is turned on. Therefore, similar to the bit lines BL0-Z3 to BL15-Z3 in the zone Z3, the bit lines BL0-Z2 to BL15-Z2 in the zone Z2 are supplied with a voltage VBLC_p[2]−Vthblc lower by the threshold voltage Vthblc of the transistor 122 than the voltage VBLC_p[2]. The control signal BLC of the sense amplifier units SAU0 to SAU15 electrically connected to the bit lines BL0-Z1 to BL15-Z1 in the zone Z1 is supplied with the control signal BLC1 including the voltage VBLC_p[1], and the transistor 122 is turned on. Therefore, similar to the bit lines BL0-Z3 to BL15-Z3 in the zone Z3, the bit lines BL0-Z1 to BL15-Z1 in the zone Z1 are supplied with the voltage VBLC_p[1]−Vthblc lower by the threshold voltage Vthblc of the transistor 122 than the voltage VBLC_p[1]. The control signal BLC of the sense amplifier units SAU0 to SAU15 electrically connected to the bit lines BL0-Z0 to BL15-Z0 in the zone Z0 is supplied with the control signal BLC0 including the voltage VBLC_p[0], and the transistor 122 is turned on. Therefore, similar to the bit lines BL0-Z3 to BL15-Z3 in the zone Z3, the bit lines BL0-Z0 to BL15-Z0 in the zone Z0 are supplied with the voltage VBLC_p[0]-Vthblc lower by the threshold voltage Vthblc of the transistor 122 than the voltage VBLC_p[0].

Therefore, in the time t22 to the time t25 in the third operation period shown in FIG. 30 or FIG. 31, the bit line Program BL in the zone Z3 is supplied with the voltage VBLC_p[3]-Vthblc from the low-level voltage, the bit line Program BL in the zone Z2 is supplied with the voltage VBLC_p[2]-Vthblc from the low-level voltage, the bit line Program BL in the zone Z1 is supplied with the voltage VBLC_p[1]-Vthblc from the low-level voltage, the bit line Program BL in the zone Z0 is supplied with the voltage VBLC_p[0]-Vthblc from the low-level voltage, the node INV of the sense amplifier unit SAU connected to the bit line Program BL in the zones Z3 to Z0 is supplied with the high-level voltage, and the node SCOM of the sense amplifier unit SAU connected to the bit line Program BL in the zone Z3 is supplied with the voltage VHSA. The voltage VBLC_p[3]-Vthblc, the voltage VBLC_p[2]-Vthblc, the voltage VBLC_p[1]-Vthblc, and the VBLC_p[0]-Vthblc may be referred to as a "first voltage" or a "second voltage".

In addition, in the time t22 to the time t25 in the third operation period shown in FIG. 30, the selected word line SWL-WL is supplied with the voltage VPASS from the low-level voltage, and then supplied with the voltage VPGM. Thereafter, the selected word line SEL-WL is lowered from the voltage VPGM to the voltage VPASS. The unselected word line USEL-WL is supplied with the voltage VPASS from the low-level voltage.

For example, focusing on the zone Z3, the channel of the memory cell transistor MT connected to the bit line Program BL in the zone Z3 is supplied with the voltage VBLC_p[3]-Vthblc. In the memory cell transistor MT connected to the bit line Program BL in the zone Z3, the voltage VPGM is supplied to the gate electrode of the memory cell transistor MT to which the selected word line SEL-WL is connected. As a result, a voltage VPGM-voltage VBLC_p[3]-Vthblc is supplied between the gate electrode and the channel. Therefore, in the bit line Program BL in the zone Z3, the threshold voltage of the memory cell transistor MT connected to the selected word line SEL-WL is raised.

Similar to the zone Z3, the voltage VPGM-voltage VBLC_p[2]-Vthblc is supplied between the gate electrode and the channel of the memory cell transistor MT connected to the bit line Program BL in the zone Z2, the voltage VPGM-voltage VBLC_p[1]-Vthblc is supplied between the gate electrode and the channel of the memory cell transistor MT connected to the bit line Program BL in the zone Z1, and the voltage VPGM-voltage VBLC_p[0]-Vthblc is supplied between the gate electrode and the channel of the memory cell transistor MT connected to the bit line Program BL in the zone Z0. Therefore, in the bit line Program BL in the zone Z2 to the zone 0, the threshold voltage of the memory cell transistor MT connected to the selected word line SEL-WL is raised.

Voltages supplied to each signal line and each node after the time t25 in the third operation period will be described. The control signal BLC3 is supplied with the low-level voltage from the voltage VBLC_p[3], the control signal BLC2 is supplied with the low-level voltage from the voltage VBLC_p[2], the control signal BLC1 is supplied with the low-level voltage from the voltage VBLC_p[1], the bit line Program BL in the zone Z3 is supplied with the voltage VBLC_p[3]-Vthblc, the bit line Program BL in the zone Z2 is supplied with the voltage VBLC_p[2]-Vthblc, the bit line Program BL in the zone Z1 is supplied with the voltage VBLC_p[1]-Vthblc, and the bit line Program BL in the zone Z0 is supplied with the voltage VBLC_p[0]-Vthblc. The node INV of the sense amplifier unit SAU connected to the bit line Program BL in the zones Z3 to Z0 is supplied with the low-level voltage, and the node SCOM of the sense amplifier unit SAU connected to the bit line Program BL in the zone Z3 to Z0 is supplied with the voltage VHSA.

2-3. First Modification of Configuration of Sense Amplifier and Driver Set

Figure 33:
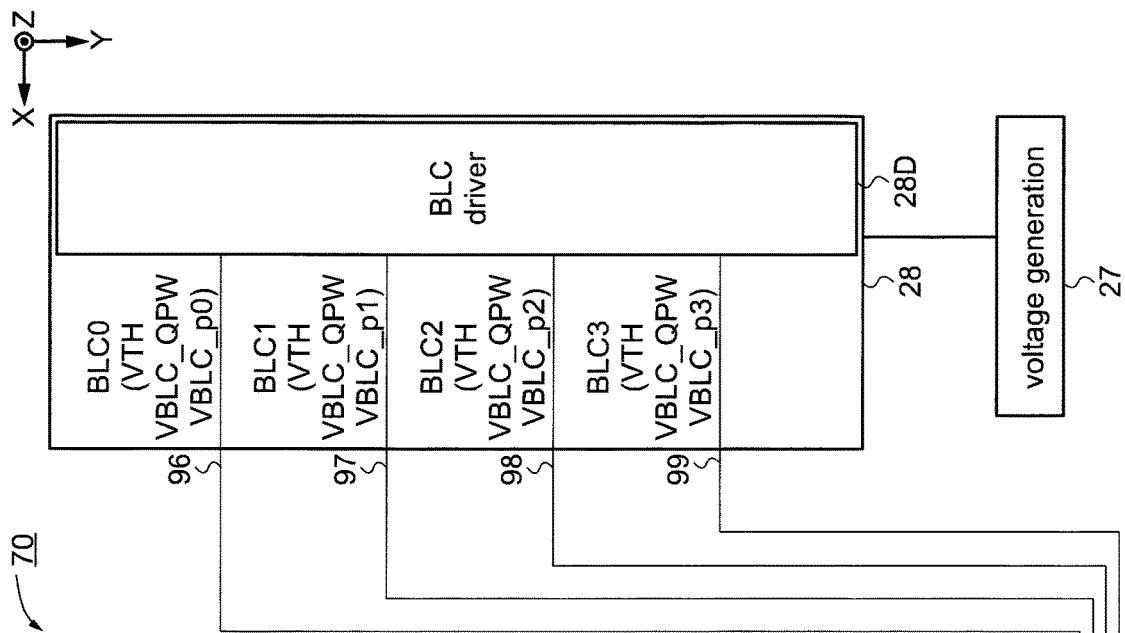
FIG. 33 is a block diagram showing a first modification of a configuration of a driver set according to the second embodiment.
Figure 33:
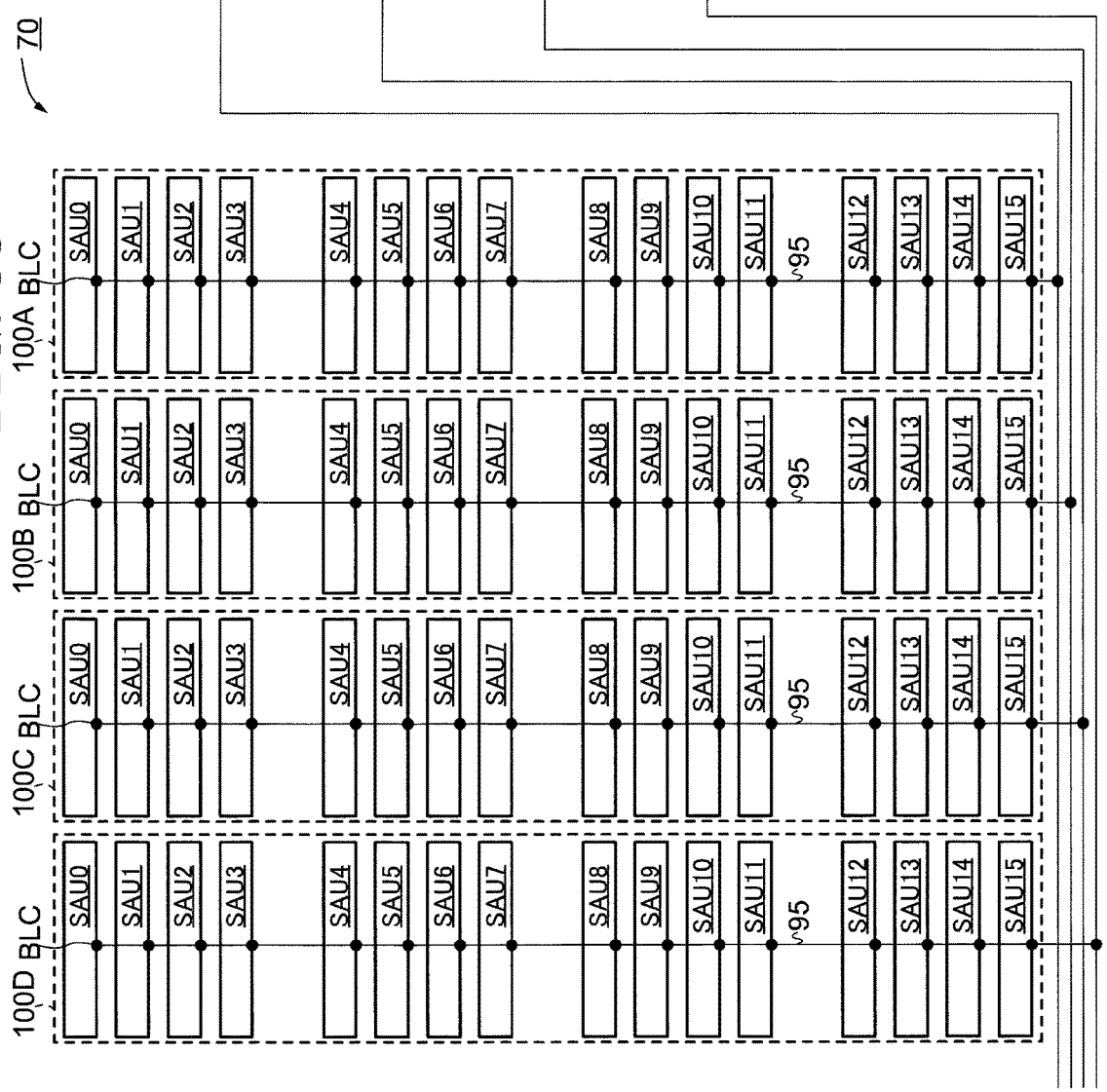

A first modification of the configuration of the sense amplifier module 70 and the driver set 28 included in the semiconductor memory device 1 according to the second embodiment will be described with reference to FIG. 33. FIG. 33 is a block diagram showing a first modification of the configuration of the driver set 28 included in the semiconductor memory device 1 according to the second embodiment, and is a diagram for explaining the connection between the driver set 28 and the plurality of sense amplifier groups 100A to 100D. The first modification of the configuration of the sense amplifier module 70 and the driver set 28 according to the second embodiment is not limited to the configuration shown in FIG. 33. In the description of FIG. 33, descriptions of the same or similar configurations as those in FIG. 1 to FIG. 32 may be omitted.

The configuration of the first modification shown in FIG. 33 is different from the configuration of the driver set 28 shown in FIG. 29 in that "the plurality of sense amplifier groups 100A to 100D is arranged in the extending direction (direction Y) of the bit line BL", and in that "each of the sense amplifier units SAU0 to SAU15 included in the plurality of sense amplifier groups 100A to 100D is electrically connected to each of the signal lines 96 to 99 via a wiring 95 indicated by a solid line in the direction Y." Herein, the signal lines 96 to 99 supply the control signals BLC0 to BLC3 to each of the sense amplifier units SAU0 to SAU15. In the configuration of the first modification shown in FIG. 33, since the other points are the same as the configurations of the sense amplifier module 70 and the driver set 28 shown in FIG. 29, differences will be mainly described here.

In the embodiment shown in FIG. 33, for example, the wiring 95 in the direction Y is electrically connected to each of the signal lines 96 to 99 supplying the control signals BLC0 to BLC3. The wiring 95 indicated by the solid line in the direction Y is electrically connected to the control signal BLC of the sense amplifier units SAU0 to SAU15 included in each sense amplifier group 100.

Similar to the BLC driver 28D shown in FIG. 29, the BLC driver 28D shown in FIG. 33 supplies the control signal BLC0 to the signal line 96, the control signal BLC1 to the signal line 97, the control signal BLC2 to the signal line 98, and the control signal BLC3 to the signal line 99.

In the sense amplifier units SAU0 to SAU15 in the sense amplifier group 100A, the control signal BLC is supplied with the control signal BLC0 via the wiring 95 indicated by the solid line in the direction Y. In the sense amplifier units SAU0 to SAU15 in the sense amplifier group 100B, the control signal BLC is supplied with the control signal BLC1 via the wiring 95 indicated by the solid line in the direction Y. In the sense amplifier units SAU0 to SAU15 in the sense amplifier group 1000, the control signal BLC is supplied with the control signal BLC2 via the wiring 95 indicated by the solid line in the direction Y. In the sense amplifier units SAU0 to SAU15 in the sense amplifier group 100D, the control signal BLC is supplied with the control signal BLC3 via the wiring 95 indicated by the solid line in the direction Y.

In the semiconductor memory device 1 according to the second embodiment, as shown in FIG. 33, the plurality of sense amplifier groups 100A to 100D is arranged parallel to the extending direction (direction Y) of the bit lines BL arranged in each zone, and the wiring parallel or substantially parallel to the direction Y is used, so that the bit lines BL arranged in each of the zones Z0 to Z3 and the plurality of sense amplifier units SAU0 to SAU15 in the plurality of sense amplifier groups 100A to 100D can be electrically connected. In addition, the plurality of sense amplifier units SAU0 to SAU15 in the plurality of sense amplifier groups 100A to 100D can be electrically connected to the signal lines 96 to 99 that supply different control signals BLC0 to BLC3 by using the wiring arranged in parallel or substantially parallel to the extending direction (direction Y) of the bit lines BL arranged in each zone Z0 to Z3 and parallel or substantially parallel to the direction Y.

2-4. Second Modification of Configuration of Sense Amplifier and Driver Set

Figure 34:
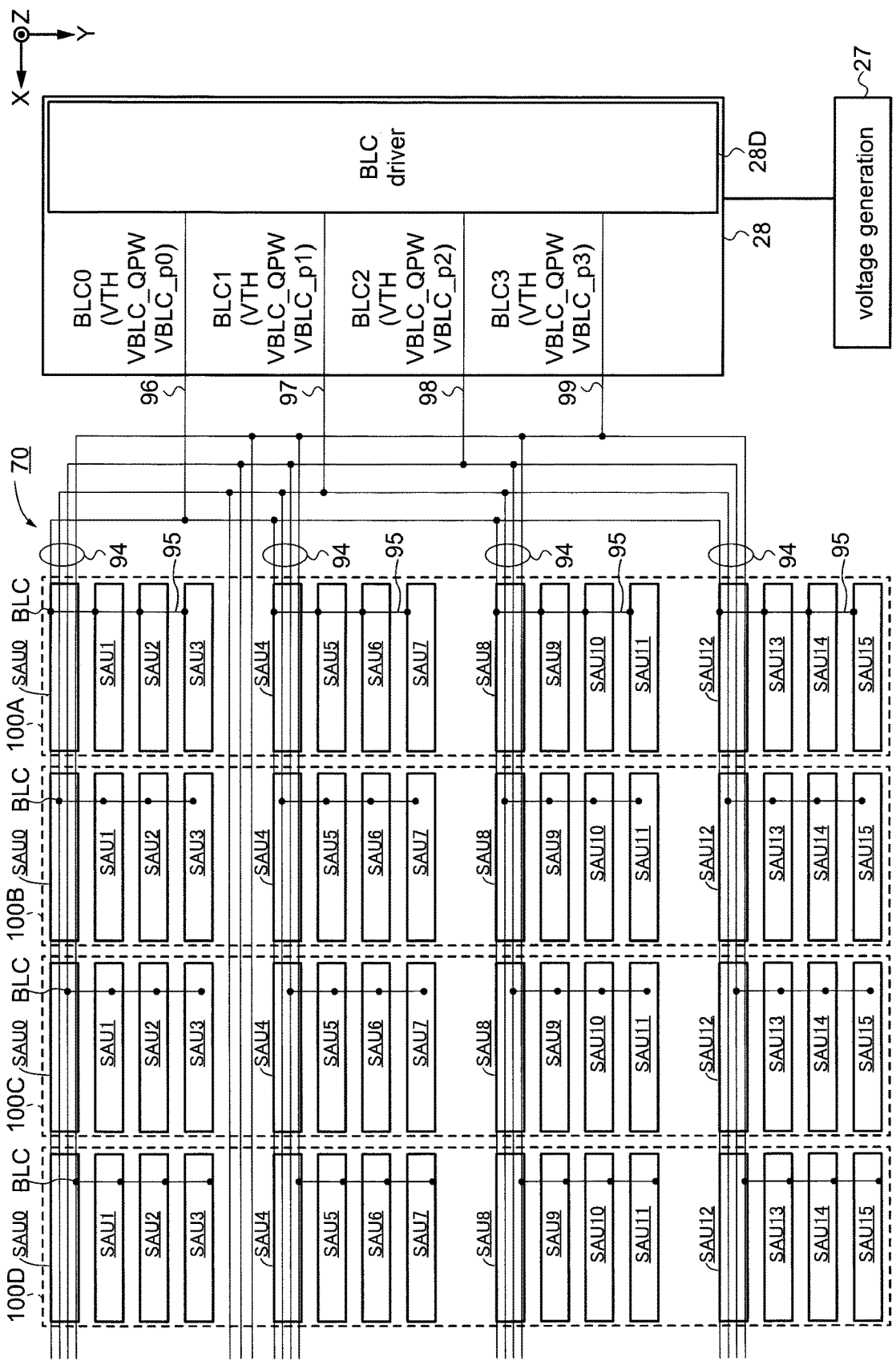
FIG. 34 is a block diagram showing a second modification of a configuration of a driver set according to the second embodiment.

The second modification of the configuration of the sense amplifier module 70 and the driver set 28 included in the semiconductor memory device 1 according to the second embodiment will be described with reference to FIG. 34. FIG. 34 is a block diagram showing the second modification of the configuration of the driver set 28 included in the semiconductor memory device 1 according to the second embodiment, and is a diagram for explaining the connection between the driver set 28 and the plurality of sense amplifier groups 100A to 100D. The second modification of the configuration of the driver set 28 according to the second embodiment is not limited to the configuration shown in FIG. 34. In the description of FIG. 34, descriptions of the same or similar configurations as those in FIG. 1 to FIG. 33 may be omitted.

The configuration of the second modification shown in FIG. 34 is different from the configuration of the first modification illustrated in FIG. 33, in that "the sense amplifier units SAU0 to SAU15 in the plurality of sense amplifier groups 100A to 100D are connected to the driver set 28 by using the wiring 95 in the direction Y, the wiring 94 in the direction X, and the signal lines 96 to 99." Herein, the signal lines 96 to 99 supply the control signals BLC0 to BLC3 to each of the sense amplifier units SAU0 to SAU15." In the configuration of the second modification shown in FIG. 34, since the other points are the same as the configuration of the second modification shown in FIG. 33, differences will be mainly described here.

For example, in the second modification shown in FIG. 34, using the wiring 94 indicated by the solid line in the direction X and the wiring 95 indicated by the solid line in the direction Y, the signal line 96 and the sense amplifier units SAU0 to SAU15 in the sense amplifier group 100A are electrically connected, the signal line 97 and the sense amplifier units SAU0 to SAU15 in the sense amplifier group 100B are electrically connected, the signal line 98 and the sense amplifier units SAU0 to SAU15 in the sense amplifier group 1000 are electrically connected, and the signal line 99 and the sense amplifier units SAU0 to SAU15 in the sense amplifier group 100D are electrically connected.

As a result, the control signal BLC0 is supplied to the sense amplifier units SAU0 to SAU15 in the sense amplifier group 100A via the wiring 94 indicated by the solid line in the direction X and the wiring 95 indicated by the solid line in the direction Y, the control signal BLC1 is supplied to the sense amplifier units SAU0 to SAU15 in the sense amplifier group 100B via the signal line 97, the wiring 94 indicated by the solid line in the direction X, and the wiring 95 indicated by the solid line in the direction Y, the control signal BLC2 is supplied to the sense amplifier units SAU0 to SAU15 in the sense amplifier group 100C via the signal line 98, the wiring 94 indicated by the solid line in the direction X, and the wiring 95 indicated by the solid line in the direction Y, and the control signal BLC3 is supplied to the sense amplifier units SAU0 to SAU15 in the sense amplifier group 100D via the signal line 98, the wiring 94 indicated by the solid line in the direction X, and the wiring 95 indicated by the solid line in the direction Y.

In the second modification, the signal line and the sense amplifier units SAU0 to SAU15 in the sense amplifier group 100A can be electrically connected by using the wiring 94 indicated by the solid line in the direction X and the wiring 95 indicated by the solid line in the direction Y. As a result, in the semiconductor memory device 1 of the present disclosure, as compared with the case where either one of the wiring 84 indicated by the solid line in the direction X or the wiring 85 indicated by the solid line in the direction Y is used, it is possible to reduce the delay of signals caused by the wiring resistance and the capacitance between wirings.

Third Embodiment

The semiconductor memory device 1 according to the third embodiment is different from the semiconductor memory device 1 according to the second embodiment in that "the signal corresponding to the control signals BLC3 to BLC0 is controlled in time series by using one control signal BLC." Herein, the signal corresponding to the control signals BLC3 to BLC0 is controlled in time series by using one control signal BLC, in order to adjust the effective program voltage supplied to the memory cell transistor MT.

Figure 35:
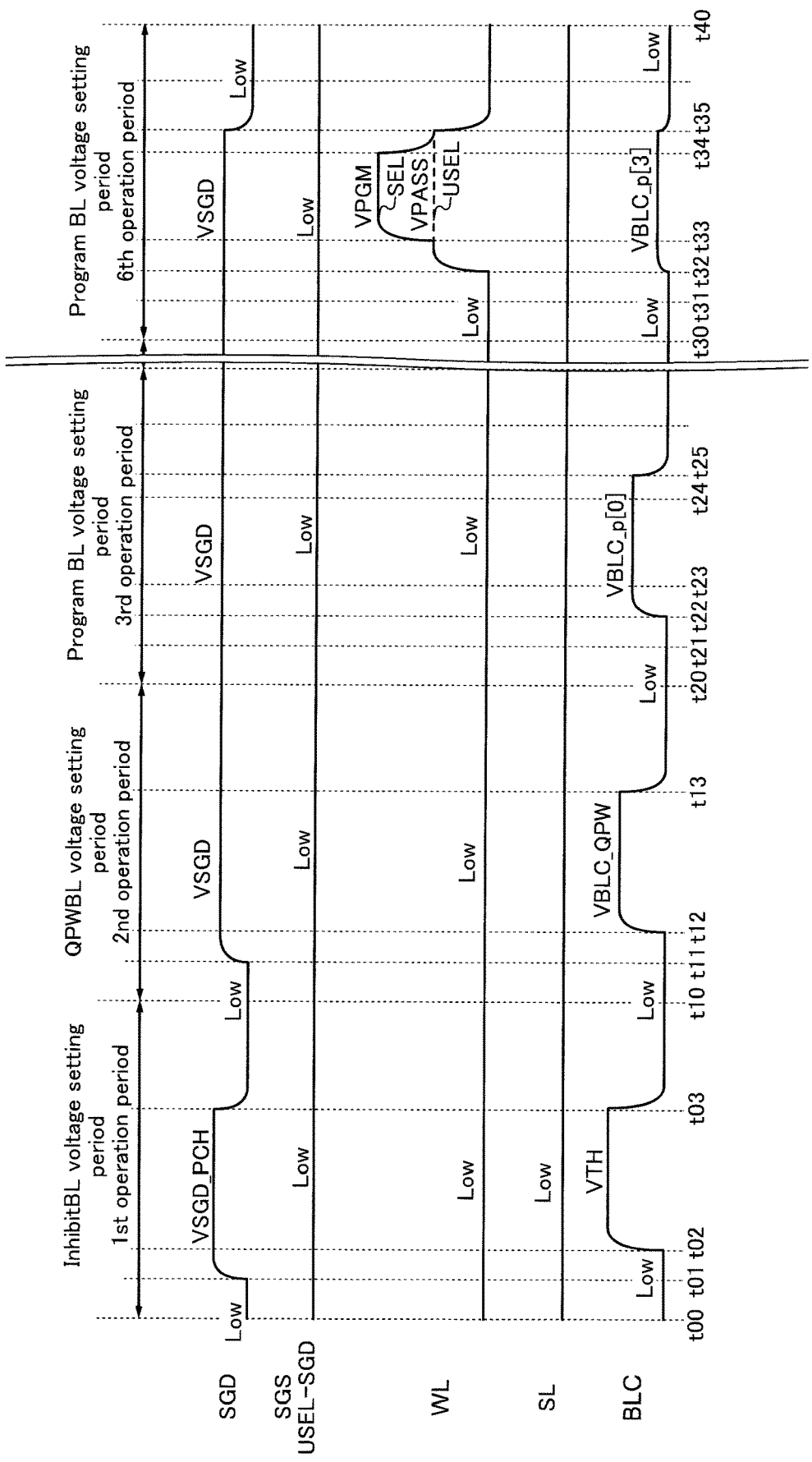
FIG. 35 is a diagram showing a timing chart of various signals at the time of a program operation of a nonvolatile semiconductor memory device according to the second embodiment.
Figure 36:
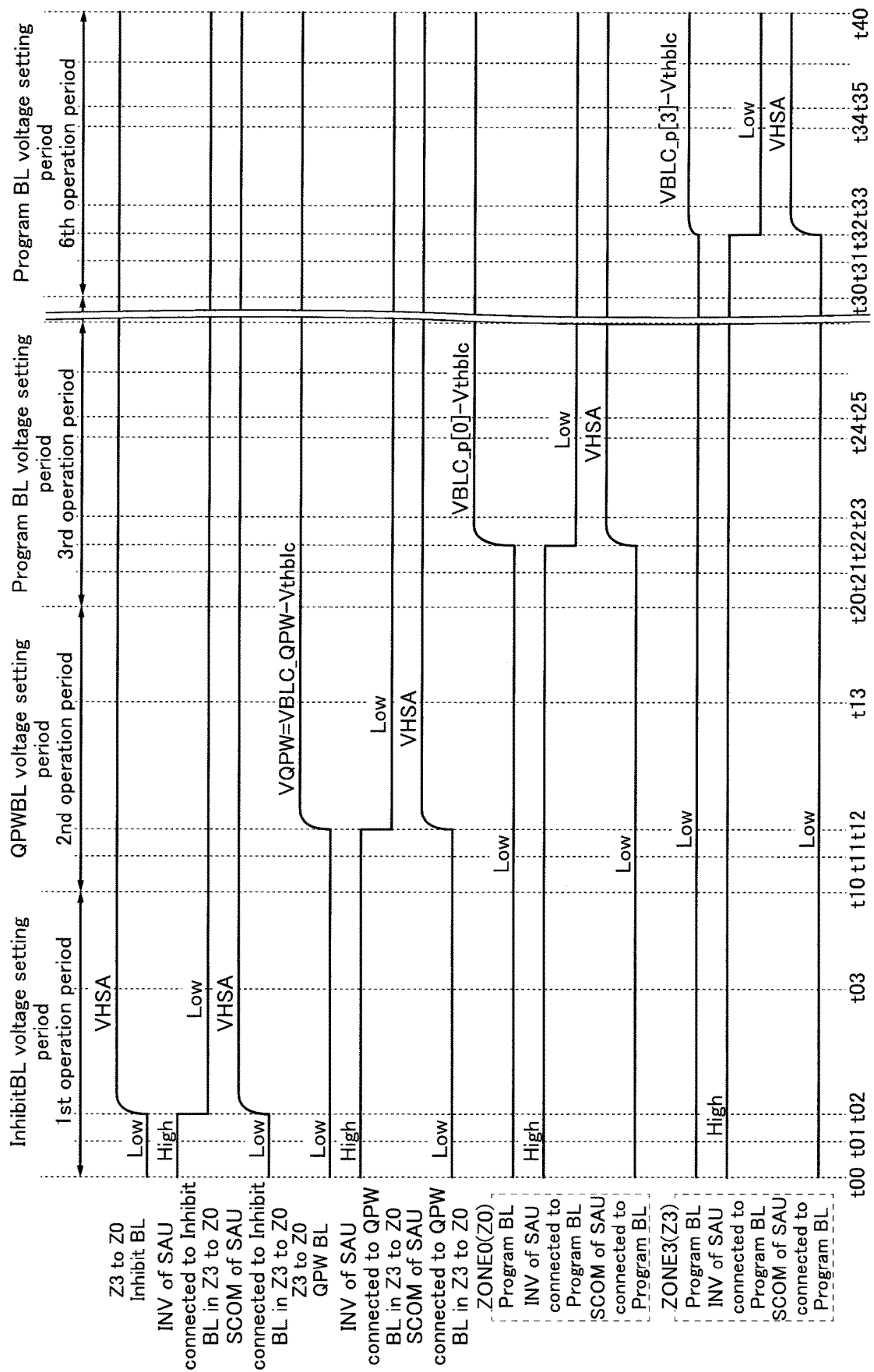
FIG. 36 is a diagram showing a timing chart of various signals at the time of a program operation of a nonvolatile semiconductor memory device according to the second embodiment.

FIG. 35 and FIG. 36 are diagrams showing timing charts of various signals at the time of the program operation of the semiconductor memory device 1 according to the third embodiment. The timing charts shown in FIG. 35 and FIG. 36 are schematic timing charts showing an example of temporal changes in voltages supplied to various circuit components. The timing charts shown in FIG. 35 and FIG. 36 are examples, and the timing chart of the semiconductor memory device 1 according to the third embodiment is not limited to the examples shown in FIG. 35 and FIG. 36. Descriptions of the same or similar configurations as those in FIG. 1 to FIG. 34 may be omitted.

The example of the program operation of the semiconductor memory device 1 according to the third embodiment shown in FIG. 35 and FIG. 36 is mainly different from the example of the program operation of the semiconductor memory device 1 according to the second embodiment shown in FIG. 30 and FIG. 31, in that "the signal corresponding to the control signals BLC3 to BLC0 is controlled in time series by using one control signal BLC, and the operation up to the second operation period is the same." Therefore, differences will be described in the example of the program operation of the semiconductor memory device 1 according to the third embodiment shown in FIG. 35 and FIG. 36 and the example of the program operation of the semiconductor memory device 1 according to the second embodiment shown in FIG. 30 and FIG. 31.

In the program operation of the semiconductor memory device 1 according to the second embodiment shown in FIG. 30 and FIG. 31, in the third operation period, the four control signals BLC3 to BLC0 are used to execute voltage setting of the bit line Program BL in the zone Z0 using the control signal BLC0, voltage setting of the bit line Program BL in the zone Z1 using the control signal BLC1, voltage setting of the bit line Program BL in the zone Z2 using the control signal BLC2 and voltage setting of the bit line Program BL in the zone Z3 using the control signal BLC0 in parallel.

On the other hand, in the form of the program operation of the semiconductor memory device 1 according to the third embodiment shown in FIG. 35 and FIG. 36, the semiconductor memory device 1 uses one control signal BLC and performs voltage setting of the bit line Program BL in the zone Z0 corresponding to the case where the control signal BLC0 is used, in the third operation period. The semiconductor memory device 1 uses the one control signal BLC and performs voltage setting of the bit line Program BL in the zone Z1 corresponding to the case where the control signal BLC1 is used, in the fourth operation period. The semiconductor memory device 1 uses the one control signal BLC and performs voltage setting of the bit line Program BL in the zone Z2 corresponding to the case where the control signal BLC2 is used, in the fifth operation period. The semiconductor memory device 1 uses the one control signal BLC and performs voltage setting of the bit line Program BL in the zone Z3 corresponding to the case where the control signal BLC3 is used, in the sixth operation period. That is, the program operation of the semiconductor memory device 1 according to the third embodiment shown in FIG. 35 and FIG. 36 includes using one control signal BLC, setting the voltage of the bit line Program BL in the zone Z0, setting the voltage of the bit line Program BL in the zone Z1, setting the voltage of the bit line Program BL in the zone Z2, and setting the voltage of the bit line Program BL in the zone Z3 by time division driving using one control signal BLC. In addition, in the program operation of the semiconductor memory device 1 according to the third embodiment, in the sixth operation period in which the voltages of all the bit lines Program BL in the zones Z0 to Z3 are set, the same operation as the operation related to the selected word line SEL-WL executed in the third operation period shown in FIG. 30 of the semiconductor memory device 1 according to the second embodiment is executed. That is, in the sixth operation period in the program operation of the semiconductor memory device 1 according to the third embodiment, the selected word line SEL-WL is supplied with the voltage VPGM, and the memory cell transistor MT connected to the selected word line SEL-WL is increased in the threshold voltage, and the like. In addition, in the form of the program operation of the semiconductor memory device 1 according to the third embodiment shown in FIG. 35 and FIG. 36, the operations in the fourth operation period and the fifth operation period are omitted.

In the semiconductor memory device 1 according to the third embodiment, since the number of the control signals BLC is one, the number of nodes is small, which is effective in reducing the layout of the semiconductor memory device 1.

In the first to third embodiments, in the case where descriptions such as the same, substantially the same, or match is used, the same, substantially the same, or match may include the case where an error within a range of design is included.

In this specification, "connection" refers to an electrical connection, and does not exclude, for example, the intervention of another element therebetween.

While several embodiments of the nonvolatile semiconductor memory device of the present disclosure have been described above, these embodiments have been presented by way of example and are not intended to limit the scope of the invention. Indeed, the novel embodiments described herein may be embodied in a variety of other forms, furthermore, various omissions, substitutions, and changes in the form of the embodiments described herein may be made without departing from the spirit of the inventions. These embodiments and variations thereof fall within the scope and spirit of the invention, and fall within the scope of the invention described in the claims and equivalents thereof.

What is claimed is:

1. A semiconductor memory device comprising:
    a first memory cell group to an eighth memory cell group arranged along a first direction;
    a first word line arranged in common to the first memory cell group to the eighth memory cell group and extending in the first direction; and
    a first sense amplifier group to an eighth sense amplifier group configured to be capable of supplying voltages to the first memory cell group to the eighth memory cell group, respectively;
    wherein
    each of the first memory cell group to the eighth memory cell group includes a plurality of memory cells and a plurality of bit lines each connected to the plurality of memory cells,
    in a write operation of supplying a program voltage to the first word line,
        the first sense amplifier group supplies a first voltage to the bit line connected to a write target memory cell among the plurality of memory cells of the first memory cell group,
        the second sense amplifier group supplies a second voltage different from the first voltage to the bit line connected to a write target memory cell among the plurality of memory cells of the second memory cell group,
        the third sense amplifier group supplies the second voltage to the bit line connected to a write target memory cell among the plurality of memory cells of the third memory cell group,
        the fourth sense amplifier group supplies the first voltage to the bit line connected to a write target memory cell among the plurality of memory cells of the fourth memory cell group,
        the fifth sense amplifier group supplies the first voltage to the bit line connected to a write target memory cell among the plurality of memory cells of the fifth memory cell group,
        the sixth sense amplifier group supplies the second voltage to the bit line connected to a write target memory cell among the plurality of memory cells of the sixth memory cell group,
        the seventh sense amplifier group supplies the second voltage to the bit line connected to a write target memory cell among the plurality of memory cells of the seventh memory cell group, and
        the eighth sense amplifier group supplies the first voltage to the bit line connected to a write target memory cell among the plurality of memory cells of the eighth memory cell group, the first memory cell group is arranged between the second memory cell group and a first hole for providing a first portion of the first word line, and is arranged at a position closer to the first hole than the second memory cell group, the fourth memory cell group is arranged between the third memory cell group and a second hole for providing a second portion of the first word line, and is arranged at a position closer to the second hole than the third memory cell group, the fifth memory cell group is arranged between the sixth memory cell group and the second hole, and is arranged at a position closer to the second hole than the sixth memory cell group, and the eighth memory cell group is arranged between the seventh memory cell group and a third hole for providing a third portion of the first word line, and is arranged at a position closer to the third hole than the seventh memory cell group.

2. The semiconductor memory device according to claim 1, wherein the second voltage is higher than the first voltage.

3. The semiconductor memory device according to claim 2, wherein in a write operation of supplying a program voltage to the first word line,
the first sense amplifier group supplies the first voltage to two or more bit lines each connected to two or more write target memory cells among the plurality of memory cells of the first memory cell group,
the second sense amplifier group supplies the second voltage to two or more bit lines each connected to two or more write target memory cells among the plurality of memory cells of the second memory cell group,
the third sense amplifier group supplies the second voltage to two or more bit lines each connected to two or more write target memory cells among the plurality of memory cells of the third memory cell group,
the fourth sense amplifier group supplies the first voltage to two or more bit lines each connected to two or more write target memory cells among the plurality of memory cells of the fourth memory cell group,
the fifth sense amplifier group supplies the first voltage to two or more bit lines each connected to two or more write target memory cells among the plurality of memory cells of the fifth memory cell group,
the sixth sense amplifier group supplies the second voltage to two or more bit lines each connected to two or more write target memory cells among the plurality of memory cells of the sixth memory cell group,
the seventh sense amplifier group supplies the second voltage to two or more bit lines each connected to two or more write target memory cells among the plurality of memory cells of the seventh memory cell group, and
the eighth sense amplifier group supplies the first voltage to two or more bit lines each connected to two or more write target memory cells among the plurality of memory cells of the eighth memory cell group.

4. The semiconductor memory device according to claim 2, wherein each of the first sense amplifier group to the eighth sense amplifier group respectively includes a plurality of sense amplifier units connected to the plurality of bit lines.

5. The semiconductor memory device according to claim 4, further comprising a voltage generation circuit;
a driver set connected to the voltage generation circuit; and
a plurality of voltage supply lines connecting the driver set and the first sense amplifier group to the eighth sense amplifier group,
wherein
the voltage generation circuit generates the first voltage and the second voltage, and
the driver set is supplied with the first voltage and the second voltage from the voltage generation circuit, supplies the first voltage to the first sense amplifier group, the fourth sense amplifier group, the fifth sense amplifier group and the eighth sense amplifier group, and supplies the second voltage to the second sense amplifier group, the third sense amplifier group, the sixth sense amplifier group and the seventh sense amplifier group.

6. The semiconductor memory device according to claim 5, wherein the plurality of sense amplifier units is arranged along the first direction, is electrically connected using a wiring parallel to a second direction intersecting the first direction, and has a plurality of power supply lines and a low voltage supply terminal,
the low voltage supply terminal is supplied with a voltage lower than the voltage supplied to the plurality of power supply lines,
the plurality of sense amplifier units in the first sense amplifier group, the fourth sense amplifier group, the fifth sense amplifier group and the eighth sense amplifier group are supplied with the first voltage from the low voltage supply terminal connected to a first voltage supply line among the plurality of voltage supply power lines, and
the plurality of sense amplifier units in the second sense amplifier group, the third sense amplifier group, the sixth sense amplifier group and the seventh sense amplifier group are supplied with the second voltage from the low voltage supply terminal connected to a second voltage supply line different from the first voltage supply line among the plurality of voltage supply power lines.

7. The semiconductor memory device according to claim 2, further comprising a voltage generation circuit;
a driver set connected to the voltage generation circuit; and
a plurality of signal lines connecting the driver set and the first sense amplifier group to the eighth sense amplifier group;
wherein
the voltage generation circuit and the driver set generate a first control signal and a second control signal, supply the first control signal to the first sense amplifier group, the fourth sense amplifier group, the fifth sense amplifier group and the eighth sense amplifier group through a first control signal line among the plurality of signal lines, and supply the second control signal to the second sense amplifier group, the third sense amplifier group, the sixth sense amplifier group and the seventh sense amplifier group through a second control signal line among the plurality of signal lines.

8. The semiconductor memory device according to claim 7, wherein
the plurality of sense amplifier units is arranged along the first direction, is electrically connected using a wiring parallel to a second direction intersecting the first direction, and has a power supply line, a low voltage supply terminal and a control transistor,
gate electrodes of the control transistors included in the plurality of sense amplifier units in the first sense amplifier group, the fourth sense amplifier group, the fifth sense amplifier group and the eighth sense amplifier group are input with the first control signal,
each of the control transistors input with the first control signal generating the first voltage according to the voltage included in the first control signal,
gate electrodes of the control transistors included in the plurality of sense amplifier units in the second sense amplifier group, the third sense amplifier group, the sixth sense amplifier group and the seventh sense amplifier group are input with the second control signal, and
each of the control transistors input the second control signal generating the second voltage according to the voltage included in the second control signal.

9. The semiconductor memory device according to claim 8, wherein
the first voltage is lower than a voltage of the first control signal by a threshold voltage of one of the control transistors included in the plurality of sense amplifier units in the first sense amplifier group, the fourth sense amplifier group, the fifth sense amplifier group and the eighth sense amplifier group, and
the second voltage is lower than a voltage of the second control signal by a threshold voltage of one of the control transistors included in the plurality of sense amplifier units in the second sense amplifier group, the third sense amplifier group, the sixth sense amplifier group and the seventh sense amplifier group.

10. The semiconductor memory device according to claim 5, further comprising
a sequencer,
wherein
in a write operation of supplying a program voltage,
the sequencer is configured to control the voltage generation circuit and the driver set so as to execute both
supplying the first voltage to the bit lines in the first sense amplifier group, the fourth sense amplifier group, the fifth sense amplifier group and the eighth sense amplifier group, and
supplying the second voltage to the bit lines in the second sense amplifier group, the third sense amplifier group, the sixth sense amplifier group and the seventh sense amplifier group within the same period.

11. The semiconductor memory device according to claim 5, further comprising
a sequencer,
wherein
in a write operation of supplying a program voltage,
the sequencer is configured to control the voltage generation circuit and the driver so as to execute both
supplying the first voltage to the bit lines in the first sense amplifier group, the fourth sense amplifier group, the fifth sense amplifier group and the eighth sense amplifier group, and
supplying the second voltage to the bit lines in the second sense amplifier group, the third sense amplifier group, the sixth sense amplifier group and the seventh sense amplifier group within different periods.

12. The semiconductor memory device according to claim 11, wherein
the sequencer is configured to control the voltage generation circuit and the driver set so as to execute the supply of the second voltage to the bit lines in the second sense amplifier group, the third sense amplifier group, the sixth sense amplifier group and the seventh sense amplifier group, after executing the supply of the first voltage to the bit lines in the first sense amplifier group, the fourth sense amplifier group, the fifth sense amplifier group and the eighth sense amplifier group.

13. The semiconductor memory device according to claim 10, further comprising
a second word line arranged in common from the first memory cell group to the eighth memory cell group, extending in the first direction, and facing the first word line in a second direction intersecting the first direction.

14. The semiconductor memory device according to claim 13, wherein
a plurality of the first word lines is arranged stacked in a third direction intersecting the first direction and the second direction,
a plurality of the second word lines is stacked in the third direction, and
the first word line and second word line are arranged at the same position in the third direction.

* * * * *